United States Patent [19]
Fujii et al.

[11] Patent Number: 5,396,585
[45] Date of Patent: Mar. 7, 1995

[54] CLIPPING PROCESSOR

[75] Inventors: Tatsuya Fujii, Nishinomiya; Naoto Shiraishi, Minoo; Masanobu Fukushima; Tatsuya Nakajima, both of Toyonaka; Yasuhiro Izawa, Suita, all of Japan

[73] Assignee: Ricoh Company, Ltd., Tokyo, Japan

[21] Appl. No.: 825,614

[22] Filed: Jan. 24, 1992

[30] Foreign Application Priority Data

Jan. 30, 1991 [JP] Japan .................. 3-031738
Oct. 18, 1991 [JP] Japan .................. 3-299698

[51] Int. Cl.6 ............................................ G06F 15/40
[52] U.S. Cl. .................................................. 395/134
[58] Field of Search ............... 395/134, 133, 162, 163, 395/164, 165; 345/118, 119, 120

[56] References Cited

U.S. PATENT DOCUMENTS

| | | | |
|---|---|---|---|
| 3,927,948 | 12/1975 | Cox et al. | 364/512 X |
| 4,181,954 | 1/1980 | Rosenthal et al. | 364/512 X |
| 4,388,610 | 6/1983 | Tsunekawa | 382/8 |
| 4,519,026 | 5/1985 | Nozawa et al. | 364/474.25 |
| 4,530,046 | 7/1985 | Munekata et al. | 364/474.24 X |
| 4,586,145 | 4/1986 | Bracewell et al. | 364/512 |
| 4,618,924 | 10/1986 | Hinds | 364/474.05 X |
| 4,642,754 | 2/1987 | Kishi et al. | 364/474.01 X |
| 4,727,496 | 2/1988 | Ryouki | 364/474.25 X |
| 4,788,636 | 11/1988 | Shiratori et al. | 364/474.25 X |
| 4,792,889 | 12/1988 | Kragelin et al. | 364/474.24 X |
| 4,802,083 | 1/1989 | Isobe et al. | 364/474.24 X |
| 4,815,009 | 3/1989 | Blatin | 364/518 |
| 4,933,865 | 6/1990 | Yamamoto et al. | 364/518 |
| 4,951,227 | 8/1990 | Todd | 364/518 |
| 5,129,051 | 7/1992 | Cain | 395/133 |
| 5,222,204 | 6/1993 | Swanson | 395/127 |

OTHER PUBLICATIONS

Shimada et al., "A Recognition Algorithm of Dashed and Chained Lines for Automatic Inputting of Drawings", Denishi Tsushin Gakkai Ronbunshi '86/5 vol. J69-D No. 5, 1986.

Primary Examiner—Phu K. Nguyen
Attorney, Agent, or Firm—Cooper & Dunham

[57] ABSTRACT

A clipping processor has a first polygonal end point memory for storing two end point information of X and Y constituting a polygon and respective end point information of mapping information. The clipping processor also has a screen side generating circuit for judging whether a polygonal side crosses each of screen end points and is located inside or outside a screen based on the two end point information from the first polygonal end point memory. The clipping processor further has an intersecting point arithmetic circuit for calculating an intersecting point on the polygonal side at each of the screen end points and respective end point addresses of the mapping information at the intersecting point on the basis of data from the screen side generating circuit. The two end point information and the mapping information at the intersecting point on the polygonal side at each of the screen end points are clipped by the intersecting point arithmetic circuit and are written to the second polygonal end point memory.

4 Claims, 57 Drawing Sheets

| DIRECTIONAL VECTOR | SIDES |
|---|---|
| 0 | RIGHT-HAND SIDE |
| 1 | RIGHT-HAND SIDE |
| 2 | RIGHT-HAND SIDE |
| 3 | RIGHT-HAND SIDE |
| 4 | LEFT-HAND SIDE |
| 5 | LEFT-HAND SIDE |
| 6 | LEFT-HAND SIDE |
| 7 | LEFT-HAND SIDE |

Fig. 9
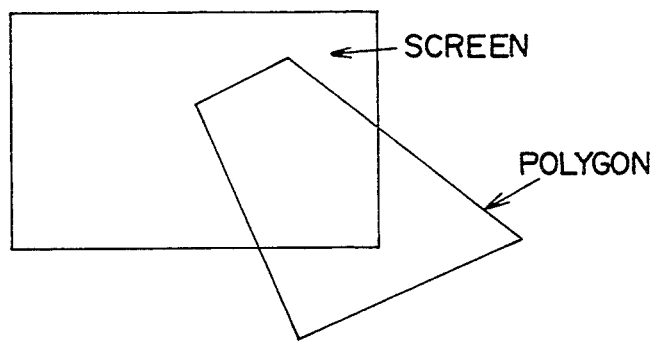
Fig. 10
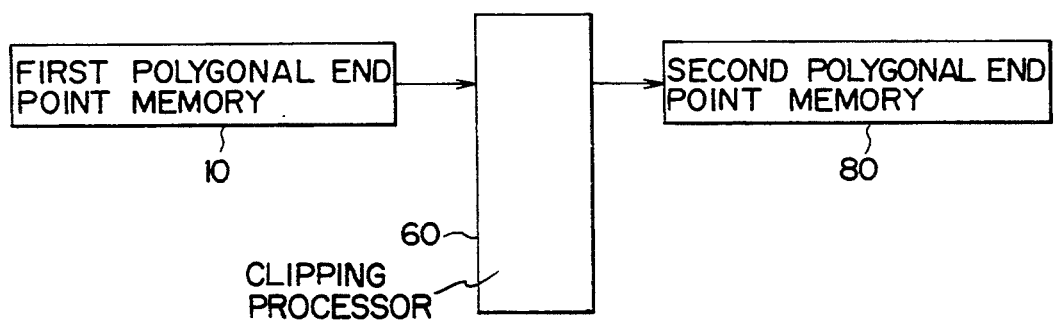
Fig. 11
|   | X | Y |
|---|---|---|
| 1 | 0 | 0 |
| 2 | 0 | 200 |
| 3 | 300 | 200 |
| 4 | 300 | 0 |

|   | X   | Y   | MX  | MY  |
|---|-----|-----|-----|-----|
| 1 | 175 | 20  | 255 | 0   |
| 2 | 75  | 75  | 0   | 0   |
| 3 | 255 | 280 | 0   | 255 |
| 4 | 425 | 150 | 255 | 255 |

Fig. 14

|   | X | Y | MX | MY |
|---|---|---|----|----|
| 1 | 175 | 20 | 255 | 0 |
| 2 | 75 | 75 | 0 | 0 |
| 3 | 225 | 280 | 0 | 255 |
| 4 | 425 | 150 | 255 | 255 |

(SCREEN SIDE 1)

|   | X | Y | MX | MY |
|---|---|---|----|----|
| 1 | 175 | 20 | 255 | 0 |
| 2 | 75 | 75 | 0 | 0 |
| 3 | 160 | 200 | 0 | 95 |
| 4 | 325 | 200 | 190 | 255 |
| 5 | 425 | 150 | 255 | 255 |

(SCREEN SIDE 2)

|   | X | Y | MX | MY |
|---|---|---|----|----|
| 1 | 175 | 20 | 255 | 0 |
| 2 | 75 | 75 | 0 | 0 |
| 3 | 160 | 200 | 0 | 95 |
| 4 | 325 | 200 | 190 | 255 |
| 5 | 425 | 150 | 255 | 255 |

(SCREEN SIDE 3)

|   | X | Y | MX | MY |
|---|---|---|----|----|
| 1 | 175 | 20 | 255 | 0 |
| 2 | 75 | 75 | 0 | 0 |
| 3 | 160 | 200 | 0 | 95 |
| 4 | 300 | 200 | 127 | 230 |
| 5 | 300 | 75 | 255 | 122 |

(SCREEN SIDE 4)

Fig. 34

| 0101 | 0100 | 0110 |
|------|------|------|
| 0001 | 0000 | 0010 |
| 1001 | 1000 | 1010 |

Fig. 35

| 5 | 4 | 6 |
|---|---|---|
| 1 | 0 | 2 |
| 9 | 8 | 10 |

Fig. 36

| 5 | 4 | 6 |
|---|---|---|
| 1 | 0 | 2 |
| 9 | 8 | 10 |

Fig. 37
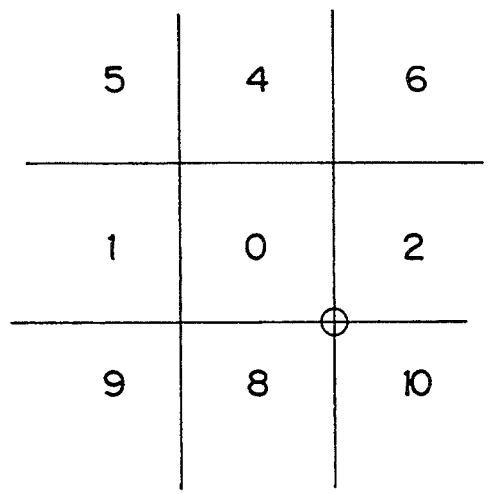
Fig. 38
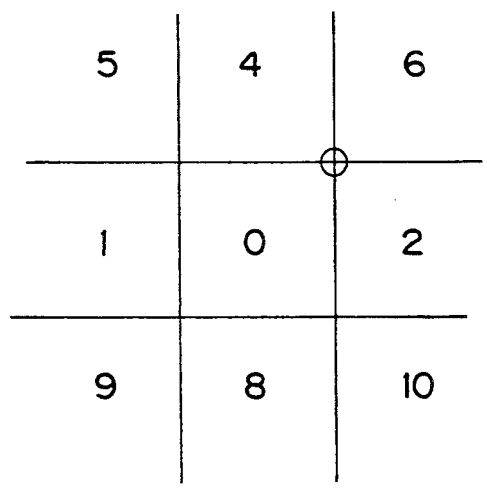
Fig. 39
| H ADDRESS | L ADDRESS | X | Y | MX | MY |
|---|---|---|---|---|---|
| 00 | 00 | | | | |
| 00 | 01 | | | | |
| 00 | 10 | | | | |
| 00 | 11 | | | | |
| 01 | 00 | | | | |
| 01 | 01 | | | | |
| 01 | 10 | | | | |
| 01 | 11 | | | | |

Fig. 40

|   | X | Y |
|---|---|---|
| 1 |   |   |
| 2 |   |   |
| 3 |   |   |
| 4 |   |   |

Fig. 41

| H ADDRESS | L ADDRESS | X | Y | MX | MY |
|---|---|---|---|---|---|
| 00 | 000 |   |   |   |   |
| 00 | 001 |   |   |   |   |
| 00 | 010 |   |   |   |   |
| 00 | 011 |   |   |   |   |
| 00 | 100 |   |   |   |   |
| 00 | 101 |   |   |   |   |
| 00 | 110 |   |   |   |   |
| 00 | 111 |   |   |   |   |
| 01 | 000 |   |   |   |   |
| 01 | 001 |   |   |   |   |
| 01 | 010 |   |   |   |   |
| 01 | 011 |   |   |   |   |
| 01 | 100 |   |   |   |   |
| 01 | 101 |   |   |   |   |
| 01 | 110 |   |   |   |   |
| 01 | 111 |   |   |   |   |

| CONDITIONS | STORED END POINTS |
|---|---|
| FL1 = 1   C1 = 0 | STARTING POINT ON POLYGONAL SIDE |
| FL1 = 1   C1 = 1 | STARTING POINT ON POLYGONAL SIDE   INTERSECTING POINT |
| FL1 = 0   C1 = 0 | NO INTERSECTING POINT |
| FL1 = 0   C1 = 1 | INTERSECTING POINT |

CLIPPING PROCESSOR

BACKGROUND OF THE INVENTION

1. Field of the Invention

The present invention relates to a clipping processor for clipping a polygon unlocated on a screen plane in an image processor for synthesizing and outputting an image signal outputted from an image information supplying source in real time.

2. Description of the Related Art

In an image processor of three-dimensional graphics, polyhedral data are represented as an aggregate of point information in which vertex coordinates of a polyhedron are respectively changed by a transparent projecting transformation to two-dimensional coordinates of X and Y. In such a transparent projecting transformation, a distance between a starting point and each of the vertex coordinates of the polyhedron is calculated in advance. In general clipping processing in the three-dimensional graphics, when an intersecting point of a polygon and a screen is calculated, it is necessary to calculate an intersecting point at a Y-coordinate on a screen boundary in accordance with a complicated formula.

Therefore, it takes much time to perform a clipping operation. Otherwise, large-sized hardware is required.

In a general clipping processor, an acceptable coordinate range is set to be larger than a screen region. Accordingly, a memory having a large capacity is required and a memory access time is increased.

In another clipping processor in which clipping processing can be performed by using small hardware at a high speed, when X and Y addresses on a polygonal side are calculated, all the X-addresses are set to an X-address at a starting point on the screen when the X-addresses are smaller than the X-address at the starting point on the screen. In contrast to this, all the X-addresses are set to an X-address at a terminal point on the screen when all the X-addresses are greater than the X-address at the terminal point on the screen. Further, when the Y-address on the polygonal side is smaller than a Y-address at the starting point on the screen, or is greater than a Y-address at the terminal point on the screen, a data-writing operation is stopped at each of the starting and terminal points shown by the X-address at this Y-address. Thus, it is possible to reduce a hardware amount and perform the clipping processing at a high speed.

The clipping processing and the calculation of X and Y addresses of a polygon are simultaneously executed so that concurrent processing can be performed when the clipping processor is constructed by hardware, thereby operating the clipping processor at a high speed. Further, it is possible to construct the clipping processor by a small hardware amount without requiring any divider, etc. when the clipping processor is constructed by hardware.

A general clipping method can be applied in the case of a polygon in which a polygonal face has a single color. However, no general clipping method can be applied in the case of a mapped polygon in which a pattern is formed on the polygonal face.

Further, in the general clipping method, with respect to a polygon unlocated on a screen face, it is necessary to make an address calculation about each of dots on all polygonal sides, thereby performing many useless processings.

When Z-sorting processing is performed after the clipping processing, an unprocessed polygon is caused by an upper limit of number of polygons processed in the previous Z-sorting processing.

SUMMARY OF THE INVENTION

It is therefore an object of the present invention to provide a clipping processor in which a mapped polygon having a pattern on a polygonal face can be processed at a high speed by using hardware having a small size.

The above object of the present invention can be achieved by a clipping processor comprising a first polygonal end point memory for storing two end point information of X and Y constituting a polygon and respective end point information of internal pattern information; a screen end point arithmetic section for judging whether a polygonal side crosses each of screen end points and is located inside or outside a screen based on the two end point information from the first polygonal end point memory; the screen end point arithmetic section calculating an intersecting point on the polygonal side at each of the screen end points and the polygonal side and calculating each of end point addresses of the internal pattern information at the intersecting point; and a second polygonal end point memory for writing the two end point information and the internal pattern information at the intersecting point calculated by the screen end point arithmetic section at which the polygonal side crosses each of the screen end points.

The screen end point arithmetic section comprises a first differential circuit for subtracting starting point addresses of Y or X from each other at each of the screen end points and each of polygonal sides; the first differential circuit further subtracting a starting point address of X or Y from a terminal point address thereof on each of the polygonal sides to provide a first subtracted value; a differential arithroetic circuit for subtracting the starting point address of X or Y from the terminal point address thereof on each of the polygonal sides to provide a second subtracted value; the differential arithmetic circuit dividing the second subtracted value by the first subtracted value; a second differential circuit for subtracting the starting point address of Y or X from the terminal point address thereof on the polygonal side to provide a third subtracted value; and an arithmetic circuit for multiplying a divided value provided by the differential arithmetic circuit by the third subtracted value; this arithmetic circuit adding this multiplied value to an initial value of X or Y.

The clipping processor further comprises an area encoding processing section for judging an area code with respect to the screen based on the two end point information from the first polygonal end point memory; a screen end point embedding processing section for determining a writing operation in which a polygonal end point is written to the second polygonal end point memory at a screen end point located inside the polygon in accordance with the area code of the area encoding processing section; and a polygonal end point embedding processing section for writing the intersecting point on a screen side and the polygonal side and the end point addresses of the internal pattern information calculated by the screen end point arithmetic section to the second polygonal end point memory.

The clipping processor further comprises a region judging section for judging whether or not the polygonal side is located on a screen face on the basis of the two end point information from the first polygonal end point memory. The two end point information and the internal pattern information at the intersecting point on the polygonal side and the screen face are calculated with respect to only the polygon judged as a polygon having the polygonal side located on the screen face by the region judging section.

As mentioned above, in accordance with the present invention, at a clipping processing time, clipping processing is simultaneously performed with respect to mapping addresses as internal pattern information assigned at a polygonal end point. Accordingly, the clipping processing is performed at a high speed. Further, a method for calculating the mapping addresses as internal pattern information at the clipping time is equal to a mapping processing method for processing the internal pattern information so that no mapping pattern as the internal pattern information is almost deformed at the clipping time.

Further, the operation of the clipping processor is controlled by the region judging device such that no clipping processing is performed with respect to a polygon which does not cross a screen face and is not located inside the screen. Accordingly, no processing of a visible polygon is prevented by an invisible polygon in processings such as Z-sorting processing in which there is an upper limit about the number of polygons.

In the present invention, it is judged whether or not each of the screen end points is located inside the polygon. The clipping processing and the mapping processing of the internal pattern information are performed with respect to only the polygon having each of the screen end points therein. Accordingly, no useless processing is required in picture-drawing or processing of a polygonal side address calculation, thereby performing the clipping and mapping processings at high speeds.

Further objects and advantages of the present invention will be apparent from the following description of the preferred embodiments of the present invention as illustrated in the accompanying drawings.

BRIEF DESCRIPTION OF THE DRAWINGS

FIG. 9 is a view showing the relation in position between a screen face and a polygon;

FIG. 10 is a block diagram showing the entire construction of a clipping processor in the present invention;

FIG. 11 is a table showing one example of a screen address;

FIG. 14 is a table showing one example of the polygonal address in a clipping processing state in the present invention;

FIG. 34 is a view showing an end point area code;

FIG. 35 is a view showing a screen end point embedding condition corresponding to an area code;

FIG. 36 is a view showing a screen end point embedding condition corresponding to an area code;

FIG. 37 is a view showing a screen end point embedding condition corresponding to an area code;

FIG. 38 is a view showing a screen end point embedding condition corresponding to an area code;

FIG. 39 is a table showing one example of a polygonal end point memory;

FIG. 40 is a table showing one example of a screen end point memory;

FIG. 41 is a view showing another example of the polygonal end point memory;

FIG. 48 is a flow chart showing the operation of the polygonal constructing circuit used in the second embodiment of the present invent on;

FIG. 49 is a flow chart showing the operation of the polygonal constructing circuit used in the second embodiment of the present invent on;

DESCRIPTION OF THE PREFERRED EMBODIMENTS

The preferred embodiments of a clipping processor in the present invention will next be described in detail with reference to the accompanying drawings.

Figure 7:
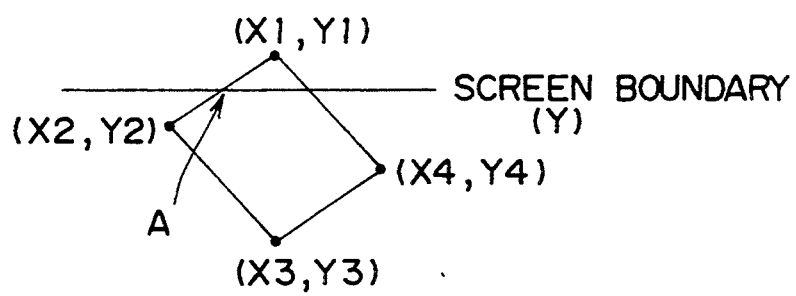
FIG. 7 is a view for explaining a clipping state of the general clipping processor.

In an image processor of three-dimensional graphics, polyhedral data are represented as an aggregate of point information in which vertex coordinates of a polyhedron are respectively changed by a transparent projecting transformation to two-dimensional coordinates of X and Y. In such a transparent projecting transformation, a distance between a starting point and each of the vertex coordinates of the polyhedron is calculated in advance. In general clipping processing in the three-dimensional graphics, when an intersecting point of a polygon and a screen is calculated, end points of the polygon are set to (X1, Y1), (X2, Y2), (X3, Y3), (X4, Y4), etc. as shown in FIG. 7. In this case, it is necessary to calculate an intersecting point A at a Y-coordinate on a screen boundary in accordance with the following complicated formula.

$$A = X2 + \frac{X2 - X1}{Y2 - Y1} \times (Y - Y1)$$

Therefore, it takes much time to perform a clipping operation. Otherwise, large-sized hardware is required.

In the general clipping processor, an acceptable coordinate range is set to be larger than a screen region. Accordingly, a memory having a large capacity is required and a memory access time is increased.

Figure 1:
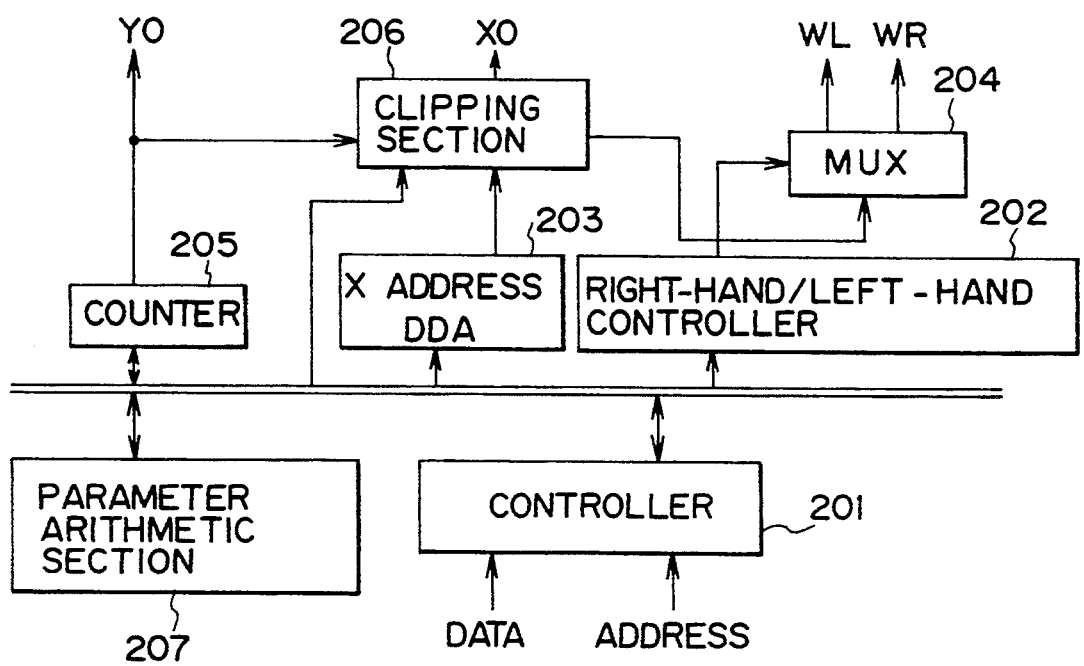
FIG. 1 is a block diagram showing a general clipping processor.

FIG. 1 shows a clipping processor in which clipping processing can be performed by using small hardware at a high speed. In this clipping processor, when X and Y addresses on a polygonal side are calculated, all the X-addresses are set to an X-address at a starting point on the screen when the X-addresses are smaller than the X-address at the starling point on the screen. In contrast to this, all the X-addresses are set to an X-address at a terminal point on the screen when all the X-addresses are greater than the X-address at the terminal point on the screen. Further, when the Y-address on the polygonal side is smaller than a Y-address at the starting point on the screen, or is greater than a Y-address at the terminal point on the screen, a data-writing operation is stopped at each of the starting and terminal points shown by the X-address at this Y-address. Thus, it is possible to reduce a hardware amount and perform the clipping processing at a high speed.

The clipping processing will next be described with reference to FIG. 1.

Figure 2:
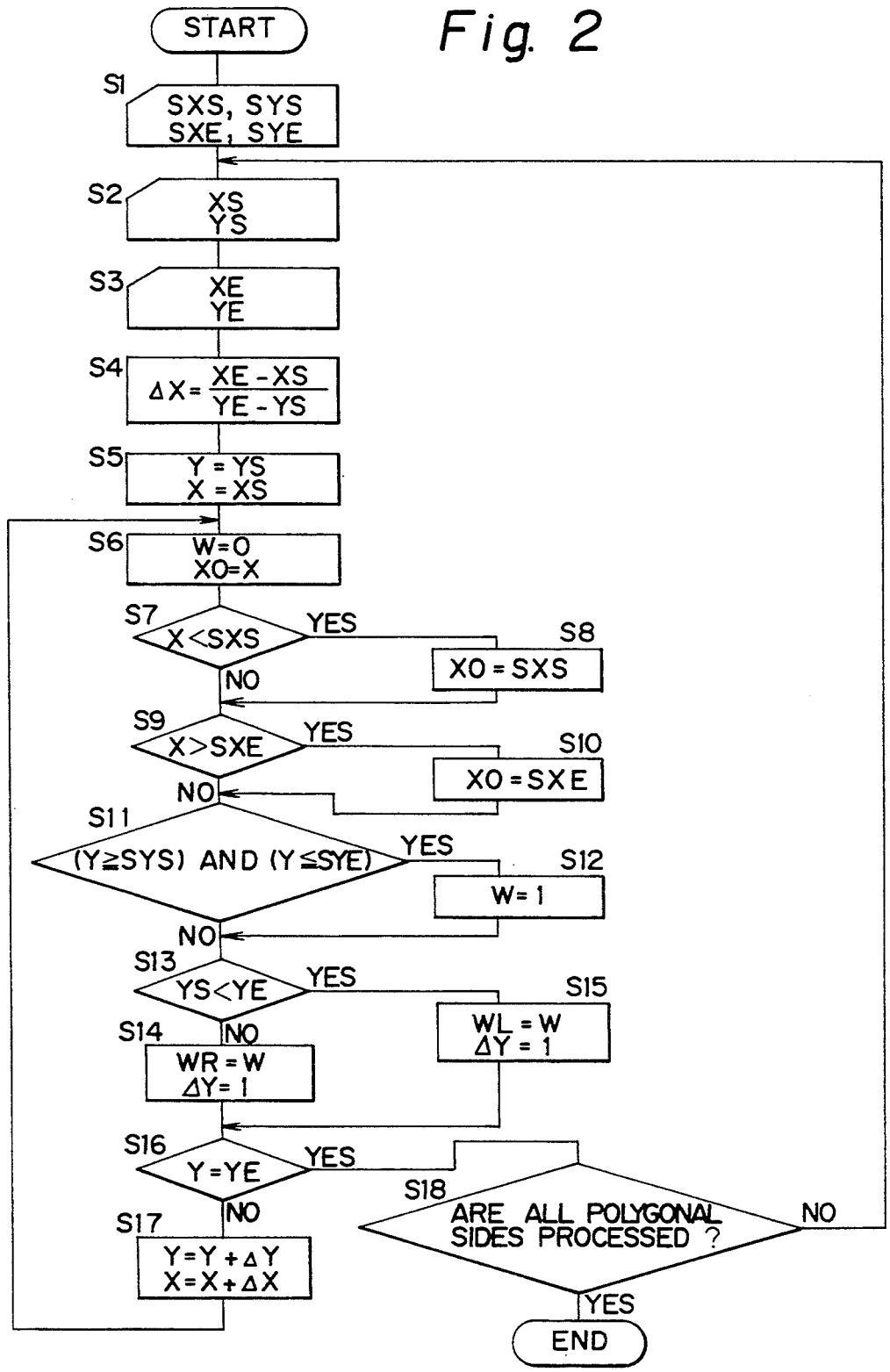
FIG. 2 is a flow chart for explaining an operation of the clipping processor shown in FIG. 1.
Figures 3, 4:
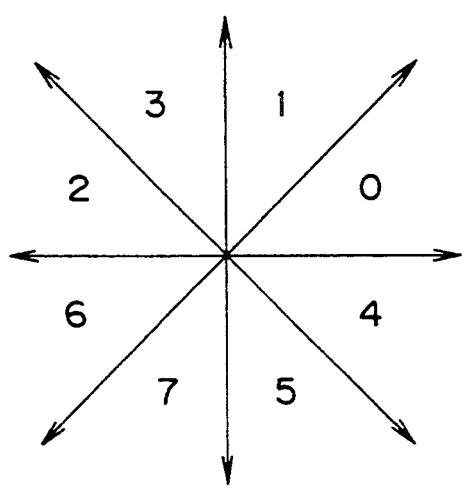
FIG. 3 is a view showing the relation between polygonal side vectors and directions.
FIG. 4 is a table showing the relation between directional vectors and polygonal sides.

A controller 201 controls the operations of respective constructional portions in the clipping processor in accordance with a flow chart shown in FIG. 2. A right-hand/left-hand controller 202 judges whether a given polygonal side is a right-hand or left-hand side as shown in FIG. 4 from a directional vector shown in FIG. 3. The right-hand/left-hand controller 202 then switches write memories.

An address arithmetic section 203 for an X-address makes a digital differential analysis (DDA) between end points from X and Y coordinates at starting and terminal points on the polygonal side. The address arithmetic section 203 then outputs X and Y address values at the end points.

The operation of a multiplexer 204 is controlled by the right-hand/left-hand controller 202. The multiplexer 204 transmits a write signal for writing the. X-address value of the address arithmetic section 203 to one of right-band and left-hand memories.

A counter 205 performs an incremental or decremental operation with respect to a Y-value.

With respect to a clipping section 206, starting and terminal points of X and Y on the screen are set by the controller 201. The clipping section 206 receives the X-address value from the address arithmetic section 203 and a Y-address value from the counter 205. The clipping section 206 thus changes and outputs the X-address value in clipping processing, and transmits the write signal to the multiplexer 204.

A parameter arithmetic section 207 calculates a parameter required to make the digital differential analysis (DDA) with respect to the X-address of the address arithmetic section 203.

An operation of this clipping processor will next be described in accordance with the flow chart shown in FIG. 2 with reference to the block diagram shown in FIG. 1.

Figure 5:
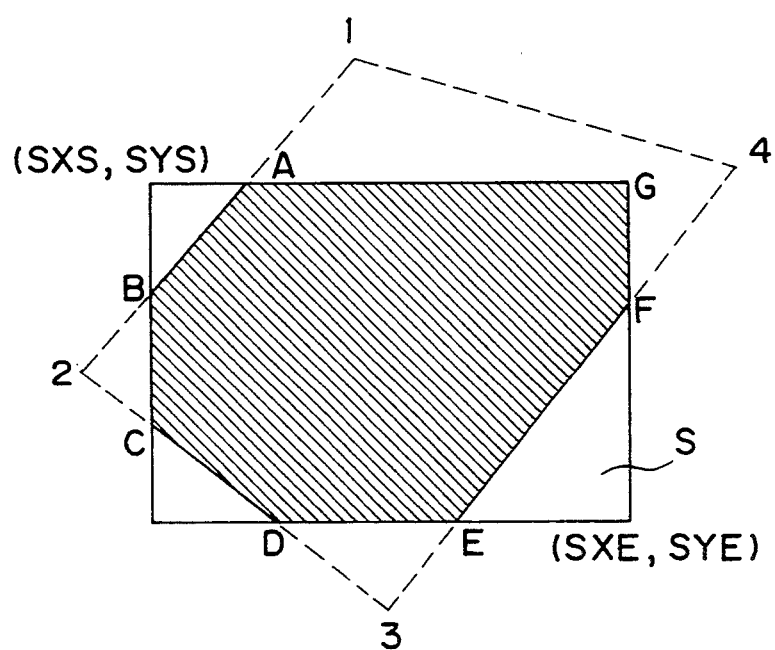
FIG. 5 is a view showing a clipping state of the clipping processor shown in FIG. 1.
Figure 6A:
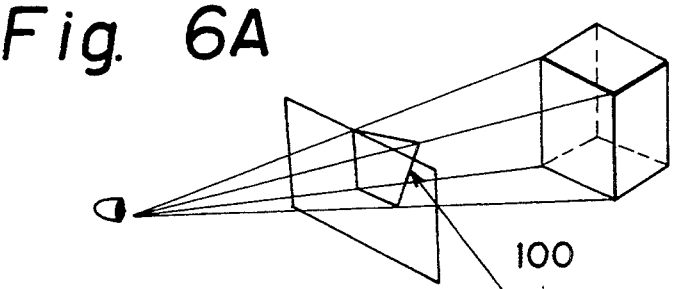
FIG. 6 is a view showing the concept of a clipping operation.
Figure 6B:
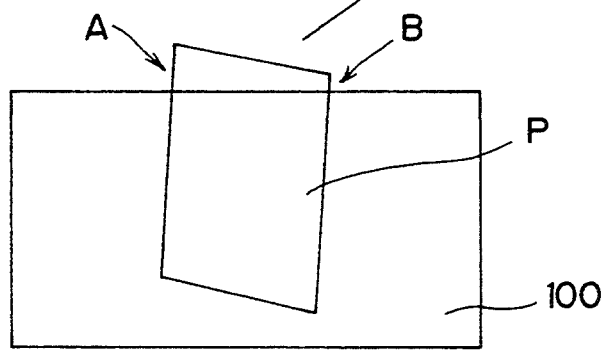
Figure 6C:
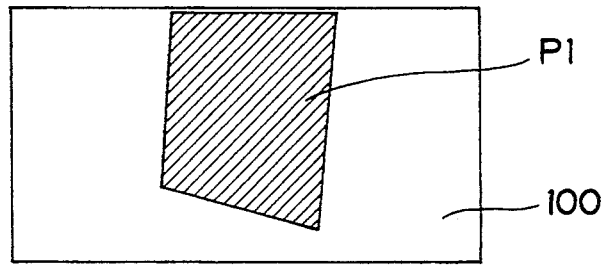

As shown in FIGS. 2 and 5, in a step S1, the controller 201 sets an X-starting point at X and Y coordinates on the screen to an SXS-register of the clipping section 206. The controller 201 also sets a Y-starting point at the X and Y coordinates on the screen to an SYS-register of the clipping section 206. The controller 201 also sets an X-terminal point at the X and Y coordinates on the screen to an SXE-register of the clipping section 206. The controller 201 further sets a Y-terminal point at the X and Y coordinates on the screen to an SYE-register of the clipping section 206.

In a step $2, the controller 201 sets an X-starting point on a polygonal side to an XS-register of the parameter arithmetic section 207. The controller 201 also sets a Y-starting point on the polygonal side to a YS-register of the parameter arithmetic section 207.

In a step S3, the controller 201 also sets an X-terminal point on the polygonal side to an XE-register of the parameter arithmetic section 207. The controller 201 further sets a Y-terminal point on the polygonal side to a YE-register of the parameter arithmetic section 207.

In a step S4, the parameter arithmetic section 207 divides a difference in stored value between the XE-register and the XS-register by a difference in stored value between the YE-register and the YS-register. The parameter arithmetic section 207 sets a divided value to a ΔX-register.

In a step S5, the controller 201 respectively sets stored values of the XS-register and the YS-register in the parameter arithmetic section 207 to an X-register of the X-address arithmetic section 203 and a Y-register of the counter 205.

In a step S6, the clipping section 206 clears the write signal and the controller 201 transfers the stored value of the X-register in the X-address arithmetic section 203 to an XO-register of the clipping section 206.

In a step S7, the clipping section 206 compares the stored value of the X-register in the X-address arithmetic section 203 with a stored value of the SXS-register. When the stored value of the SXS-register is greater than the stored value of the X-register in the X-address arithmetic section 203, the clipping section 206 transfers the stored value of the SXS-register to the XO-register in a step S8.

In a step S9, the clipping section 206 compares the stored value of the X-register in the X-address arithmetic section 203 with a stored value of the SXE-register. When the stored value of the SXE-register is greater than the stored value of the X-register in the X-address arithmetic section 203, the clipping section 206 transfers the stored value of the SXE-register to the XO-register in a step S10.

In a step S11, the clipping section 206 compares the stored value of the Y-register in the counter 205 with a stored value of the SYS-register. The clipping section 206 also compares the stored value of the Y-register in the counter 205 with a stored value of the SYE-register. If the stored value of the Y-register is greater than the stored value of the SYS-register and is smaller than the stored value of the SYE-register, the clipping section 206 makes the write signal active in a step S12 and transmits this write signal to the multiplexer 204.

In a step S13, if a vector on a polygonal side is directed upward (see FIG. 4), the right-hand/left-hand controller 202 controls an operation of the multiplexer 204 in a step S14 such that the write signal is switched to an electric signal WR and a flag Δ Y of the controller 201 is set to value "−1". In contrast to this, if the vector on a polygonal side is directed downward, the right-hand/left-hand controller 202 controls the operation of the multiplexer 204 in a step S15 such that the write signal is switched to an electric signal WL and the flag Δ Y of the controller 201 is set to value "1". A stored value of the XO-register (or an XO-value) is written by making the electric signals WR and WL active to a YO-address of a memory for writing the X-starting point and the X-terminal point every Y-address corresponding to a horizontal scanning line of each of polygons.

In a step S16, the controller 201 compares the stored value of the Y-register in the counter 205 with a stored value of the YIE-register in the parameter arithmetic section 207. If no stored value of the Y-register is equal to the stored value of the YE-register, it proceeds to a step S17. In contrast to this, if the stored value of the Y-register is equal to the stored value of the YE-register, it proceeds to a step S18.

In the step S17, the X-address arithmetic section 203 updates the stored value of the X-register by adding a stored value of the ΔX-register to this X-register value. The counter 205 are incremented and decremented if a stored value of the ΔY-register in the controller 201 is positive and negative, respectively. Then, it proceeds to the step S6.

In the step S18, the controller 201 judges whether all polygonal sides are processed or not. If all the polygonal sides are not completely processed, it proceeds to the step S2. In contrast to this, if all the polygonal sides are completely processed, one polygon has been completely processed.

FIG. 5 shows an example of the clipping processing using the above clipping processor.

A polygon shown in FIG. 5 is constructed by a square polygon having end points 1 to 4. In the clipping processor, no writing operation of a memory is allowed in a region from point 1 to point A on a polygonal side from point 1 to point 2. The normal writing operation of the memory is performed in a region from point A to point B. The XO-value is changed to a stored value of the XS-register (or an XS-value) and is written to this memory in a region from point B to point 2.

The clipping processor changes the XO-value to an XS-value and writes this XS-value to the memory in a region from point 2 to point C on a polygonal side from point 2 to point 3. The clipping processor performs the normal writing operation in a region from point C to point D. No writing operation is allowed in a region from point D to point 3.

In the clipping processor, no writing operation is allowed in a region from point 3 to point E on a polygonal side from point 3 to point 4. The normal writing operation is performed in a region from point E to point F. The XO-value is changed to a stored value of the SXE-register (or an SXE-value) and is written to the above memory in a region from point F to point 4.

In the clipping processor, no writing operation is allowed in an entire region from point 4 to point 1 on a polygonal side.

Polygonal points 1 to 4 are clipped to polygonal points A to G by the above processing.

The above example relates to the clipping processing. Picking processing is similarly performed.

As mentioned above, the clipping processing and the calculation of X and Y addresses of a polygon are simultaneously executed so that concurrent processing can be performed when the clipping processor is constructed by hardware, thereby operating the clipping processor at a high speed. Further, it is possible to construct the clipping processor by a small hardware amount without requiring any divider, etc. when the clipping processor is constructed by hardware.

Figure 16:
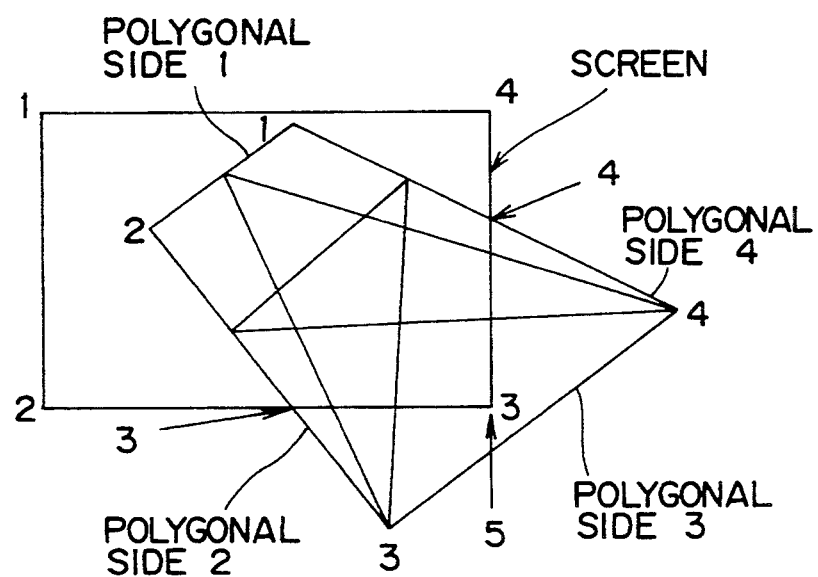
FIG. 16 is a view showing the relation in position between the screen face and a polygon having a pattern.

The general clipping method can be applied in the case of a polygon in which a polygonal face has a single color as shown in FIG. 9. However, no general clipping method can be applied in the case of a mapped polygon in which a pattern is formed on the polygonal face as shown in FIG. 16.

Figure 73:
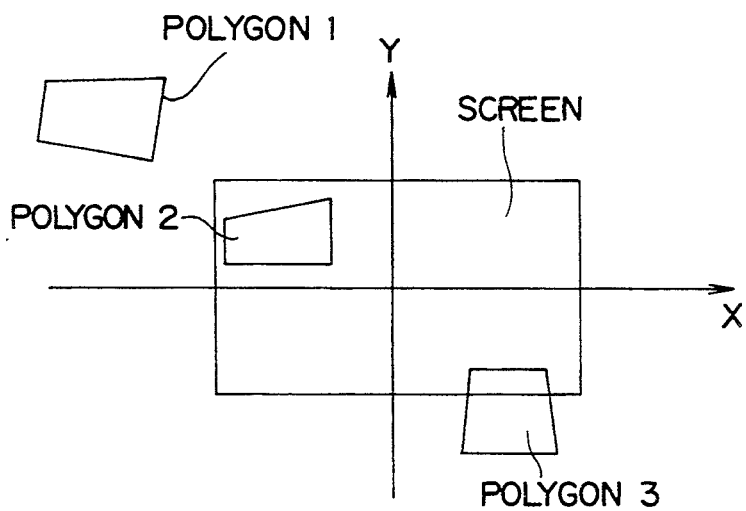
FIG. 73 is a view showing the relation in position between a screen face and each of polygons.

Further, in the general clipping method, with respect to a polygon such as polygon 1 unlocated on a screen face as shown in FIG. 73, it is necessary to make an address calculation about each of dots on all polygonal sides, thereby performing many useless processings.

When Z-sorting is employed for hidden face processing, after the clipping processing, an unprocessed polygon is caused by an upper limit of the number of polygons processed in the previous Z-sorting processing.

The preferred embodiments of a clipping processor in the present invention will next be described in detail with reference to FIGS. 8 to 73.

Basic concepts in the present invention will first be described.

Figures 12, 13:
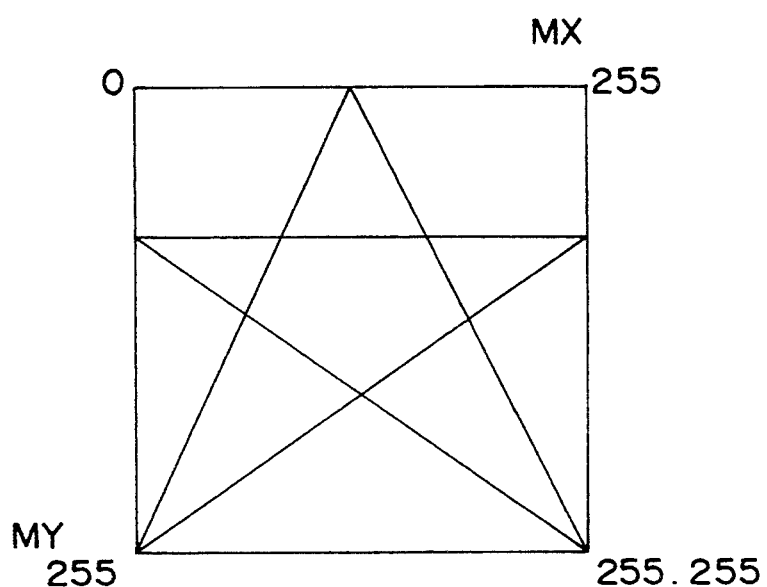
FIG. 12 is a view showing one example of a mapping pattern stored to a mapping memory.
FIG. 13 is a table showing one example of a polygonal address.
Figure 15:
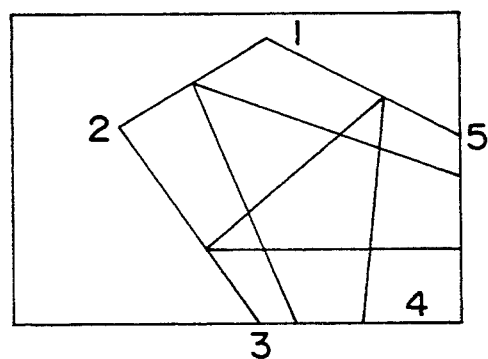
FIG. 15 is a view showing a clipped screen face and a polygonal state in the present invention.

In FIG. 9 or 16, a polygon is partially located outside the screen. Address information shown in FIG. 13 are stored to a mapping memory in accordance with a pattern as shown in FIG. 12. A screen address in this case is shown in FIG. 11 and a polygonal address is shown in FIG. 13. Such a polygon about these addresses is clipped as shown in FIGS. 14 and 15. FIG. 14 shows address information indicative of a clipping state. FIG. 15 shows a state in which a clipping operation of the polygon is completely performed. As shown in FIGS. 14 and 15, it is first judged whether or not a screen end point is located within a polygon when the address information are converted to the polygon located on a screen face from a polygonal end point, an intersecting point on screen and polygonal sides, and the screen end point. If the screen end point is located within the polygon, an address of the mapping memory is calculated.

When each of polygonal sides is clipped one by one, it is judged at a starting point on the polygonal side whether or not the screen end point should be registered as a new polygonal end point in accordance with an area code shown in FIG. 34 and simple screen end point embedding conditions shown in FIGS. 35 to 38. Thereafter, X and Y addresses at the intersecting point on the polygonal and screen sides, and MX and MY addresses of the mapping memory are calculated by a clipping algorithm and are registered as the new polygonal end point. Then, clipping processing is performed with respect to the next polygonal side. The clipping processing is thus executed with respect to all polygonal sides. The clipping operation is performed at a high speed with respect to a polygon which can be mapped and has addresses of the mapping memory at the polygonal end point.

FIG. 10 is a block diagram showing the entire construction of a clipping processor in the present invention.

End point information of a polygon are transmitted from a first polygonal end point memory 10 to a clipping processor 60. The clipping processor 60 transmits the end point information of a new clipped polygon to a second polygonal end point memory 80.

The clipping processor in the present invention will next be described in detail with reference to FIG. 8, etc.

Figure 8:
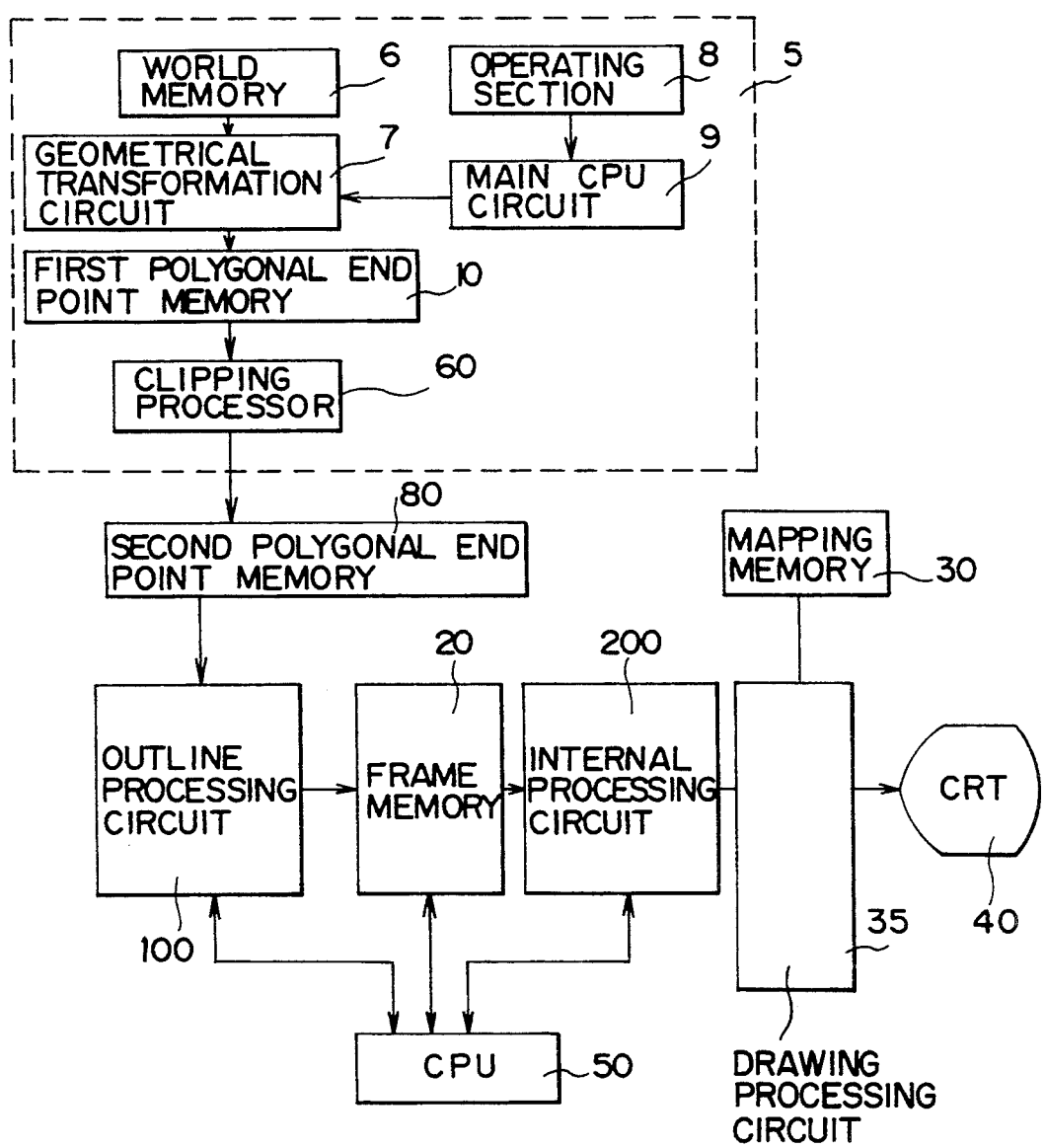
FIG. 8 is a block diagram showing the entire construction of an image processor to which the present invention is applied.

FIG. 8 is a block diagram showing the entire construction of a pseudo three-dimensional image processor using the present invention. For example, this image processor is suitably used in machines for games such as a racing game, a control simulation of an airplane, etc.

The entire construction of this image processor will next be described with reference to FIG. 8.

An image information feeder 5 calculates calculates a simulation image in each of various kinds of conditions during an operation of the image processor and outputs this simulation image to the first polygonal end point memory 10 as information of plural polygons.

The image information feeder 5 has a world memory 6, a geometrical transformation circuit 7 an operating section 8, a main CPU circuit 9 and a clipping processor 60 in the present invention.

In the world memory 6, all objects are represented as an aggregate of the plural polygons. End point information indicative of respective end points of a polygon are stored to this world memory 6. Further, the world memory 6 stores data of color information and end point information of a mapping memory, etc. in which patterns, etc. are formed in accordance with this polygon.

The operating section 8 is constructed by a handle, an accelerator, a brake, etc. An operation of this operating section 8 is converted to an electric signal and this electric signal is outputted to the main CPU circuit 9.

The main CPU circuit 9 receives operating signals indicative of various kinds of operating states outputted from the operating section 8 and the geometrical transformation circuit 7. For example, the main CPU circuit 9 receives information such as "an automobile is accelerated", "the automobile hit against a guard rail", and "the automobile is turned along a road". The main CPU circuit 9 calculates situation data in accordance with these information and outputs the situation data to the geometrical transformation circuit 7.

The geometrical transformation circuit 7 calculates a scene visible to a driver in accordance with the present position of the automobile calculated by the main CPU circuit 9 with reference to various kinds of polygonal data stored to the world memory 6. The geometrical transformation circuit 7 outputs end point information of a polygon geometrically deformed in accordance with this scene to the first polygonal end point memory 10. Namely, the geometrical transformation circuit 7 geometrically transforms vertex coordinates of each of polygons by a transparent projecting transformation and outputs transformed two-dimensional coordinates (X, Y) to the first polygonal end point memory 10.

In such a transparent projecting transformation, a distance from a visual point and each of the polygons is calculated in advance. Then, it is judged whether or not each of the polygons calculated by the transparent projecting transformation is located within a visual field of the driver, i.e., a visual field on the screen. Two-dimensional point information calculated by this transparent projecting transformation are classified every polygon representing a polyhedron. Clipping processing is performed by the clipping processor 60 in the present invention with respect to the figure of a classified polygon located outside the screen. In the clipping processing in three-dimensional graphics, an intersecting point on a screen plane and each of outer polygonal sides is calculated at a time of the polygonal projecting transformation. Thus, the polygon is deformed to a new polygon located on the screen plane.

With respect to a polygon located within the visual field, a typical value of the distance from a visual point to this polygon is determined. A polygon having a smaller typical value of this distance is sequentially outputted to the second polygonal end point memory 80 as a polygon having a higher priority.

The second polygonal end point memory 80 stores the end point information of each of polygons calculated by the geometrical transformation circuit 7. The second polygonal end point memory 80 also stores the end point information of a polygon deformed as the new polygon in the clipping processing. The second polygonal end point memory 80 further stores a shape, a position and a priority of each of the polygons, end point information indicative of a mapping pattern region of a selected basic pattern, color information such as red (R), green (G), blue (B) respectively corresponding to end points of the polygons, brightness information, and other accompanying data.

A mapping memory 30 stores address information of the basic pattern, color information such as red, green and blue respectively corresponding to this basic pattern, brightness information, etc. For example, this mapping memory 30 additionally stores X and. Y addresses in accordance with each of basic patterns as shown in FIGS. 15 and 16, and stores color information data and other accompanying information at each of values of these X and Y addresses.

Two-end point information of X and Y constituting each of the polygons, addresses (MX, MY) at end points of the basic pattern, color information data such as red, green and blue, or brightness information data corresponding to each of the end points, and a Z-value indicative of a priority of each of the polygons are outputted from the second polygonal end point memory 80 to an outline processing circuit 100.

The outline processing circuit 100 transmits end points on each of polygonal sides from the second polygonal end point memory 80 to a memory (RAM) for internal processing. These end points on each of the polygonal sides are shown by starting and terminal point addresses (X1) and (X2) of X, and starting and terminal point addresses (Y1) and (Y2) of Y. The outline processing circuit 100 also transmits starting and terminal point addresses (MX1) and (MX2) of X, and starting and terminal point addresses (MY1) and (MY2) of Y at end points on each of sides constituting the basic pattern to the memory (RAM) for internal processing. Further, the outline processing circuit 100 transmits color information data such as red, green and blue, or brightness information data corresponding to each of the above end points to the memory (RAM) for internal processing. Further, the outline processing circuit 100 transmits the Z-value indicative of a priority of each of the polygons to the memory (RAM) for internal processing.

The outline processing circuit 100 first performs the outline processing of a polygon. To perform this outline processing, a central processing unit (CPU) 50 judges a vector direction on each of the polygonal sides with reference to FIG. 3 on the basis of the starting and terminal point addresses of X and Y on each of polygonal sides read out of the second polygonal end point memory 80. A right-hand or left-hand side of each of the polygons is determined in accordance with this vector direction as shown in FIG. 4.

A distance (DY) in a Y-direction is calculated in accordance with the following formula (1) from the starting and terminal point addresses of Y on each of the polygonal sides read out of the second polygonal end point memory 80.

$$DY = Y2 - Y1 \quad (1)$$

Subsequently, to provide a polygonal outline, an address from an X-terminal point to an X-starting point on each of the polygonal sides is calculated by a digital differential analysis (DDA) using the above distance (DY). This address is stored to a frame memory 20. Namely, a differential value (DDX) is calculated in accordance with the following formula (2), $$DDX = \frac{X2 - X1}{DY} \quad (2)$$

Then, an X-address from the X-terminal point to the X-starting point on each of the polygonal sides is calculated by making an interpolating calculation as shown by the following formula (3).

$$X = X + DDX \quad (3)$$

An initial value of X in the formula (3) is shown by the X-starting point (X1) and the interpolating calculation shown by the formula (3) is repeatedly made from zero to the distance (DY). The number of Y-addresses is increased or incremented one by one from the starting point address (Y1) of Y until the above distance (DY).

The outline processing circuit 100 further performs the outline processing of internal pattern information. In the outline processing of the internal pattern information, end point addresses (MX, MY) of a basic pattern stored to the second polygonal end point memory 80 are changed when the basic pattern is deformed. Brightness information data provided at each of the end points of a polygon are changed when the polygon is shaded. Further, color information data provided at each of the end points of the polygon are changed when color information such as red, green and blue are changed. The outline processing circuit 100 performs the same outline processing with respect to the end point addresses of the basic pattern, the brightness information data and the color information data. Therefore, in the following description, these outline processings will be explained by using reference numeral I as a whole.

Data (DIX) and (IX) corresponding to the polygon are calculated by the digital differential analysis (DDA) from addresses of the basic pattern or shading information data, and end point information data (I) as color information data read out of the second polygonal end point memory 80 in accordance with the following formulas (4) and (5).

$$DIX = \frac{IX2 - IX1}{DY} \quad (4)$$

$$IX = IX + DIX \quad (5)$$

The calculated data are stored to the frame memory 20. Namely, data from terminal point data to starting point data on each of the polygonal sides are calculated by the digital differential analysis (DDA) and are stored to the frame memory 20. Differential value (DIX) of these calculated data is first calculated as shown by the formula (4). Then, data (IX) from a terminal point to a starting point on each of the polygonal sides are calculated by making an interpolating calculation as shown by the formula (5). An initial value of the data (IX) in the formula (5) is shown by data at the starting point. The interpolating calculation shown by the formula (5) is repeatedly made from zero to the distance (DY).

When outline addresses (MX, MY) of the basic pattern are converted, reference numeral I in the formulas (4) and (5) is read as processings of MX and MY. Thus, a polygonal outline and address information of an outline of a basic pattern deformed on the basis of the polygonal outline are stored to the frame memory 20 in accordance with the formulas (1) to (5).

When shading information are converted, reference numeral I designates processing of the shading information data and the shading information are deformed in accordance with the formulas (1) to (5). The deformed data are stored to the frame memory 20.

When color information of red, green and blue are converted, reference numeral I in the formulas (4) and (5) is read as processings of red, green and blue. Thus, the respective color information are deformed in accordance with the formulas (1) to (5) and are stored to the frame memory 20.

The above-mentioned processings can be independently performed, and can be also performed in combination with various kinds of processings for shading the basic pattern and adding color information in accordance with necessity.

In this embodiment, a polygonal outline, address information of an outline of a basic pattern deformed on the basis of this polygonal outline, color information or shading information are stored to the frame memory 20 every Y-address indicative of a vertical position on a horizontal scanning line in synchronization with the horizontal scanning line.

An internal figure-drawing processing circuit (or an internal processing circuit) 200 reads X and Y addresses between two opposite polygonal sides out of the frame memory 20. The internal figure-drawing processing circuit 200 then calculates an address of each of bit patterns inside a polygon as an internal pattern address based on these read address information in accordance with the above formula (5) and the following formula (6).

$$DXY = X2(Y) - X1(Y) \quad (6)$$

Namely, in this embodiment, starting and terminal points (X1) and (X2) of X indicative of an outline of the polygon and corresponding to the Y-address indicative of the vertical position, mapping addresses (MX, MY) provided by deforming the basic pattern, deformed color information data (R, G, B), or deformed shading information data are read out of the frame memory 20 in synchronization with a horizontal scanning signal.

As shown by the formula (6), a distance (DXY) in an X-direction is calculated from the starting and terminal point addresses of X read out of the frame memory 20. Internal pattern data corresponding to the polygon are calculated to deform the basic pattern or the shading information in accordance with a polygonal shape by the digital differential analysis (DDA) using this distance (DXY). These internal pattern data are calculated from the end point mapping addresses of the basic pattern, the color information data, or the shading information data read out of the frame memory 20 in accordance with the following formulas (7) and (8).

$$DDT = \frac{I2(Y) - I1(Y)}{DXY} \quad (7)$$

-continued $$T = DDT \times X + \Pi(Y) \quad (8)$$

Data from the terminal point to the starting point every Y-address are calculated by the digital differential analysis (DDA) using the distance (DXY) calculated in the formula (6) to provide the internal pattern data of the polygon. Namely, a differential value (DDT) is calculated in accordance with the formula (7). Further, data (T) from the terminal point to the starting point on a Y-axis are calculated by making an interpolating calculation as shown by the formula (8). An initial value of X in this formula (8) is shown by the starting point and the interpolating calculation shown by the formula (8) is repeatedly made from zero to the distance (DXY).

Similar to the above outline processing circuit 100, the internal figure-drawing processing circuit 200 changes end point addresses (MX, MY) of a basic pattern stored to the frame memory 20 when the basic pattern is deformed. The internal figure-drawing processing circuit 200 changes brightness information data provided at each of end points of a polygon when the polygon is shaded. Further, when color information such as red, green and blue are changed, the internal figure-drawing processing circuit 200 changes color information data provided at each of the end points of the polygon. The internal figure-drawing processing circuit 200 performs the same outline processing with respect to the end point addresses of the basic pattern, the brightness information data and the color information data. Therefore, in the following description, these outline processings will be explained by using reference numeral T as a whole.

In accordance with the formulas (7) and (8), data (DDT) and (T) corresponding to the polygon are calculated by the digital differential analysis (DDA) from addresses of the basic pattern or shading information data, and end point information data (T) as color information data read out of the first polygonal end point memory 10. Namely, data from terminal point data to starting point data on each of polygonal sides are calculated by the digital differential analysis (DDA). A differential value (DDT) of these data is first calculated in accordance with the formula (7). Then, data from a terminal point to a starting point on each of the polygonal sides are calculated by making an interpolating calculation as shown by the formula (8). An initial value of X in the formula (8) is shown by data at the starting point. The interpolating calculation shown by the formula (8) is repeatedly made from zero to the distance (DXY).

When addresses (MX, MY) of the basic pattern are converted, reference numeral T in the above formulas (7) and (8) is read as two processings of MX and MY. Thus, the internal address information of a deformed basic pattern are transmitted to a drawing processing circuit 35.

When shading information are converted, reference numeral T designates processing of the shading information data and the shading information are deformed in accordance with the formulas (7) and (8). The deformed data are transmitted to the drawing processing circuit 35.

When color information of red, green and blue are converted, reference numeral T in the above formulas (7) and (8) is read as processings of red, green and blue.

Thus, the respective color information are deformed and transmitted to the drawing processing circuit 35.

An X-address SX as a screen address for displaying data by a CRT 40 is calculated by X1+X.

To display data by the CRT 40, the drawing processing circuit 35 reads a matching pattern address of a polygon having a higher priority order every X-address at a Y-address corresponding to a horizontal scanning signal. This polygon having a higher priority order is a polygon having a smaller Z-value indicative of the priority order. The drawing processing circuit 35 designates an address of the mapping memory 30 in accordance with this matching pattern address. The drawing processing circuit 35 then reads information corresponding to this designated address by using the mapping memory 30 as a lookup table. This information is displayed by the CRT 40. Thus, it is possible to deform and display a basic pattern shown in FIG. 12 in accordance with a polygonal shape shown in FIG. 15.

When only shading or color information are added, the drawing processing circuit 35 reads an address of a polygon having a higher priority order every X-address at a Y-address corresponding to the horizontal scanning signal. This polygon having a higher priority order is a polygon having a smaller Z-value indicative of the priority order. A change in shade or color corresponding to the polygonal shape is caused by reading the shading information or the color information every read address.

In the image processor schematically constructed above, the above operations of the outline processing circuit 100, the frame memory 20, the internal drawing processing circuit 200, etc. are controlled by the CPU 50.

Figure 17:
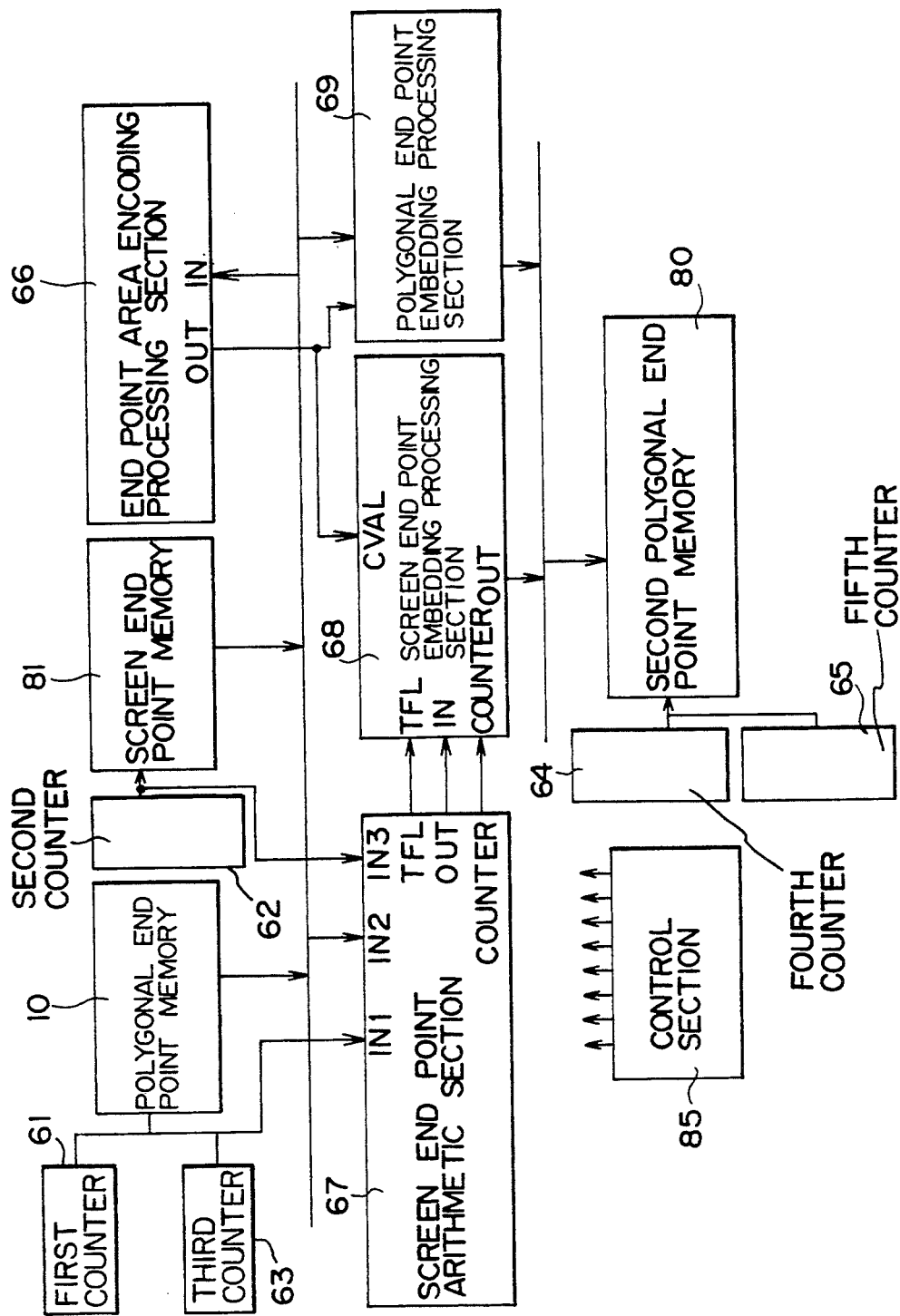
FIG. 17 is a block diagram showing the construction of a clipping processor in accordance with a first embodiment of the present invention.

FIG. 17 is a block diagram showing the construction of a clipping processor in accordance with a first embodiment of the present invention.

In FIG. 17, a first counter 61 indicates an upper address of a first polygonal end point memory 10 showing a number every polygon. A third counter 63 indicates a lower address of the first polygonal end point memory 10 showing a number provided at a polygonal end point.

As shown in an example of FIG. 39, the number every polygon is stored to the upper address of the first polygonal end point memory 10. The number provided at a polygonal end point is stored to the lower address of the first polygonal end point memory 10. Further, the first polygonal end point memory 10 stores X and Y addresses of a polygonal figure every polygonal end point and MX and MY addresses of a mapping memory.

A second counter 62 gets access to a screen end point memory 81. As shown in an example of FIG. 40, the screen end point memory 81 stores X and Y addresses every end point on the screen.

An end point area encoding processing section 66 outputs area codes at X and Y addresses at a polygonal end point provided in accordance with an area code table shown in FIG. 34. A detailed concrete example of this end point area encoding processing section 66 will be described later.

A screen end point arithmetic section 67 judges whether each of screen end points is located inside or outside a polygon. If each of the screen end points is located inside the polygon, the screen end point arithmetic section 67 calculates addresses NIX and MY of the mapping memory. A detailed concrete example of the screen end point arithmetic section 67 will be described later.

A screen end point embedding processing section 68 judges whether each of the screen end point embedding conditions shown in FIGS. 35 to 38 is satisfied or not. If each of these conditions is satisfied, the screen end point embedding processing section 68 writes X and Y addresses of the screen end point to a second polygonal end point memory 80. In FIGS. 35 to 38, number "0" designates a screen region. Each of the above conditions is provided as follows. In a condition about screen end point 1, a polygonal starting point is located within a region shown by ④, ⑤, ① and ⑨ in FIG. 35 and no screen end point is yet registered as a polygonal end point. In a condition about screen end point 2, the polygonal starting point is located within a region shown by ①, ⑨, ⑧ and ⑩ in FIG. 36 and no screen end point is yet registered as a polygonal end point. In a condition about screen end point 3, the polygonal starting point is located within a region shown by ⑧, ⑩, ② and ⑥ in FIG. 37 and no screen end point is yet registered as a polygonal end point. In a condition about screen end point 4, the polygonal starting point is located within a region shown by ②, ⑥, ④ and ⑤ in FIG. 38 and no screen end point is yet registered as a polygonal end point. A detailed concrete example of the screen end point embedding processing section 68 will be described later.

A polygonal end point embedding processing section 69 calculates X and Y addresses at an intersecting point on polygonal and screen side and also calculates addresses MX and MY of the mapping memory. The polygonal end point embedding processing section 59 writes these addresses to the second polygonal end point memory 80. A detailed concrete example of the polygonal end point embedding processing section 69 will be described later.

As shown in FIG. 41, the second polygonal end point memory 80 stores X and Y addresses at an end point of a clipped polygon and also stores addresses MX and MY of the mapping memory.

A fourth counter 64 indicates a lower address of the second polygonal end point memory 80 showing a number provided at a polygonal end point.

Figure 18:
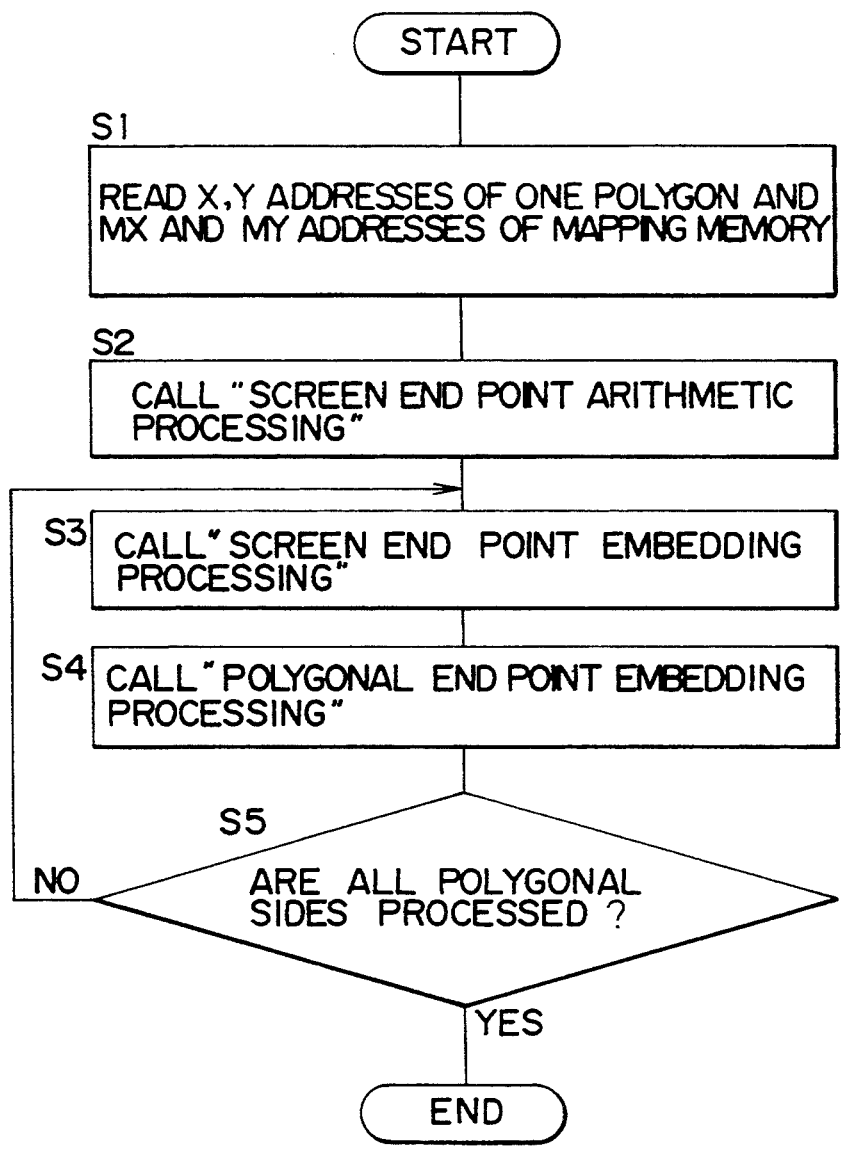
FIG. 18 is a flow chart for explaining the operation of a controller disposed in the clipping processor in the first embodiment of the present invention.

A controller section 85 performs a control operation in accordance with a flow chart shown in FIG. 18.

A fifth counter 65 indicates an upper address of the second polygonal end point memory 80 showing a number every polygon.

The screen end point arithmetic section 67 will first be described in detail with reference to FIGS. 19 to 23.

Figure 19:
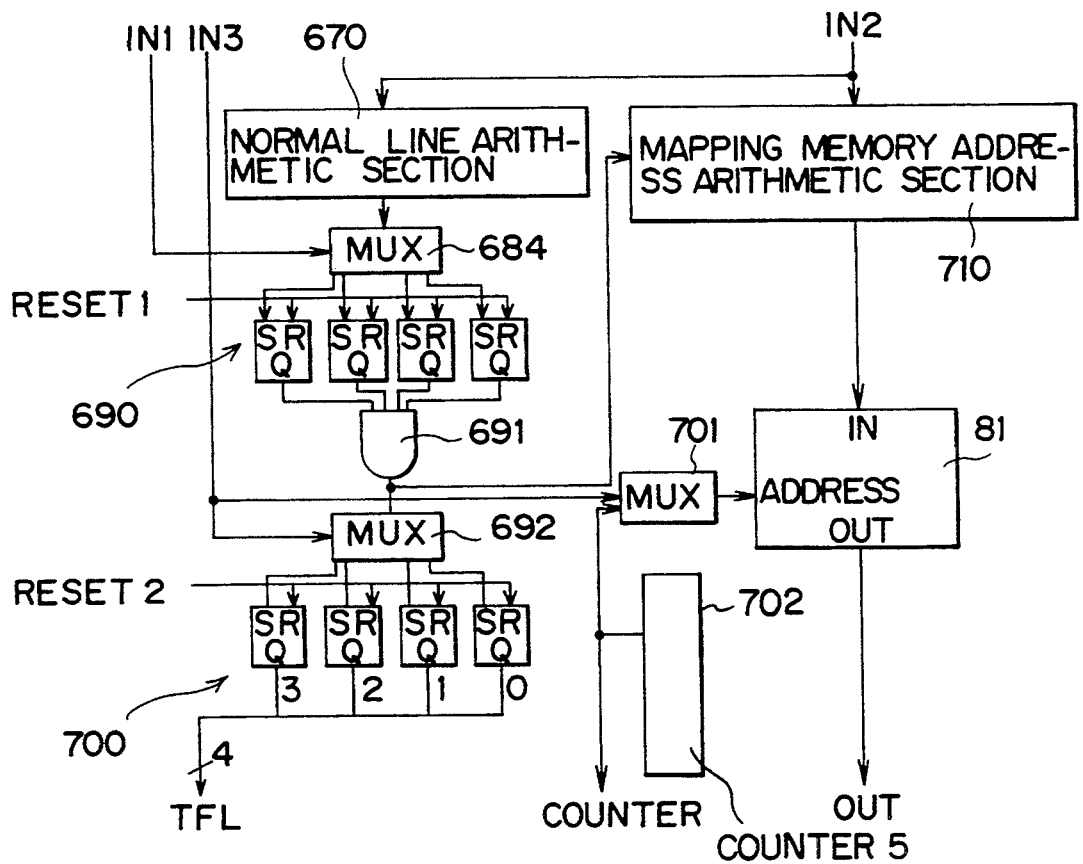
FIG. 19 is a block diagram showing a screen end point arithmetic section disposed in the clipping processor in the first embodiment of the present invention.
Figure 20:
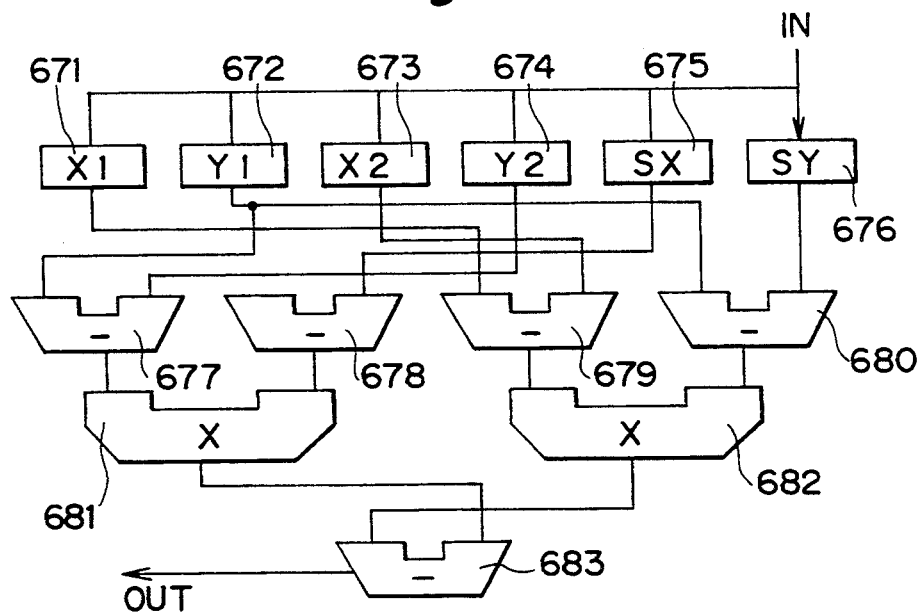
FIG. 20 is a circuit diagram showing one example of a normal line arithmetic section disposed in the clipping processor in the first embodiment of the present invention.
Figure 21:
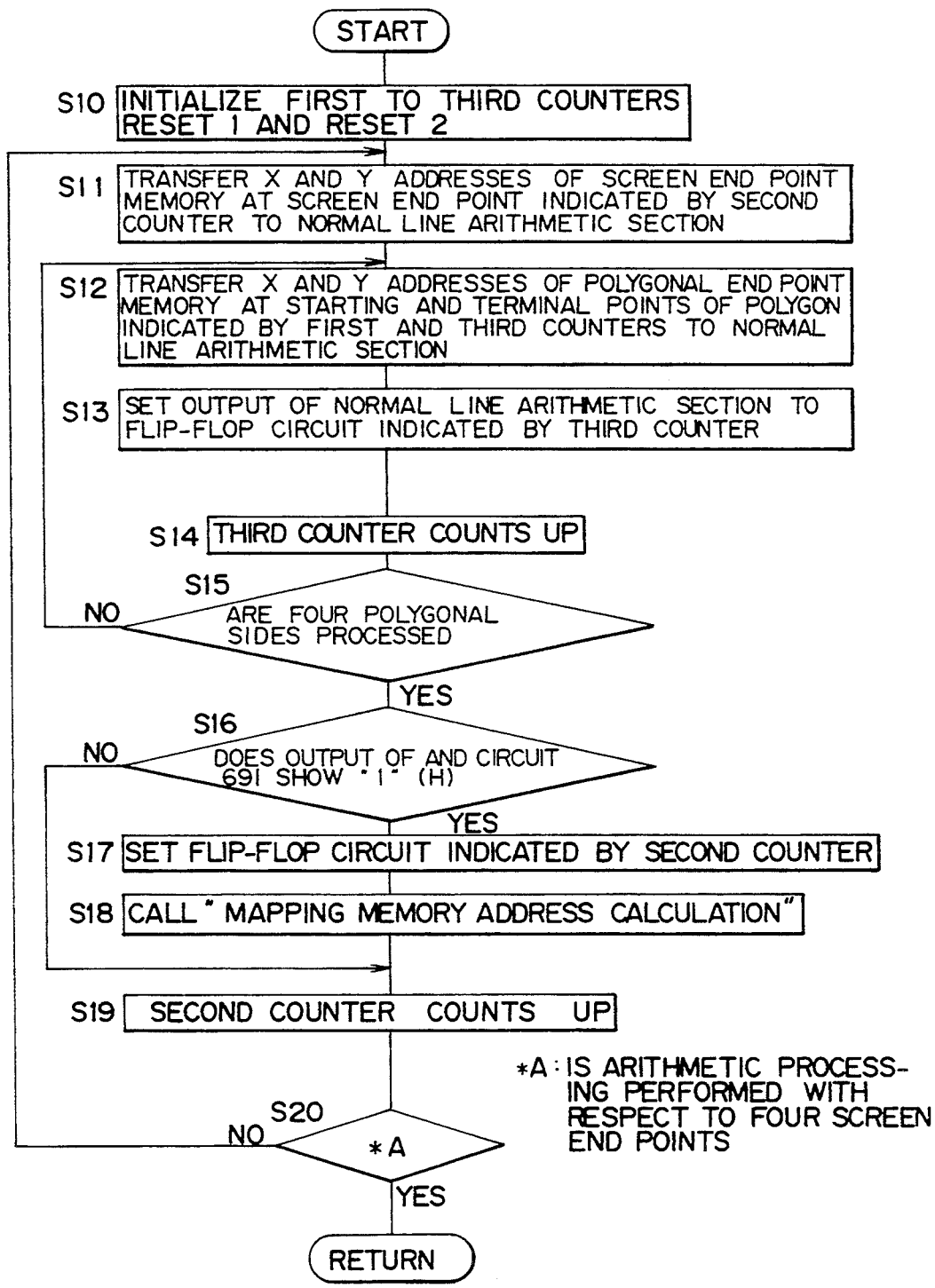
FIG. 21 is a flow chart for explaining a screen end point calculating operation in the first embodiment of the present invention.
Figure 22:
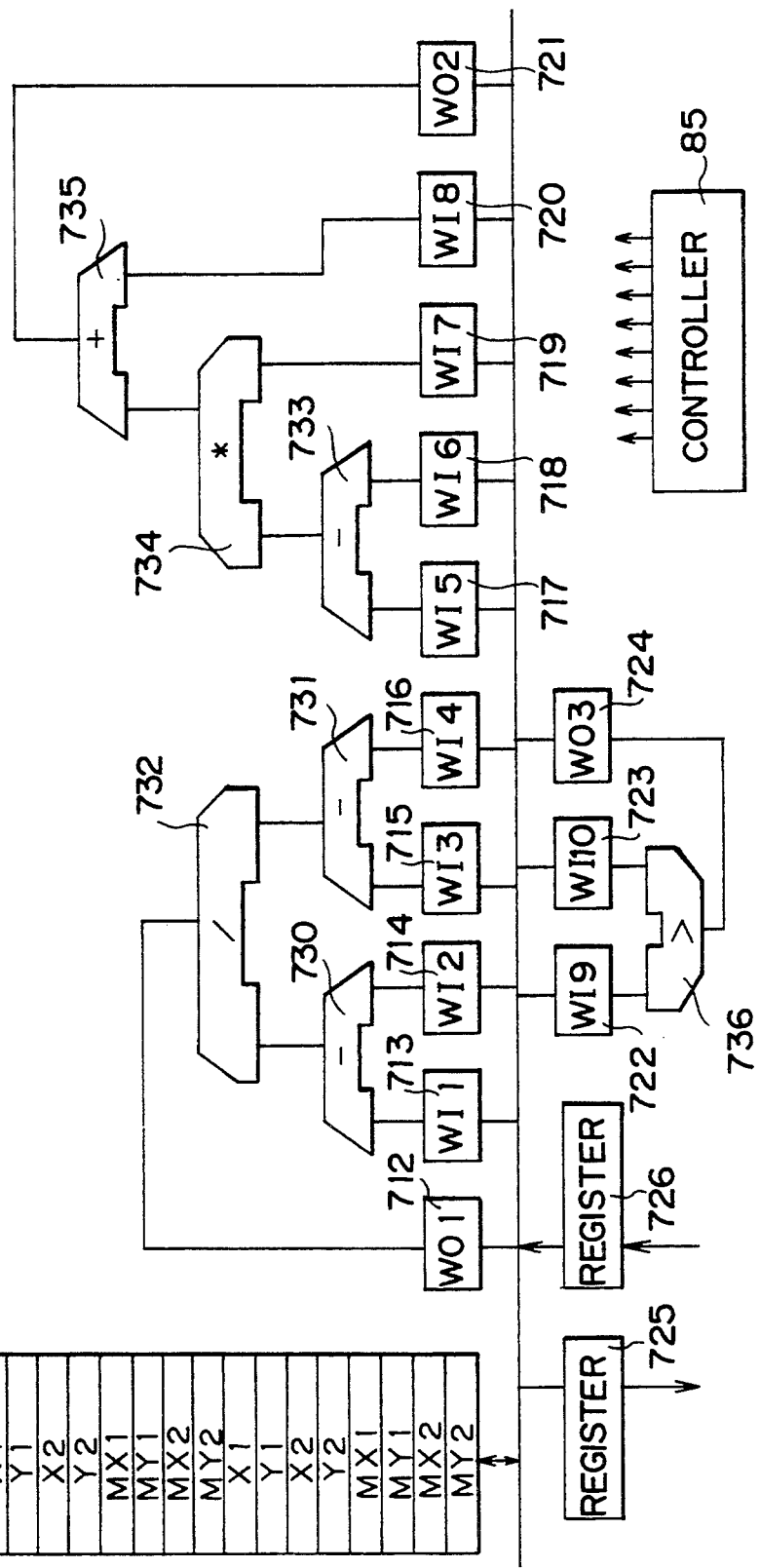
FIG. 22 is a block diagram showing a mapping memory address end point arithmetic section disposed in the clipping processor in the first embodiment of the present invention.
Figure 23:
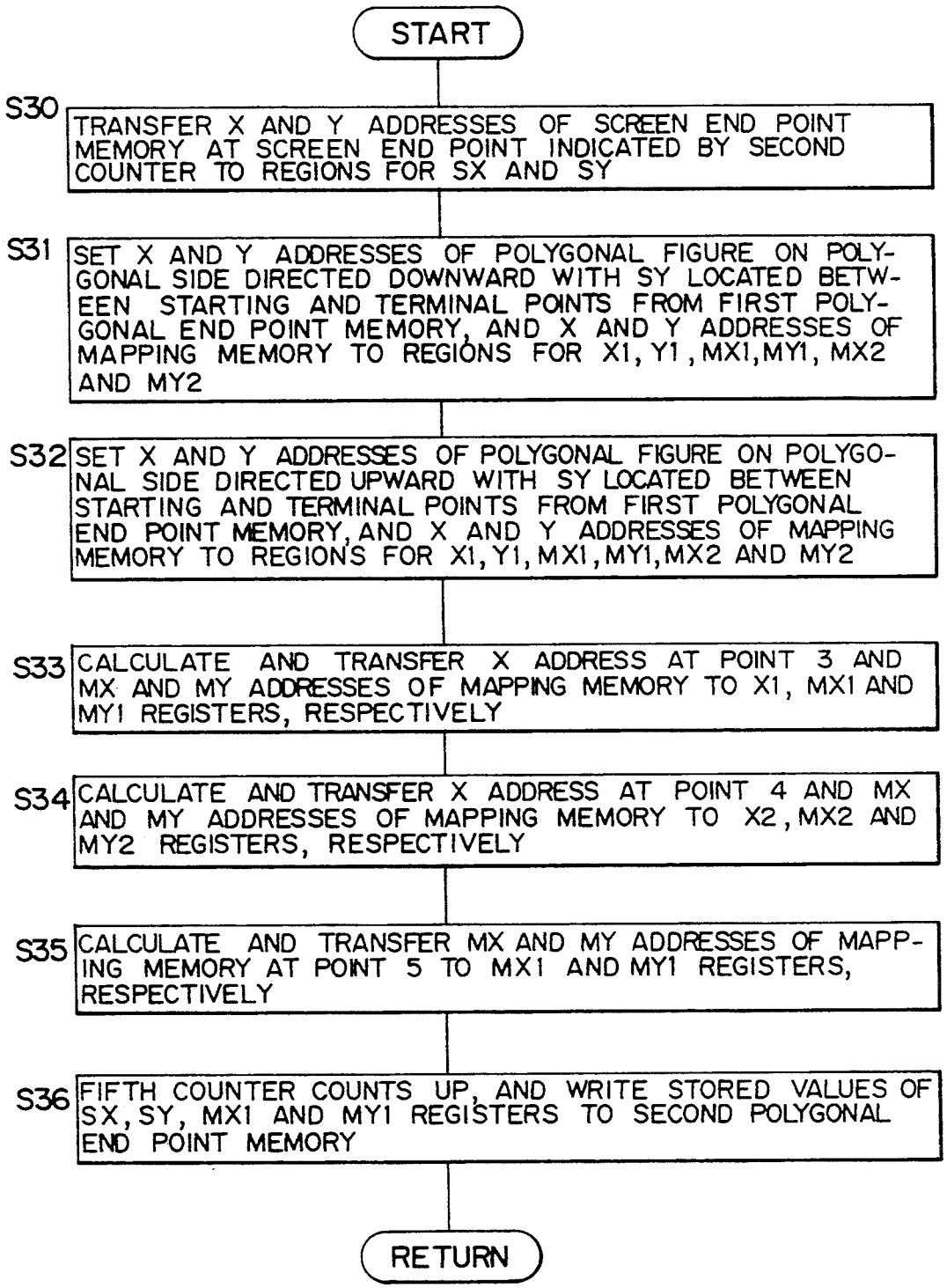
FIG. 23 is a flow chart for explaining a mapping memory address end point calculating operation in the first embodiment of the present invention.

FIG. 19 is a block diagram showing an entire construction of the screen end point arithmetic section 67. FIG. 20 is a block diagram showing a normal line arithmetic section. FIG. 21 is a flow chart showing an operation for calculating a screen end point. FIG. 22 is a block diagram showing the construction of a mapping memory address arithmetic section. FIG. 23 is a flow chart showing an operation of the mapping memory address arithmetic section.

The screen end point arithmetic section 67 stores X and Y addresses at a screen end point provided from the first polygonal end point memory 10 to an internal register of the normal line arithmetic section 670 shown in FIG. 19. The screen end point arithmetic section 67 calculates a normal line with respect to each of polygonal sides and transmits calculated results to a multiplexer 684. This multiplexer 684 transmits and stores calculated results to a flip-flop circuit 690 corresponding to each of the polygonal sides from counting data of the first and third counters 61 and 63. It is judged whether or not each of the polygonal sides is located inside the screen end point in accordance with an operating state of the flip-flop circuit 690. Namely, it is judged whether or not the screen end point is located inside each of the polygonal sides in accordance with the operating state of the flip-flop circuit 690. If the screen end point is located inside a polygonal side, outputs of all flip-flop circuits 690 show value "1" so that an AND circuit 691 outputs value "1" to a multiplexer 692. An output of a screen end point memory 81 is also transmitted to the multiplexer 692. An output value of a flip-flop circuit 700 selected by the multiplexer 692 and corresponding to the screen end point is set to value "1" by the above output of the AND circuit 691. Thus, this output value "1" of the flip-flop circuit 700 indicates that the screen end point is located inside the polygon. An output TFL of the flip-flop circuit 700 is transmitted to the screen end point embedding processing section 68.

When the outputs of all the flip-flop circuits 690 show value "1" and the AND circuit 691 outputs value "1", a screen end point address is transmitted to a mapping memory address arithmetic section 710.

As shown in FIG. 20, the normal line arithmetic section 670 has registers 671 to 674 and registers 675 and 676. The registers 671 to 674 stores address values at starting and terminal points of X and Y from the first polygonal end point memory 10 on each of polygonal sides. The registers 675 and 676 stores X and Y address values of the screen end point memory 81. The stored values of the respective registers are transmitted to subtracters 677 to 680. Namely, the stored values of the registers 672 and 674 are inputted to the subtracter 677 and this subtracter 577 calculates Y1−Y2. The stored values of the registers 671 and 673 are inputted to the subtracter 679 and this subtracter 679 calculates X1−X2. The stored values of the registers 672 and 676 are inputted to the subtracter 680 and this subtracter 680 calculates Y1−SY. The stored values of the registers 671 and 675 are inputted to the subtracter 678 and this subtracter 678 calculates X1−SX.

Subtracted values of the subtracters 677 and 578 are inputted to a multiplier 681 and multiplied results of this multiplier 681 are inputted to a subtracter 583. Subtracted values of the subtracters 679 and 680 are inputted to a multiplier 682 and multiplied results of this multiplier 682 are inputted to the subtracter 683. An output of this subtracter 683 is transmitted as calculated results of the normal line arithmetic section 570.

An operation of the above screen end point arithmetic section 67 will next be described with reference to FIG. 21.

When the screen end point arithmetic section 57 is started, the first to third counters 61 to 63 are first initialized and the flip-flop circuits 690 and 700 are reset in a step S10.

Subsequently, X and Y addresses at a screen end point of the screen end point memory 81 indicated by the second counter 62 are transferred to the normal line arithmetic section 670. These transferred X and Y addresses at the screen end point are respectively stored to the SX-register 675 and the SY-register 676 of the normal line arithmetic section 670 in a step S11.

Then, X and Y addresses at starting and terminal points of a polygonal figure in the first polygonal end point memory 10 indicated by the first and third counters 61 and 63 are transferred to the normal line arithmetic section 670. These transferred X and Y addresses at the starting and terminal points are stored to the registers 671 to 674 of the normal line arithmetic section 670 in a step S12.

Thereafter, in a step S13, a normal line is calculated with respect to each of polygonal sides and an output of the normal line arithmetic section 670 is stored to the flip-flop circuit 690 corresponding to each of the polygonal sides and indicated by the third counter 63.

In a step S14, the third counter 63 counts up. It is then judged whether four polygonal sides are completely processed or not. When no four polygonal sides are completely processed, it is returned to the above step S12 and the above operation is repeatedly performed until the four polygonal sides have been completely processed. When the four polygonal sides have been completely processed, it is judged in a step S16 whether an output of the AND circuit 691 shows value "1" or not. When the output of the AND circuit 691 shows value "1", it proceeds to a step S17. In contrast to this, when no output of the AND circuit 691 shows value "1", it proceeds to a step S19.

In the step S17, the flip-flop circuit 700 indicated by the second counter 62 is set and it proceeds to a step S18.

In the step S18, an address of the mapping memory is calculated as described later.

In the step S19, the second counter 62 counts up and it proceeds to a step S20.

In the step S20, it is judged whether processing about four end points on the screen is completed or not. When no processing about four end points on the screen is completed, it is returned to the step S11 and the above operation is repeatedly performed. When the processing about four end points on the screen is completed, processing for calculating the end points on the screen has been completed.

The mapping memory address arithmetic section 710 will next be described.

The mapping memory address arithmetic section 710 is constructed by hardware as shown in FIG. 22 and is operated in accordance with a flow chart shown in FIG. 23.

For example, as shown by polygons and the screen in FIG. 16, the mapping memory address arithmetic section 710 searches two polygonal sides directed downward and upward between starting and terminal points on a polygonal side with respect to a screen end point. In the example shown in FIG. 16, an address value of the mapping memory at a point shown by reference numeral (5) is calculated from MX and MY address values of the mapping memory on polygonal sides 3 and 4. This calculated address value is written to an address of the screen end point memory 81 corresponding to the screen end point.

The X and Y addresses at the screen end point and the X and Y addresses at the starting and terminal points on the polygonal side are respectively stored to predetermined regions of a working memory 711 through a register 726 from the first polygonal end point memory 10 and the screen end point memory 81. Further, the MX and MY address values of the mapping memory on the polygonal sides 3 and 4 are also stored to predetermined regions of the working memory 711 through the register 726 from the first polygonal end point memory 10 and the screen end point memory 81.

The processing about polygonal side 3 will first be described. Respective data read out of the working memory 711 are written to registers 713 to 720, 722 and 723 used as working registers WI1 to WI10. Namely, a screen end point address SY is transmitted from the working memory 711 to the register 713. A Y-starting point address Y1S is transmitted from the working memory 711 to the register 714. A subtracter 730 subtracts the Y-starting point address Y1S from the screen end point address SY. A Y-terminal point address Y1E and the Y-starting point address Y1S are transmitted from the working memory 711 to the registers 715 and 716. A subtracter 731 subtracts the Y-starting point address Y1S from the Y-terminal point address Y1E. An output (SY−Y1S) of the subtracter 730 and an output (Y1E−Y1S) of the subtracter 731 are transmitted to a divider 732. A divided value (SY−Y1S)/(Y1E−Y1S) of this divider 732 is stored to a register 712.

An address MX1E of the mapping memory is transmitted to a register 717 and an address MX1S of the mapping memory is transmitted to a register 718. A subtracter 733 subtracts the mapping memory address MX1S from the mapping memory address MX1E. An output (MX1E−MX1S) of the subtracter 733 is inputted to a multiplier 734. The above divided value (SY−Y1S)/(Y1E−Y1S) is inputted to a register 719 and is further transmitted to the multiplier 734 through the register 719. The multiplier 734 multiplies (SY−Y1S)/(Y1E−Y1S) by (MX1E−MX1S). A multiplied value {(SY−Y1S)/(Y1E−Y1S)}*(MX1E−MX1S) of the multiplier 734 is added by an adder 735 to address MX1S stored to a register 720. An added value of the adder 735 is stored to a register 721. This added value is provided as a mapping address (MX) at a point shown by reference numeral (5) in FIG. 16. After this added value is stored to the register 721, this mapping address is stored to the working memory 711 as a new mapping memory address MX.

With respect to a mapping memory address (MY) at the point shown by reference numeral (5) in FIG. 16, an address MY1S is transmitted to the register 720. This address MY1S is added by the adder 735 to the multiplied value ((SY−Y1S)/(Y1E−Y1S)}*(MX1E−MX1S) of the multiplier 734. An added value of the adder 735 is stored to the register 721. This added value is provided as the mapping address (MY) at the point shown by reference numeral (5) in FIG. 16. After this added value is stored to the register 721, this mapping address is stored to the working memory 711 as a new mapping memory address MY.

The Y-starting point address Y1S is inputted to the register 722 and the screen end point address SY is inputted to the register 723. The Y-starting point address Y1S and the screen end point address SY are compared with each other by a comparator 736. Compared results of the comparator 736 are inputted to a register 724. Namely, it is judged whether or not the polygonal side is located on the screen end point.

With respect to polygonal side 4, address values Y2S, Y2E, X2S, X2E, MX2S, MX2E, MY2S and MY2E are respectively used instead of the above address values Y1S, Y1E, X1S, X1E, MX1S, MX1E, MY1S and MY1E. Thus, similar to the above case, mapping memory addresses are calculated.

An operation of the mapping memory address arithmetic section 710 will next be described with reference to a flow chart shown in FIG. 23.

In a step S30, X and Y addresses at a screen end point in the screen end point memory 81 indicated by the second counter 62 are respectively stored to regions for SX and SY in the working memory 711.

In a step S31, X and Y addresses of a polygonal figure from the first polygonal end point memory 10 and X and Y addresses of the mapping memory are set to regions for X1S, X1E, MX1S, MX1E, MY1S, MX2S and MY2S in the working memory 711. The X and Y addresses of the polygonal figure are X and Y addresses on a polygonal side directed downward and address SY is located between starting and terminal points on this polygonal side. In the example shown in FIG. 16, this polygonal side is set to polygonal side 1.

In a step S32, X and Y addresses of a polygonal figure from the first polygonal end point memory 10 and X and Y addresses of the mapping memory are set to regions for X1S, X1E, MX1S, MX1E, MY1S, MX2S and MY2S in the working memory 711. The X and Y addresses of the polygonal figure are X and Y addresses on a polygonal side directed upward and address SY is located between starting and terminal points on this polygonal side. In the example shown in FIG. 16, this polygonal side is set to polygonal side 2.

In the example shown in FIG. 16, an X-address at a point shown by reference numeral ③ and MX and MY addresses of the mapping memory at this point are subsequently calculated and are respectively stored to regions for XS, MXS and MYS in the working memory 711 in a step S33 (in which XS, MXS and MYS correspond to X1, MX1, MY1).

In the example shown in FIG. 16, an X-address at a point shown by reference numeral ④ and MX and MY addresses of the mapping memory at this point are further calculated and are respectively stored to regions for XE, MXE and MYE in the working memory 711 in a step S34 (in which XE, MXE and MYE correspond to X2, MX2, MY2).

In the example shown in FIG. 16, MX and MY addresses of the mapping memory at a point shown by reference numeral ⑤ are further calculated and are respectively stored to regions for MXS and MYS in the working memory 711 in a step S35 (in which MXS and MYS correspond to MX1 and MY1).

Thereafter, the fifth counter 65 counts up and stored values in regions for SX, SY, MXS and MYS are written to the second polygonal end point memory 80, thereby completing the operation of the mapping memory address arithmetic section 710.

Figure 24:
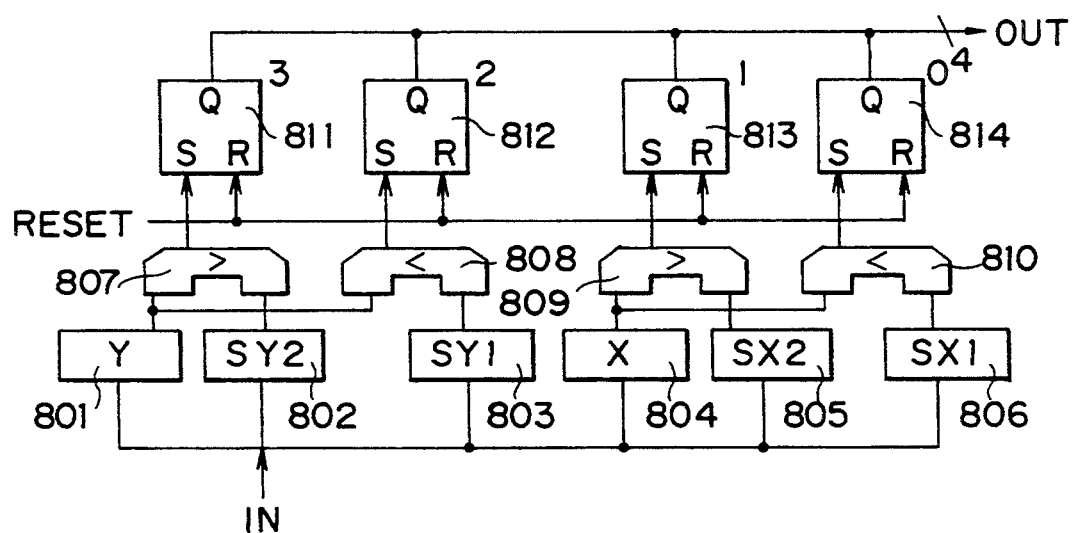
FIG. 24 is a block diagram of an end point area encoding processing section disposed in the clipping processor in the first embodiment of the present invention.
Figure 25:
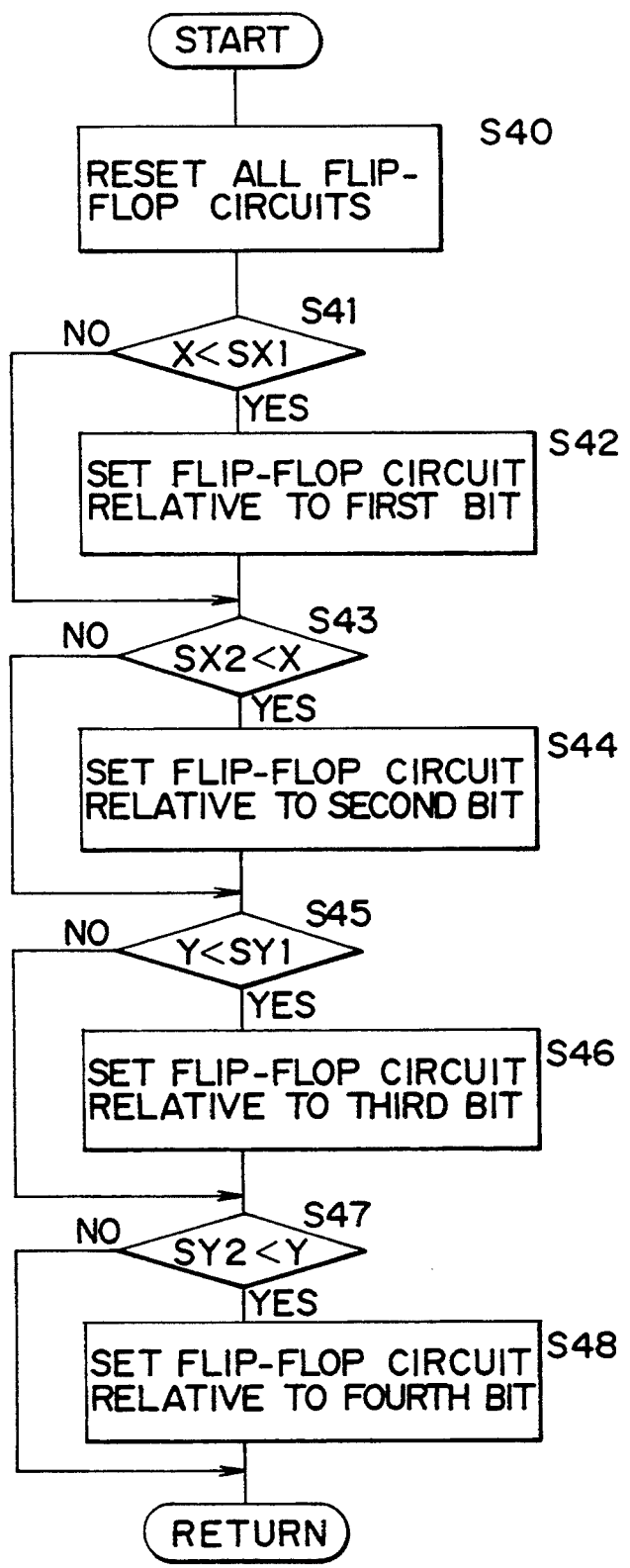
FIG. 25 is a flow chart for explaining an operation of the end point area encoding processing section in the first embodiment of the present invention.

The end point area encoding processing section 66 will next be described with reference to FIGS. 24 and 25. FIG. 24 is a block diagram of the end point area encoding processing section 66. FIG. 25 is a flow chart showing an operation of the end point area encoding processing section 66.

In a step S40, all flip-flop circuits 811 to 814 are first reset.

Screen end point addresses SY1, SY2, SX1 and SX2 indicative of upper, lower, left-hand and right-hand ends on the screen are written to registers 801 to 806 of the end point area encoding processing section 66 from the screen end point memory 81. Further, X and Y addresses on each of polygonal sides are written to the registers 801 to 806 from the first polygonal end point memory 10. Namely, a Y-address, an SY2-address and an SY1-address are respectively written to the registers 801, 802 and 803. Further, an X-address, an SX2-address and an SX1-address are respectively written to the registers 804, 805 and 806.

The stored values of the registers 804 and 806 are compared with each other by a comparator 810. When the stored value of the register 804 is smaller than that of the register 806, a flip-flop circuit 814 relative to a first bit is set in steps S41 and S42. The stored values of the registers 804 and 805 are compared with each other by a comparator 809. When the stored value of the register 804 is greater than that of the register 805, a flip-flop circuit 813 relative to a second bit is set in steps S43 and S44. Further, the stored values of the registers 801 and 803 are compared with each Other by a comparator 808. When the stored value of the register 801 is smaller than that of the register 803, a flip-flop circuit 812 relative to a third bit is set in steps S45 and S46. Finally, the stored values of the registers 801 and 802 are compared with each other by a comparator 807. When the stored value of the register 801 is greater than that of the register 802, a flip-flop circuit 811 relative to a fourth bit is set in steps S47 and S48.

As a result, a code constructed by four bits according to an area code shown in FIG. 34 is outputted from X and Y addresses at a polygonal end point.

An operation of the screen end point embedding processing section 68 will next be described with reference to FIGS. 26 and 27.

Figure 26:
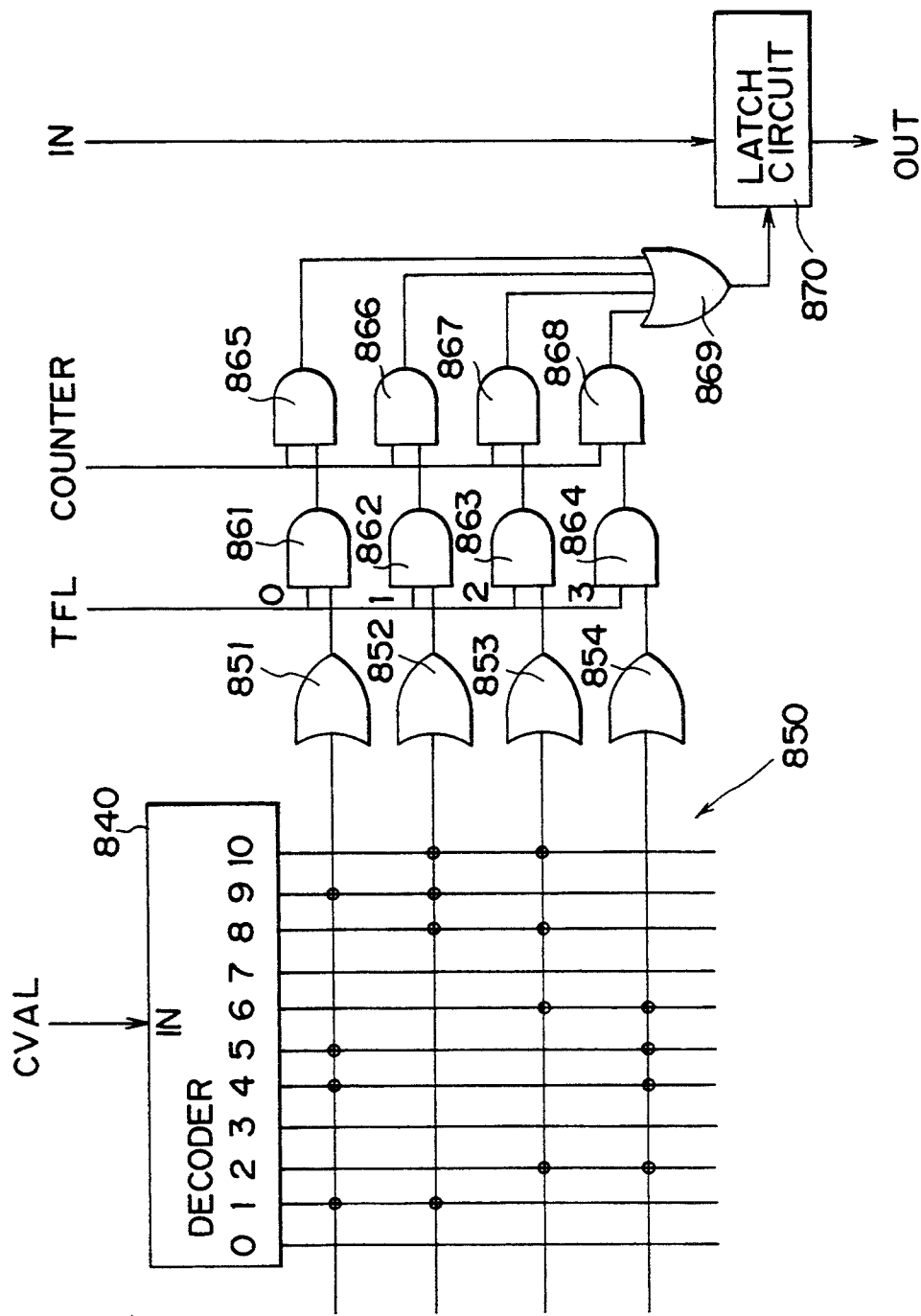
FIG. 26 is a block diagram of a screen end point embedding processing section disposed in the clipping processor in the first embodiment of the present invention.
Figure 27:
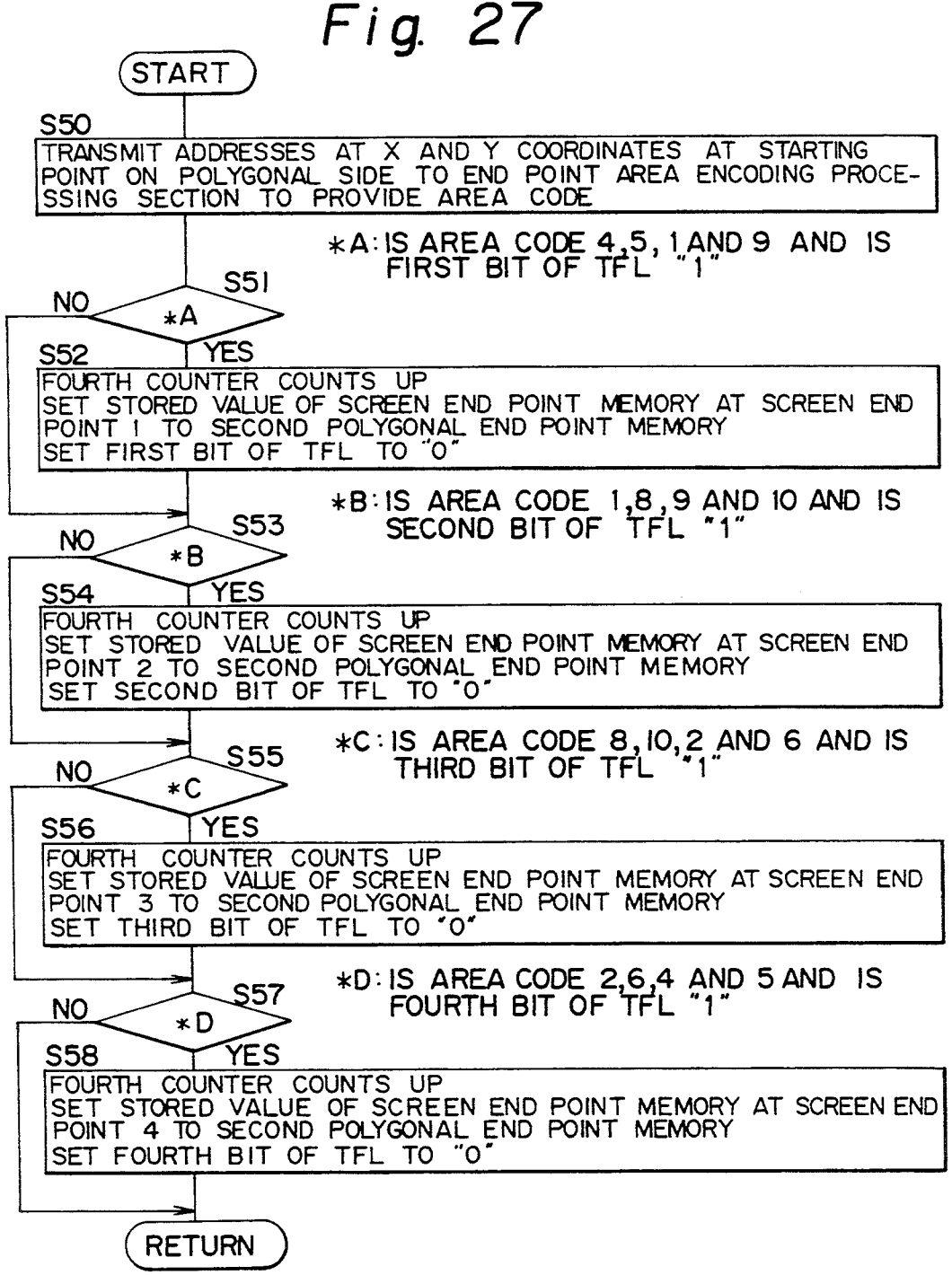
FIG. 27 is a flow chart for explaining a screen end point embedding operation in the first embodiment of the present invention.

FIG. 26 is a block diagram of the screen end point embedding processing section 68. FIG. 27 is a flow chart showing the operation of the screen end point embedding processing section 68.

The screen end point embedding processing section 68 judges whether each of screen end point embedding conditions shown in FIGS. 35 to 38 is satisfied or not. If each of these conditions is satisfied, the screen end point embedding processing section 88 writes X and Y addresses of the screen end point to the second polygonal end point memory 80. As mentioned above, each of the conditions is provided as follows. In a condition about screen end point 1, a polygonal starting point is located within a region shown by ④, ⑤, ① and ⑨ in FIG. 35 and no screen end point is yet registered as a polygonal end point. In a condition about screen end point 2, the polygonal starting point is located within a region shown by ①, ⑨, ⑧ and ⑩ in FIG. 36 and no screen end point is yet registered as a polygonal end point. In a condition about screen end point 3, the polygonal starting point is located within a region shown by ⑧, ⑩ , ② and ⑥ in FIG. 37 and no screen end point is yet registered as a polygonal end point. In a condition about screen end point 4, the polygonal starting point is located within a region shown by ②, ⑥, ④ and ⑤ FIG. 38 and no screen end point is yet registered as a polygonal end point.

Data of four bits from the end point area encoding processing section 66 are decoded by a decoder 840 and are transmitted to a program array section 850. The above conditions are programmed by the program array section 850 and this program array section 850 outputs programmed results to OR circuits 851 to 854. Namely, the OR circuit 851 outputs value "1" only when the condition about screen end point 1 is satisfied. The OR circuit 852 outputs value "1" only when the condition about screen end point 2 is satisfied. The OR circuit 853 outputs value "1" only when the condition about screen end point 3 is satisfied. The OR circuit 854 outputs value "1" only when the condition about screen end point 4 is satisfied. The program array section 850 is constructed such that each of the OR circuits 851 to 854 outputs value "1" only in the above cases.

Outputs of the OR circuits 851 to 854 are respectively inputted to one input portions of AND circuits 861 to 864. First to fourth bits of an output TFL of the screen end point arithmetic section 67 are respectively inputted to the other input portions of the AND circuits 861 to 864. Outputs of the AND circuits 861 to 864 are respectively inputted to AND circuits 865 to 868. An output of a counter is also inputted to the AND circuits 865 to 868. Outputs of these AND circuits 865 to 868 are transmitted to a latch circuit 870 through an OR circuit 869. Thus, stored values of the screen end point memory 81 satisfying the above conditions are written to the second polygonal end point memory 80.

An operation of this screen end point embedding processing section 68 will be next described with reference to the flow chart shown in FIG. 27.

When the screen end point embedding processing section 68 is started, addresses at X and Y coordinates at a starting point on a polygonal side are transmitted to the end point area encoding processing section 66 so as to calculate an area code in a step S50.

In a step S51, it is judged whether or not the area code is constructed by "4", "5", "1" and "9" and the first bit of the output TFL shows value "1". When the area code is constructed by "4", "5", "1" and "9" and the first bit of the output TFL shows value "1", it proceeds to a step S52. In the step S52, the fourth counter 64 counts up. Further, a stored value of the screen end point memory 81 at the screen end point 1 is set to the second polygonal end point memory 80 and the first bit of the output TFL is set to value "0". Then, it proceeds to a step S53. In contrast to this, when no area code is constructed by "4", "5", "1" and "9" and no first bit of the output TFL shows value "1", it directly proceeds to the step S53 from the step S51.

In the step S53, it is judged whether or not the area code is constructed by "1", "8", "9" and "10" and the second bit of the output TFL shows value "1". When the area code is constructed by "1", "8", "9" and "10" and the second bit of the output TFL shows value "1", it proceeds to a step S54. In the step S54, the fourth counter 64 counts up. Further, a stored value of the screen end point memory 81 at the screen end point 2 is set to the second polygonal end point memory 80 and the second bit of the output TFL is set to value "0". Then, it proceeds to a step S55. In contrast to this, when no area code is constructed by "1", "8", "9" and "10" and no second bit of the output TFL shows value "1", it directly proceeds to the step S55 from the step S53.

In the step S55, it is judged whether or not the area code is constructed by "8", "10", "2" and "6" and the third bit of the output TFL shows value "1". When the area code is constructed by "8", "10", "2" and "6" and the third bit of the output TFL shows value "1", it proceeds to a step S56. In the step S56, the fourth counter 64 counts up. Further, a stored value of the screen end point memory 81 at the screen end point 3 is set to the second polygonal end point memory 80 and the third bit of the output TFL is set to value "0". Then, it proceeds to a step S57. In contrast to this, when no area code is constructed by "8", "10", "2" and "6" and no third bit of the output TFL shows value "1", it directly proceeds to the step S57 from the step S55.

In the step S57, it is judged whether or not the area code is constructed by "2", "6", "7" and "5" and the fourth bit of the output TFL shows value "1". When the area code is constructed by "2", "6", "7" and "5" and the fourth bit of the output TFL shows value "1", it proceeds to a step S58. In the step S58, the fourth counter 64 counts up. Further, a stored value of the screen end point memory 81 at the screen end point 4 is set to the second polygonal end point memory 80 and the fourth bit of the output TFL is set to value "0". Thus, the operation of the screen end point embedding processing section 68 is completed. In contrast to this, when no area code is constructed by "2", "6", "7" and "5" and no fourth bit of the output TFL shows value "1", the operation of the screen end point embedding processing section 68 is completed.

The polygonal end point embedding processing section 69 will next be described in detail with reference to FIGS. 28 to 33.

Figure 28:
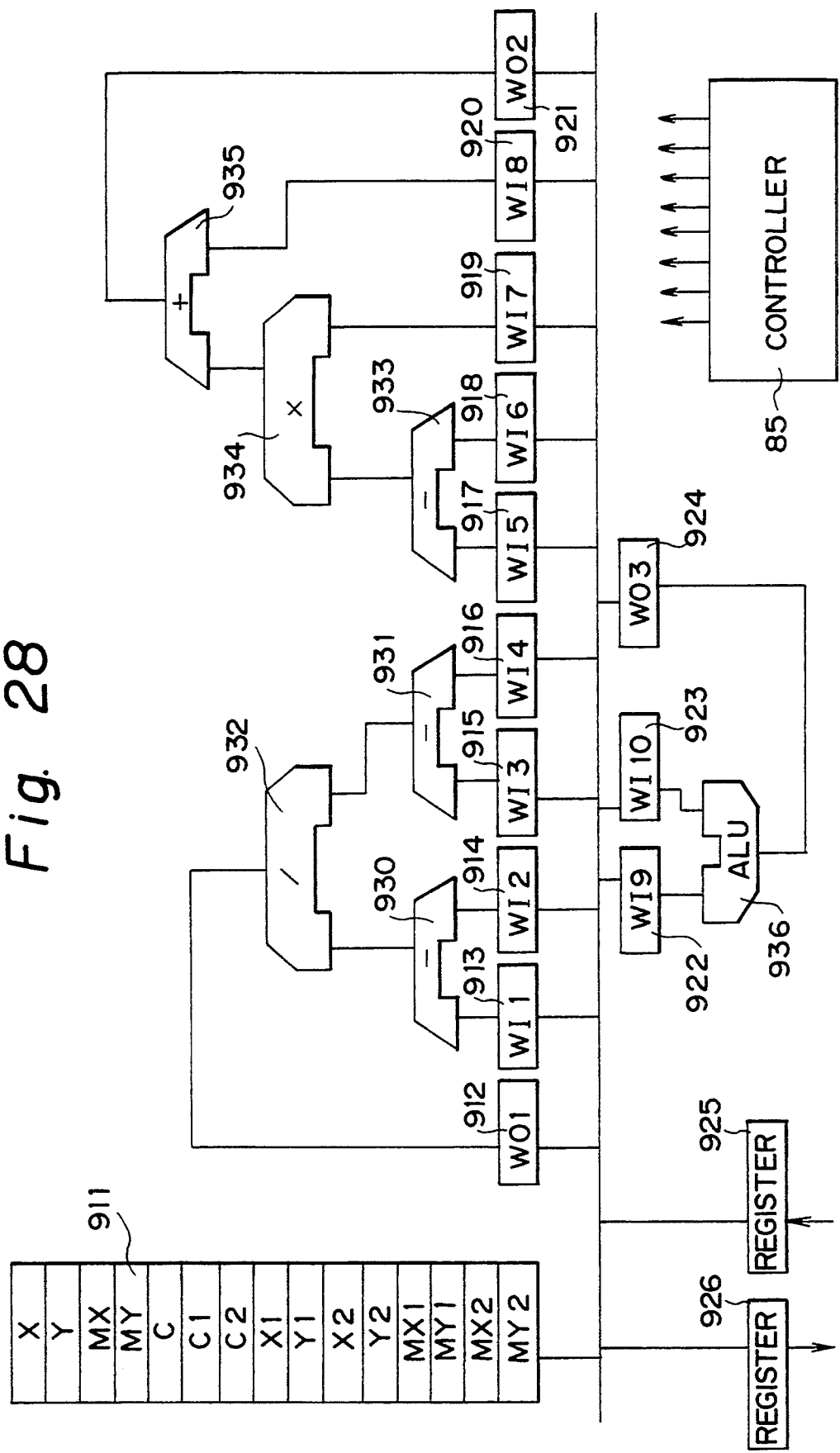
FIG. 28 is a block diagram of a polygonal end point embedding processing section disposed in the clipping processor in the first embodiment of the present invention.
Figure 29:
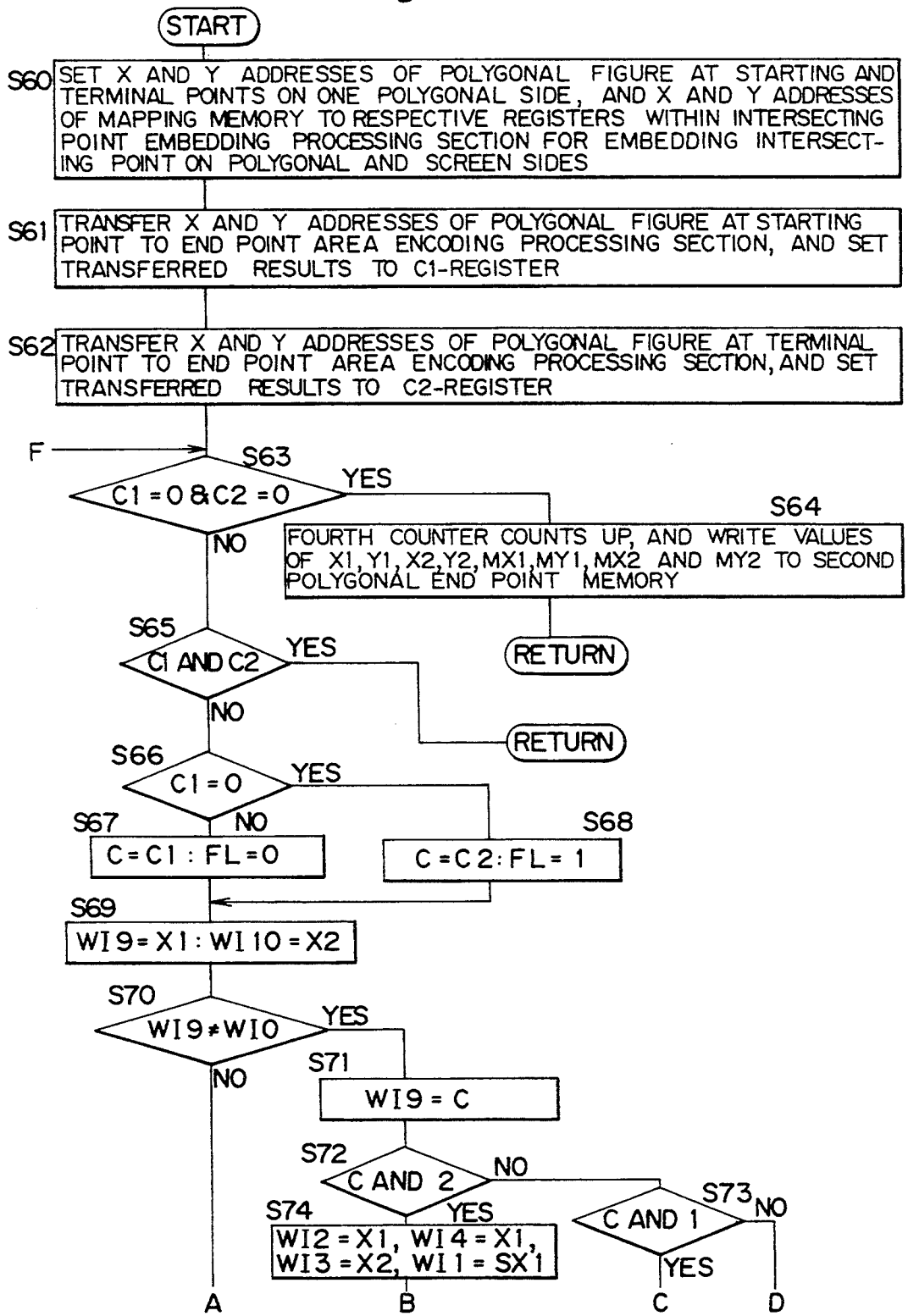
FIG. 29 is a flow chart for explaining a polygonal end point embedding operation in the clipping processor in the first embodiment of the present invention.

FIG. 28 is a block diagram of the polygonal end point embedding processing section 69. FIGS. 29 to 33 show operating flows of polygonal end point embedding processing.

The polygonal end point embedding processing section 69 is constructed by hardware as shown in FIG. 28 and is operated in accordance with flow charts shown in FIGS. 29 to 33.

X and Y addresses at upper, lower, left-hand and right-hand end points on the screen and X and Y addresses at starting and terminal points on each of polygonal sides are stored to predetermined regions of a working memory 911 through a register 926 from the first polygonal end point memory 10, the mapping memory and the screen end point memory 81. Further, MX and MY addresses of the mapping memory on each of the polygonal sides are also stored to predetermined regions of the working memory 911 through the register 926 from the first polygonal end point memory 10, the mapping memory and the screen end point memory 81.

The end point area encoding processing section 66 calculates area codes at the starting and terminal points on the polygonal side. The calculated area codes of the end point area encoding processing section 66 are stored to regions for C1 and C2 in the working memory 911. Namely, the area code at the starting point is stored to the region for C1 and the area code at the terminal point is stored to the region for C2.

The polygonal end point embedding processing will first be described in detail in clipping processing at the upper end on the screen.

Respective data read out of the working memory 911 are written to registers 913 to 920, 922 and 923 used as working registers WI1 to WI10. Namely, a screen upper end point address SY2 and a Y-starting point address Y1 are transmitted from the working memory 911 to the registers 913 and 914. A subtracter 930 subtracts the Y-starting point address Y1 from the screen upper end point address SY2. A Y-terminal point address Y2 and the Y-starting point address Y1 are transmitted from the working memory 911 to the registers 915 and 916. A subtracter 931 subtracts the Y-starting point address Y1 from the Y-terminal point address Y2. An output (SY2−Y1) of the subtracter 930 and an output (Y2−Y1) of the subtracter 931 are inputted to a divider 932. A divided value (SY2−Y1)/(Y2−Y1) of this divider 932 is stored to a register 912.

An X-terminal point address X2 is transmitted to a register 917 and an X-starting point address X1 is transmitted to a register 918. A subtracter 933 subtracts the X-starting point address X1 from the X-terminal point address X2. An output (X2−X1) of the subtracter 933 is inputted to a multiplier 934. The above divided value (SY2−Y1)/(Y2−Y1) is inputted to a register 919 and is further transmitted to the multiplier 934 through the register 919. The multiplier 934 multiplies (SY2−Y1)/(Y2−Y1) by (X2−X1). A multiplied value {(SY2−Y1)/(Y2−Y1)}*(X2-X1) of the multiplier 934 is added by an adder 935 to address X1 stored to a register 920. An added value of the adder 935 is stored to a register 921. This added value is provided as an X-address at the screen upper end. After this added value is stored to the register 921, this X-address is stored to the working memory 911 as a new X-address. An SY2-address on the screen is written to the working memory 911 as a Y-address.

Further, a mapping memory address MX2 is transmitted to the register 917 and a mapping memory address MX1 is transmitted to the register 918. The subtracter 933 subtracts the mapping memory address MX1 from the mapping memory address MX2. An output (MX2−MX1) of the subtracter 933 is inputted to the multiplier 934. The above divided value (SY2−Y1)/(Y2−Y1) is inputted to the register 919 and is further transmitted to the multiplier 934 through the register 919. The multiplier 934 multiplies (SY2−Y1)/(Y2−Y1) by (MX2−MX1). A multiplied value {(SY2−Y1)/(Y2−Y1)}*(MX2−MX1) of the multiplier 934 is added by the adder 935 to address MX1 stored to the register 920. An added value of the adder 935 is stored to the register 921. This added value is provided as a mapping address (MX). After this added value is stored to the register 921, this mapping address is stored to the working memory 911 as a new mapping memory address MX.

With respect to a mapping memory address (MY), an address value MY1 is transmitted to the register 920. This address value MY1 is added by the adder 935 to the multiplied value {(SY2−Y1)/(Y2−Y1)}*(MX2−MX1) of the multiplier 934. An added value of the adder 935 is stored to the register 921. This added value is provided as a mapping address (MY). After this added value is stored to the register 921, this mapping address is stored to the working memory 911 as a new mapping memory address MY.

With respect to the lower, right-hand and left-hand ends on the screen, it is possible to similarly calculate the above screen end point addresses by respectively replacing these addresses with corresponding addresses.

The hardware construction of the polygonal end point embedding processing section 69 is similar to that of the above mapping memory address arithmetic section 710. Accordingly, it is possible to commonly use both the polygonal end point embedding processing section 69 and the mapping memory address arithmetic section 710 if data written to the working memory are changed.

An operation of the polygonal end point embedding processing section 69 will further be described with reference to flow charts shown in FIGS. 29 to 33.

In a step S60, X and Y addresses at starting and terminal points on one side of a polygonal figure and X and Y addresses of the mapping memory are set to respective regions of the working memory 911 within an intersecting point embedding processing section for embedding and processing an intersecting point on polygonal and screen sides.

In a step S61, the X and Y addresses at the starting point of the polygonal figure are transferred to the end point area encoding processing section 66 and are stored as transferred results to a region for C1 in the working memory 911.

In a step S62, the X and Y addresses at the terminal point of the polygonal figure are transferred to the end point area encoding processing section 66 and are stored as transferred results to a region for C2 in the working memory 911.

In a step S63, it is judged whether C1=0 and C2=0 are formed or not. When C1=0 and C2=0 are formed, it proceeds to a step S64. In the step S64, the fourth counter 64 counts up and values of X1, Y1, X2, Y2, MX1, MY1, MX2 and MY2 are written to the second polygonal end point memory 80. Thereafter, the operation of the polygonal end point embedding processing section 69 is completed.

In contrast to this, when C1=0 and C2=0 are not formed, it proceeds to a step S65. In the step S65, it is judged whether C1=C2 is formed or not. When C1=C2 is not formed, it proceeds to a step S66. In contrast to this, when C1=C2 is formed, the operation of the polygonal end point embedding processing section 69 is completed.

In the step S66, it is judged whether C1=0 is formed or not. When C1=0 is formed, it proceeds to a step S68. In the step S68, the value of C2 is written to a region for C in the working memory 911 and a flag FL is set to "1" and it proceeds to a step S69.

In contrast to this, when C1=0 is not formed in the step S66, it proceeds to a step S67. In the step S67, the value of C1 is written to the region for C in the working memory 911 and the flag FL is set to "0" and it proceeds to the step S69.

In the step S69, the value of X1 is written to the register (WI9) 922 and the value of X2 is written to the register (WI10) 923 and it proceeds to a step S70. In the step S70, it is judged whether the written values of the registers 922 and 923 are equal to each other or not.

When the written values of the registers 922 and 923 are equal to each other, the written value of the register (WI9) 922 is stored to the region for C in the working memory 911 in a step S71 and it proceeds to a step S72.

In the step S72, it is judged whether the stored value in the region for C is equal to 2 or not. When the stored value in the region for C is equal to 2, it proceeds to a step S74. In contrast to this, when no stored value in the region for C is equal to 2, it proceeds to a step S73.

Figure 30:
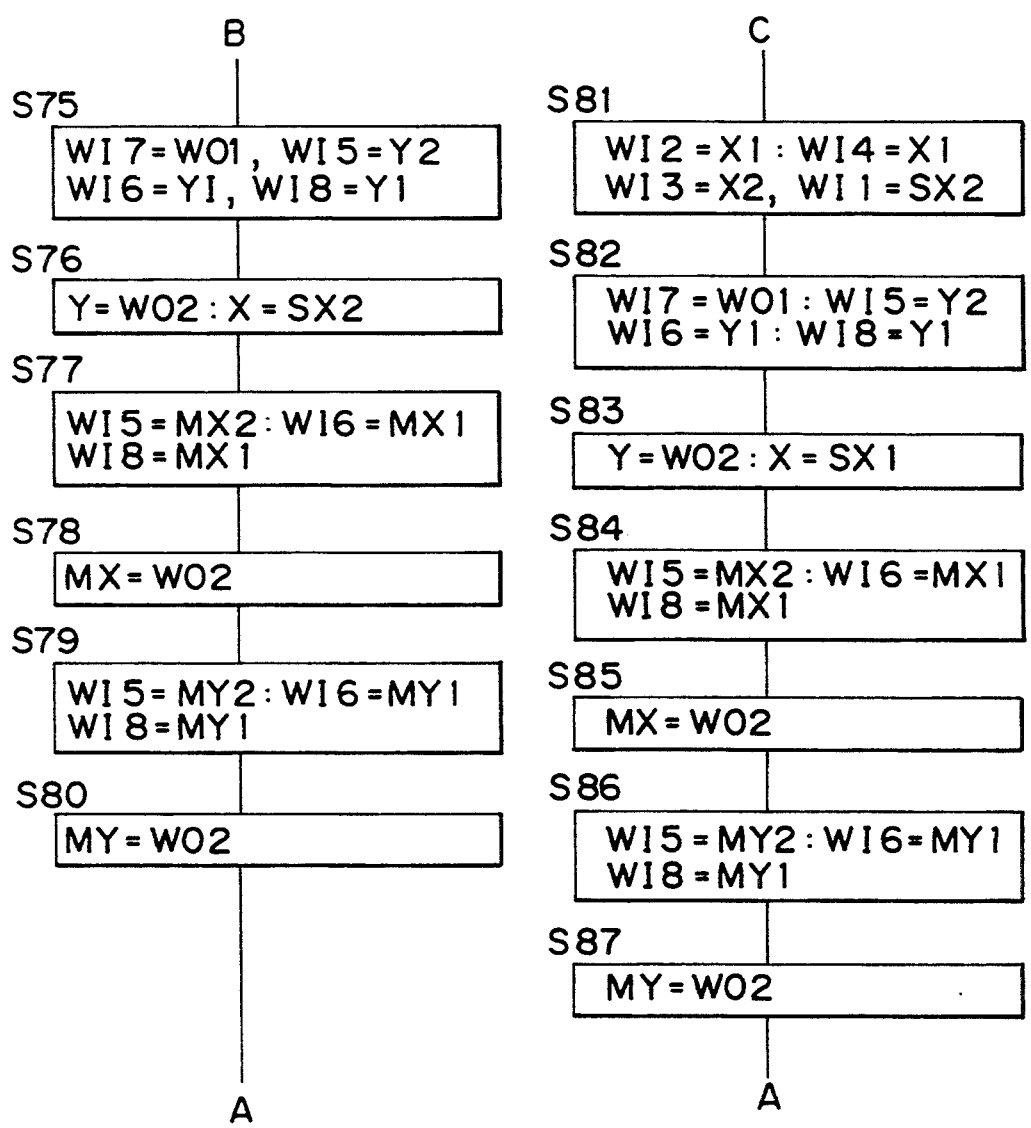
FIG. 30 is a flow chart for explaining the polygonal end point embedding operation in the first embodiment of the present invention.
Figure 31:
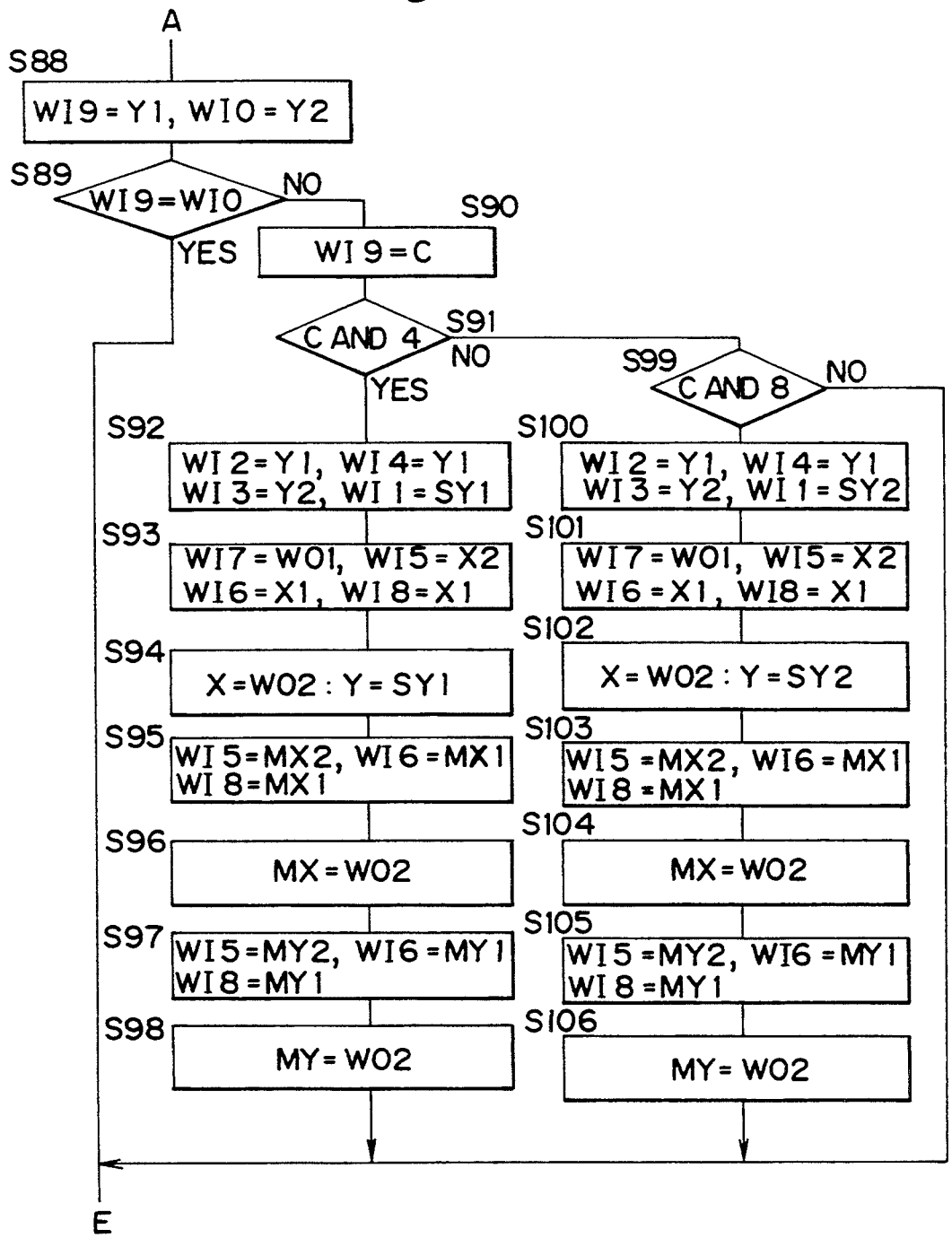
FIG. 31 is a flow chart for explaining the polygonal end point embedding operation in the first embodiment of the present invention.
Figure 32:
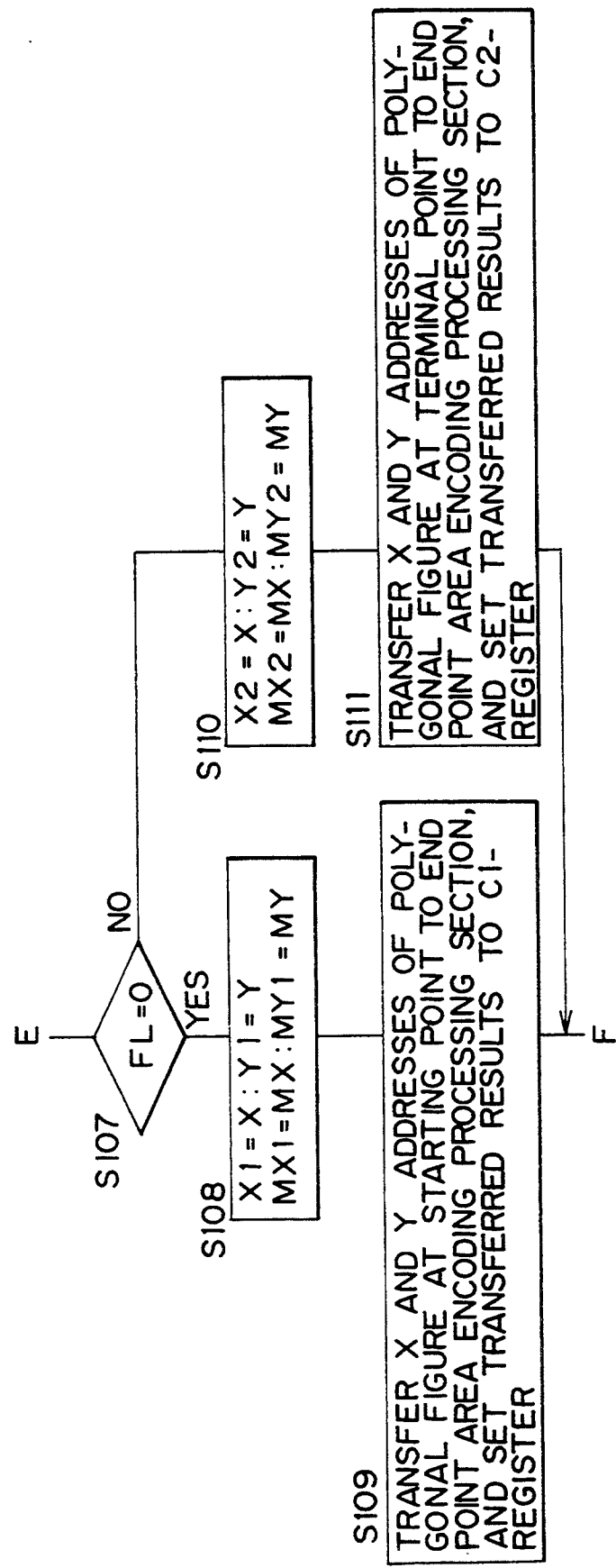
FIG. 32 is a flow chart for explaining the polygonal end point embedding operation in the first embodiment of the present invention.

In the step S74, X1 is inputted to the register (WI2) 914 and the register (WI4) 916. Further, X2 is inputted to the register (WI3) 915 and SX1 is inputted to the register (WI1) 913. Then, it proceeds to a step S75 for calculating X and Y addresses on the polygonal side crossing a screen right-hand side and MX and MY addresses of the mapping memory. This step S75 is shown in FIG. 30.

In the step S73, it is judged whether the stored value in the region for C is equal to one or not. When the stored value in the region for C is equal to one, it proceeds to a step S81 for calculating X and Y addresses on the polygonal side crossing a screen left-hand side and MX and MY addresses of the mapping memory. This step S81 is shown in FIG. 30.

Figure 33:
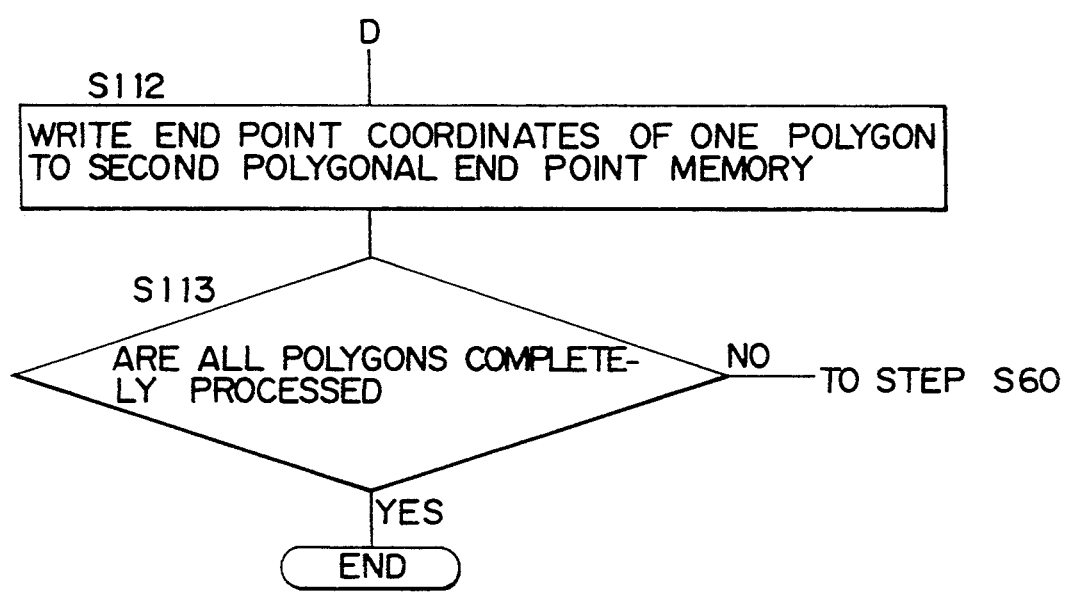
FIG. 33 is a flow chart for explaining the polygonal end point embedding operation in the first embodiment of the present invention.

In contrast to this, when no stored value in the region for C is equal to one, it proceeds to a step S112 shown in FIG. 33. In the step S112, end point coordinates of a polygon are written to the second polygonal end point memory 80. When all polygons are completely processed, the operation of the polygonal end point embedding processing section 69 is completed.

In the step S75 for calculating the X and Y addresses on the polygonal side crossing the screen right-hand side and the MX and MY addresses of the mapping memory, a stored value of the register 912 (WO1) is inputted to the register (WI7) 919 and the value of Y2 is inputted to the register (WI5) 917. Further, the value of Y1 is inputted to the register (WI6) 918 and the value of Y1 is inputted to the register (WI8) 920. The subtracter 933, the multiplier 934 and the adder 935 respectively make subtracting, multiplying and adding calculations. Then, it proceeds to a step S76.

In the step S76, a stored value of the register (WO2) 921 storing calculated results is written to a region for Y in the working memory 911. Further, SX2 is written to a region for X in the working memory 911. Then, it proceeds to a step S77.

In the step S77, the stored value of the register (WI5) 917 is rewritten to the value of MX2 and the stored value of the register (WI6) 918 is rewritten to the value of MX1. Further, the stored value of the register (WI8) 920 is rewritten to the value of MX1. Then, the subtracter 933, the multiplier 934 and the adder 935 respectively make subtracting, multiplying and adding calculations. Then, it proceeds to a step S78.

In the step S78, a stored value of the register (WO2) 921 storing calculated results is written to a region for MX in the working memory 911. Then, it proceeds to a step S79.

In the step S79, the stored value of the register (WI5) 917 is rewritten to the value of MY2 and the stored value of the register (WI6) 918 is rewritten to the value of MY1. Further, the stored value of the register (WI8) 920 is rewritten to the value of MY1. Then, the subtracter 933, the multiplier 934 and the adder 935 respectively make subtracting, multiplying and adding calculations. Then, it proceeds to a step S80.

In the step S80, a stored value of the register (WO2) 921 storing calculated results is written to a region for MY in the working memory 911. Then, it proceeds to a step S88 shown in FIG. 31.

In the step S81 for calculating the X and Y addresses on the polygonal side crossing the screen left-hand side and the MX and MY addresses of the mapping memory and shown in FIG. 30, the value of X1 is inputted to the register (WI2) 914 and the register (WI4) 916. Further, the value of X2 is inputted to the register (WI3) 915 and the value of SX2 is inputted to the register (WI1) 913. Then, it proceeds to a step S82.

In the step S82, a stored value of the register 912 (WO1) is inputted to the register (WI7) 919 and the value of Y2 is inputted to the register (WI5) 917. Further, the value of Y1 is inputted to the register (WI6) 918 and the value of Y1 is inputted to the register (WI8) 920. The subtracter 933, the multiplier 934 and the adder 935 respectively make subtracting, multiplying and adding calculations. Then, it proceeds to a step S83.

In the step S83, a stored value of the register (WO2) 921 storing calculated results is written to the region for Y in the working memory 911. Further, SX1 is written to the region for X in the working memory 911. Then, it proceeds to a step S84.

In the step S84, the stored value of the register (WI5) 917 is rewritten to the value of MX2 and the stored value of the register (WI6) 918 is rewritten to the value of MX1. Further, the stored value of the register (WI8) 920 is rewritten to the value of MX1. Then, the subtracter 933, the multiplier 934 and the adder 935 respectively make subtracting, multiplying and adding calculations. Then, it proceeds to a step S85.

In the step S85, a stored value of the register (WO2) 921 storing calculated results is written to the region for MX in the working memory 911. Then, it proceeds to a step S86.

In the step S86, the stored value of the register (WI5) 917 is rewritten to the value of MY2 and the stored value of the register (WI6) 918 is rewritten to the value of MY1. Further, the stored value of the register (WI8) 920 is rewritten to the value of MY1. Then, the subtracter 933, the multiplier 934 and the adder 935 respectively make subtracting, multiplying and adding calculations. Then, it proceeds to a step S87.

In the step S87, a stored value of the register (WO2) 921 storing calculated results is written to the region for MY in the working memory 911. Then, it proceeds to the step S88 shown in FIG. 31.

In the step S88, the value of Y1 is written to the register (WI9) 922 and the value of Y2 is written to the register (WI10) 923. Then, it proceeds to a step S89. In the step S89, it is judged whether the written values of the registers 922 and 923 are equal to each other or not.

When the written values of the registers 922 and 923 are equal to each other, the written value of the register (WI9) 922 is stored to the region for C in the working memory 911 in a step S90 and it proceeds to a step S91.

In the step S91, it is judged whether the stored value in the region for C is equal to 4 or not. When the stored value in the region for C is equal to 4, it proceeds to a step S92. In contrast to this, when no stored value in the region for C is equal to 4, it proceeds to a step S99.

In the step S92, Y1 is inputted to the register (WI2) 914 and the register (WI4) 916. Further, Y2 is inputted to the register (WI3) 915 and SY1 is inputted to the register (WI1) 913. Then, it proceeds to a step S93 for calculating X and Y addresses on the polygonal side crossing a screen lower side and MX and MY addresses of the mapping memory.

In the step S93, a stored value of the register 912 (WO1) is inputted to the register (WI7) 919 and the value of X2 is inputted to the register (WI5) 917. Further, the value of X1 is inputted to the register (WI6) 918 and the register (WI8) 920. The subtracter 933, the multiplier 934 and the adder 935 respectively make subtracting, multiplying and adding calculations. Then, it proceeds to a step S94.

In the step S94, a stored value of the register (WO2) 921 storing calculated results is written to the region for X in the working memory 911. Further, SY1 is written to the region for Y in the working memory 911. Then, it proceeds to a step S95.

In the step S95, the stored value of the register (WI5) 917 is rewritten to the value of MX2 and the stored value of the register (WI6) 918 is rewritten to the value of MX1. Further, the stored value of the register (WI8) 920 is rewritten to the value of MX1. Then, the subtracter 933, the multiplier 934 and the adder 935 respectively make subtracting, multiplying and adding calculations. Then, it proceeds to a step S96.

In the step S96, a stored value of the register (WO2) 921 storing calculated results is written to the region for MX in the working memory 911. Then, it proceeds to a step S97.

In the step S97, the stored value of the register (WI5) 917 is rewritten to the value of MY2 and the stored value of the register (WI6) 918 is rewritten to the value of MY1. Further, the stored value of the register (WI8)

920 is rewritten to the value of MY1. Then, the subtracter 933, the multiplier 934 and the adder 935 respectively make subtracting, multiplying and adding calculations. Then, it proceeds to a step S98.

In the step S98, a stored value of the register (WO2) 921 storing calculated results is written to the region for MY in the working memory 911. Then, it proceeds to a step S107 shown in FIG. 32.

In a step S99, it is judged whether the stored value in the region for C is equal to 8 or not. When the stored value in the region for C is equal to 8, it proceeds to a step S100 for calculating X and Y addresses on the polygonal side crossing a screen upper side and MX and MY addresses of the mapping memory.

In contrast to this, when no stored value in the region for C is equal to 8 in the step S99, it proceeds to the step S107.

In the step S100, the value of Y1 is inputted to the register (WI2) 914 and the register (WI4) 916. Further, the value of Y2 is inputted to the register (WI3) 915 and the value of SY2 is inputted to the register (WI1) 913. Then, it proceeds to a step S101.

In the step S101, a stored value of the register 912 (WO1) is inputted to the register (WI7) 919 and the value of X2 is inputted to the register (WI5) 917. Further, the value of X1 is inputted to the register (WI6) 918 and the register (WI8) 920. The subtracter 933, the multiplier 934 and the adder 935 respectively make subtracting, multiplying and adding calculations. Then, it proceeds to a step S102.

In the step S102, a stored value of the register (WO2) 921 storing calculated results is written to the region for X in the working memory 911. Further, SY2 is written to the region for Y in the working memory 911. Then, it proceeds to a step S103.

In the step S103, the stored value of the register (WI5) 917 is rewritten to the value of MX2 and the stored value of the register (WI6) 918 is rewritten to the value of MX1. Further, the stored value of the register (WI8) 920 is rewritten to the value of MX1. Then, the subtracter 933, the multiplier 934 and the adder 935 respectively make subtracting, multiplying and adding calculations. Then, it proceeds to a step S104.

In the step S104, a stored value of the register (WO2) 921 storing calculated results is written to the region for MX in the working memory 911. Then, it proceeds to a step S105.

In the step S105, the stored value of the register (WI5) 917 is rewritten to the value of MY2 and the stored value of the register (WI6) 918 is rewritten to the value of MY1. Further, the stored value of the register (WI8) 920 is rewritten to the value of MY1. Then, the subtracter 933, the multiplier 934 and the adder 935 respectively make subtracting, multiplying and adding calculations. Then, it proceeds to a step S106.

In the step S106, a stored value of the register (WO2) 921 storing calculated results is written to the region for MY in the working memory 911. Then, it proceeds to the step S107 shown in FIG. 32.

In the step S107, it is judged whether a flag FL shows value "0" or not. When the flag FL shows value "0", it proceeds to a step S108. In the step S108, data stored into a region for X1 in the working memory 911 are written to an X-address of the second polygonal end point memory 80. Data stored into a region for Y1 in the working memory 911 are written to a Y-address of the second polygonal end point memory 80. Data stored into a region for MX1 in the working memory 911 are written to an MX-address of the second polygonal end point memory 80. Further, data stored into a region for MY1 in the working memory 911 are written to an MY-address of the second polygonal end point memory 80. Then, it proceeds to a step S109.

In the step S109, the X and Y addresses of the polygonal figure at the starting point are transferred to the end point area encoding processing section 66 and are stored as transferred results to a region for C1 in the working memory 911. Then, it is returned to the step S63 shown in FIG. 29.

When no flag FL shows value "0" in the step S107, it proceeds to a step S110. In the step S110, data stored into a region for X2 in the working memory 911 are written to an X-address of the second polygonal end point memory 80. Data stored into a region for Y2 in the working memory 911 are written to a Y-address of the second polygonal end point memory 80. Data stored into a region for MX2 in the working memory 911 are written to an MX-address of the second polygonal end point memory 80. Further, data stored into a region for MY2 in the working memory 911 are written to an MY-address of the second polygonal end point memory 80. Then, it proceeds to a step S111.

In the step S111, the X and Y addresses of the polygonal figure at the terminal point are transferred to the end point area encoding processing section 55 and are stored as transferred results to a region for C2 in the working memory 911. Then, it is returned to the step S63 shown in FIG. 29.

It then proceeds to the step S112 shown in FIG. 33 through the step S73 from the step S63. In the step S112, the end point coordinates of a polygon are written to the second polygonal end point memory 80. In a step S113, the above operation of the polygonal end point embedding processing section 59 is repeatedly performed Until all polygons are completely processed. When all the polygons are completely processed, the operation of the polygonal end point embedding processing section 69 is completed.

As mentioned above, in the present invention, address data are converted to a polygon on only a screen face in subsequent processings without simultaneously drawing a picture or calculating an address on a polygonal side, thereby transferring this converted polygon. Accordingly, it is not necessary to uselessly draw a picture or calculate an address on a polygonal side in subsequent processings.

Figure 42:
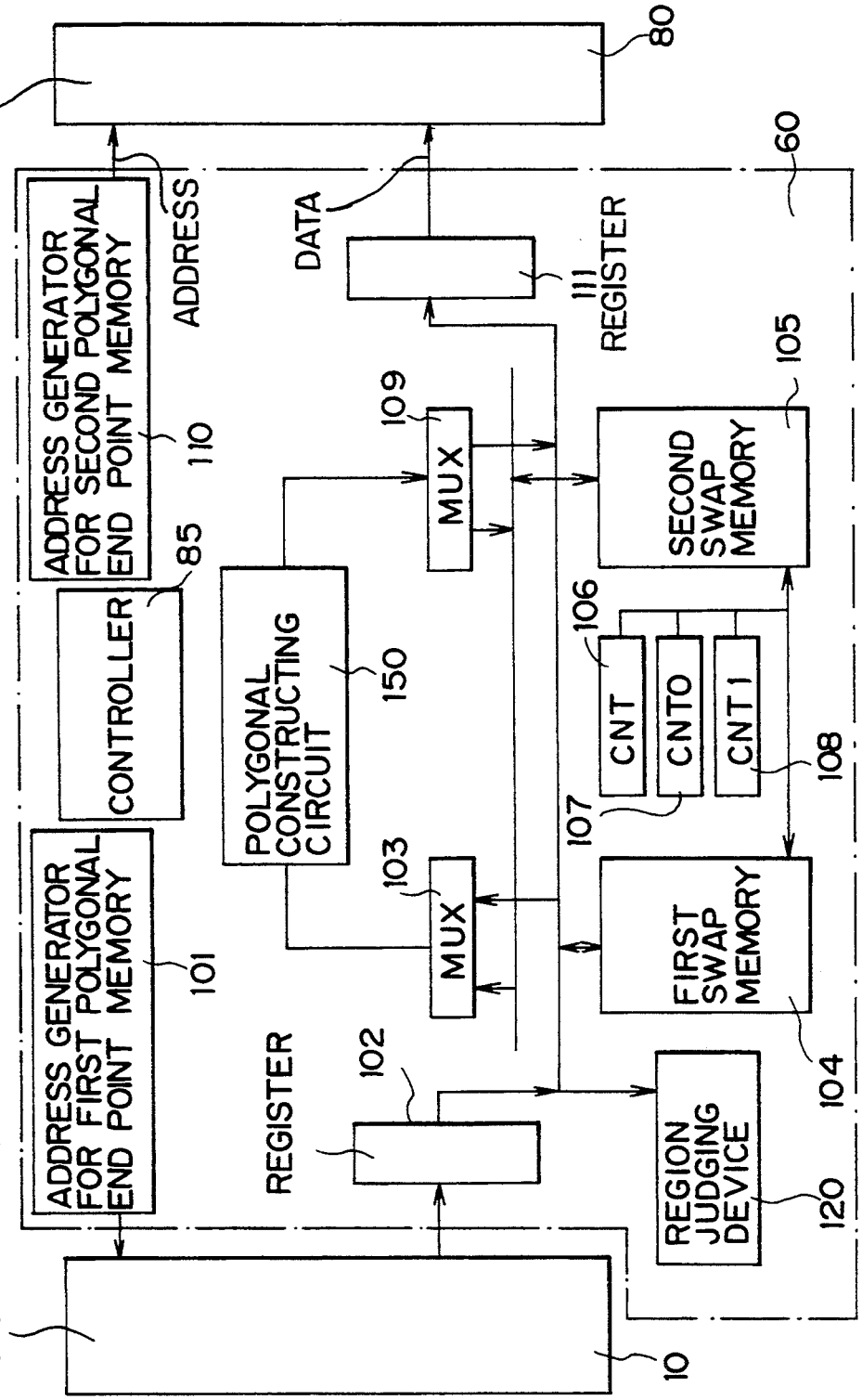
FIG. 42 is a block diagram showing the construction of a clipping processor in accordance with a second embodiment of the present invention.

A clipping processor in accordance with a second embodiment of the present invention will next be described. FIG. 42 is a block diagram showing the clipping processor in the second embodiment of the present invention.

In FIG. 42, an address generator 101 for a first polygonal end point memory 10 generates an address of the first polygonal end point memory 10. This address generator 101 reads X and Y addresses on a polygonal side, MX and MY addresses of a mapping memory, etc. from a portion of the first polygonal end point memory 10 designated by the generated address. These read address data are stored to a register 102.

The X and Y addresses on the polygonal side stored to the register 102 are transferred to a region judging device 120. This region judging device 120 judges whether or not the polygonal side is located on a screen face. An operation of the clipping processor is controlled such that clipping processing is performed with respect to only a polygon located on the screen face.

The operation of the region judging device 120 will be described later with reference to a flow chart shown in FIG. 45.

A first swap memory 104 stores X and Y addresses on a polygonal side to be clipped, MX and MY addresses of the mapping memory, etc. A second swap memory 105 also stores the X and Y addresses on the polygonal side to be clipped, the MX and MY addresses of the mapping memory, etc.

A multiplexer 103 selects data of the first swap memory 104 or the second swap memory 105 and transfers the selected data to a polygonal constructing circuit 150.

The polygonal constructing circuit 150 performs clipping processing every screen side with respect to end point data on a polygonal side read out of the first swap memory 104 or the second swap memory 105. These clipped data are transferred to the first swap memory 104 or the second swap memory 105 through a multiplexer 109.

An address generator 110 for a second polygonal end point memory 80 generates an address of the second polygonal end point memory 80. Clipped data held in a register 111 are written to a portion of the second polygonal end point memory 80 designated by this generated address.

Figure 45:
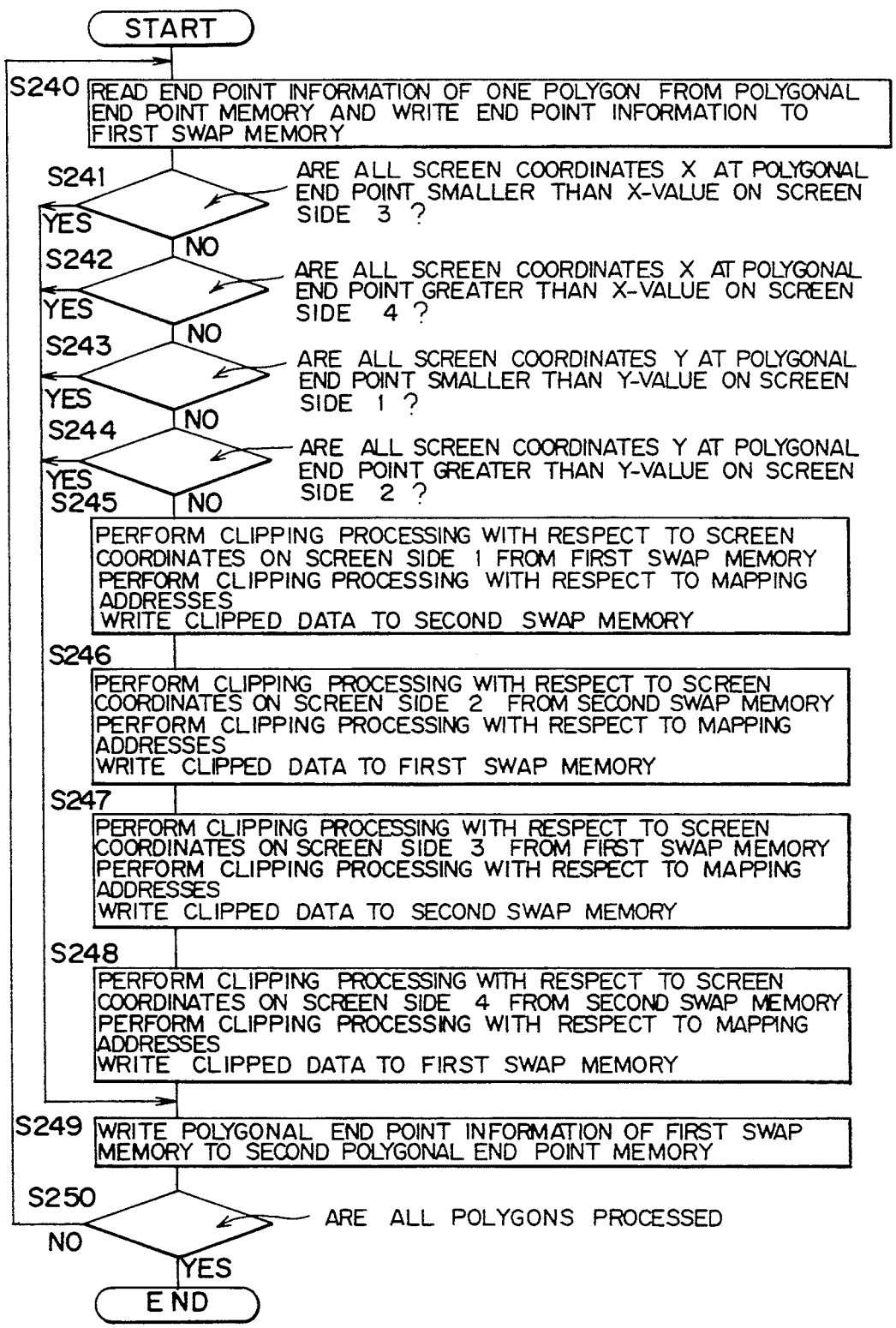
FIG. 45 is a flow chart showing an operation of the clipping processor in the second embodiment of the present invention.

A controller section 85 performs a control operation in accordance with a flow chart shown in FIG. 45.

The operation of the clipping processor will be further described with reference to the flow chart shown in FIG. 45.

In a step S240 shown in FIG. 45, end point information of one polygon are read out of the first polygonal end point memory 10 and are written to the first swap memory 104.

In a step S241, it is judged whether or not X-values at all screen coordinates at a polygonal end point are smaller than an X-value on a screen side 3 (or ③). When the X-values at all the screen coordinates at the polygonal end point are smaller than the X-value on the screen side 3, it proceeds to a step S249. In contrast to this, when no X-values at all the screen coordinates at the polygonal end point are smaller than the X-value on the screen side 3, it proceeds to a step S242.

In the step S242, it is judged whether or not the X-values at all the screen coordinates at the polygonal end point are greater than an X-value on a screen side 4 (or ④). When the X-values at all the screen coordinates at the polygonal end point are greater than the X-value on the screen side 4, it proceeds to the step S249. In contrast to this, when no X-values at all the screen coordinates at the polygonal end point are greater than the X-value on the screen side 4, it proceeds to a step S243.

In the step S243, it is judged whether or not Y-values at all the screen coordinates at the polygonal end point are smaller than an Y-value on a screen side 1 (or ①). When the Y-values at all the screen coordinates at the polygonal end point are smaller than the Y-value on the screen side 1, it proceeds to the step S249. In contrast to this, when no Y-values at all the screen coordinates at the polygonal end point are smaller than the Y-value on the screen side 1, it proceeds to a step S244.

In the step S244, it is judged whether or not the Y-values at all the screen coordinates at the polygonal end point are greater than an Y-value on a screen side 2 (or ②). When the Y-values at all the screen coordinates at the polygonal end point are greater than the Y-value on the screen side 2, it proceeds to the step S249. In contrast to this, when no Y-values at all the screen coordinates at the polygonal end point are greater than the Y-value on the screen side 2, it proceeds to a step S245.

In these steps S241 to 244, the region judging device 120 performs a region judging operation.

In the step S245, clipping processing is performed with respect to the screen coordinates on the screen side 1 from the first swap memory 104 and is then performed with respect to mapping addresses. These clipped results are written to the second swap memory 105 and it proceeds to a step S246.

In the step S246, the clipping processing is performed with respect to the screen coordinates on the screen side 2 from the second swap memory 105 and is then performed with respect to mapping addresses. These clipped results are written to the first swap memory 104 and it proceeds to a step S247.

In the step S247, the clipping processing is performed with respect to the screen coordinates on the screen side 3 from the first swap memory 104 and is then performed with respect to mapping addresses. These clipped results are written to the second swap memory 105 and it proceeds to a step S248.

In the step S248, the clipping processing is performed with respect to the screen coordinates on the screen side 4 from the second swap memory 105 and is then performed with respect to mapping addresses. These clipped results are written to the first swap memory 104 and it proceeds to a step S249.

In the step S249, the polygonal end point information of the first swap memory 104 are written to the second polygonal end point memory 80 and it proceeds to a step S250. In the step S250, it is judged whether or not the clipping processing is performed with respect to all polygonal sides. When no clipping processing is performed with respect to all the polygonal sides, it is returned to the step S240 and the above operation is repeatedly performed.

The operation of the clipping processor is completed when the clipping processing is performed with respect to all the polygonal sides.

Figure 43:
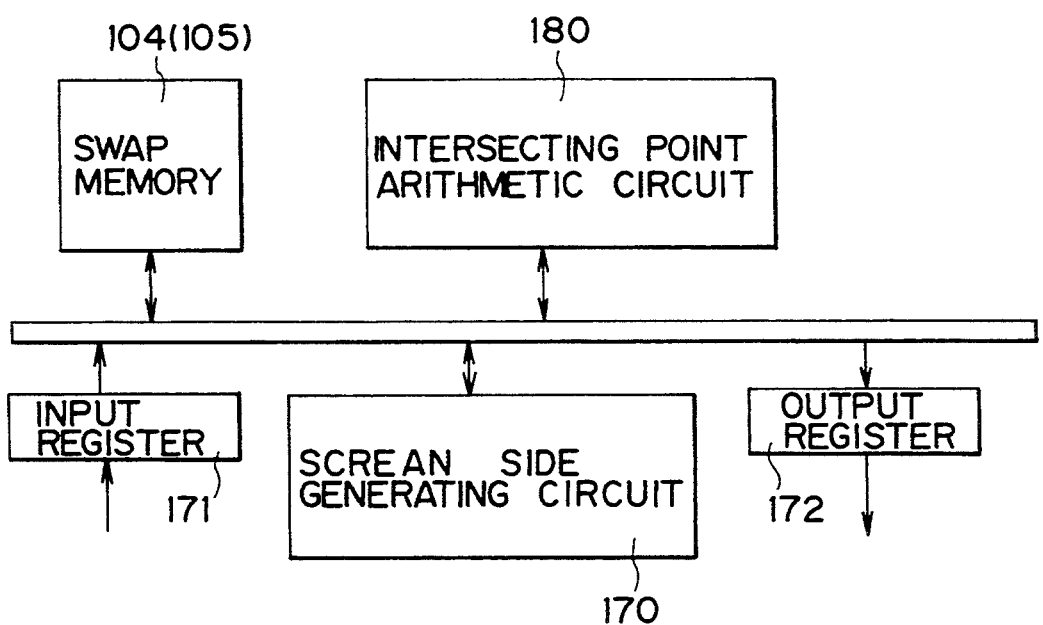
FIG. 43 is a block diagram showing a polygonal constructing circuit used in the clipping processor in the second embodiment of the present invention.

An intersecting point arithmetic circuit 180 shown in FIG. 43 is operated in the above steps S245 to S248.

The polygonal constructing circuit 150 in this second embodiment will next be described with reference to FIG. 43.

The polygonal constructing circuit 150 has the intersecting point arithmetic circuit 180 and a screen side generating circuit 170. The screen side generating circuit 170 judges whether or not a polygonal side crosses a screen side in accordance with the order of screen sides on a screen face shown in FIG. 56. The screen side generating circuit 170 also judges whether or not a starting point on the polygonal side is located inside the screen side. The screen side generating circuit 170 calculates parameters required to operate the intersecting point arithmetic circuit 180 every screen side. Data from the first polygonal end point memory 10 are written to the first and second swap memories 104 and 105 from an input register 171. Further, data on each of polygonal sides read out of the first polygonal end point memory 10 are transmitted to the screen side generating circuit 170 so as to perform the above operations thereof.

The intersecting point arithmetic circuit 180 calculates an intersecting point based on the parameters from the screen side generating circuit 170. The intersecting point arithmetic circuit 180 then outputs calculated intersecting point data to the second polygonal end point memory 80 through an output register 172.

Figure 44:
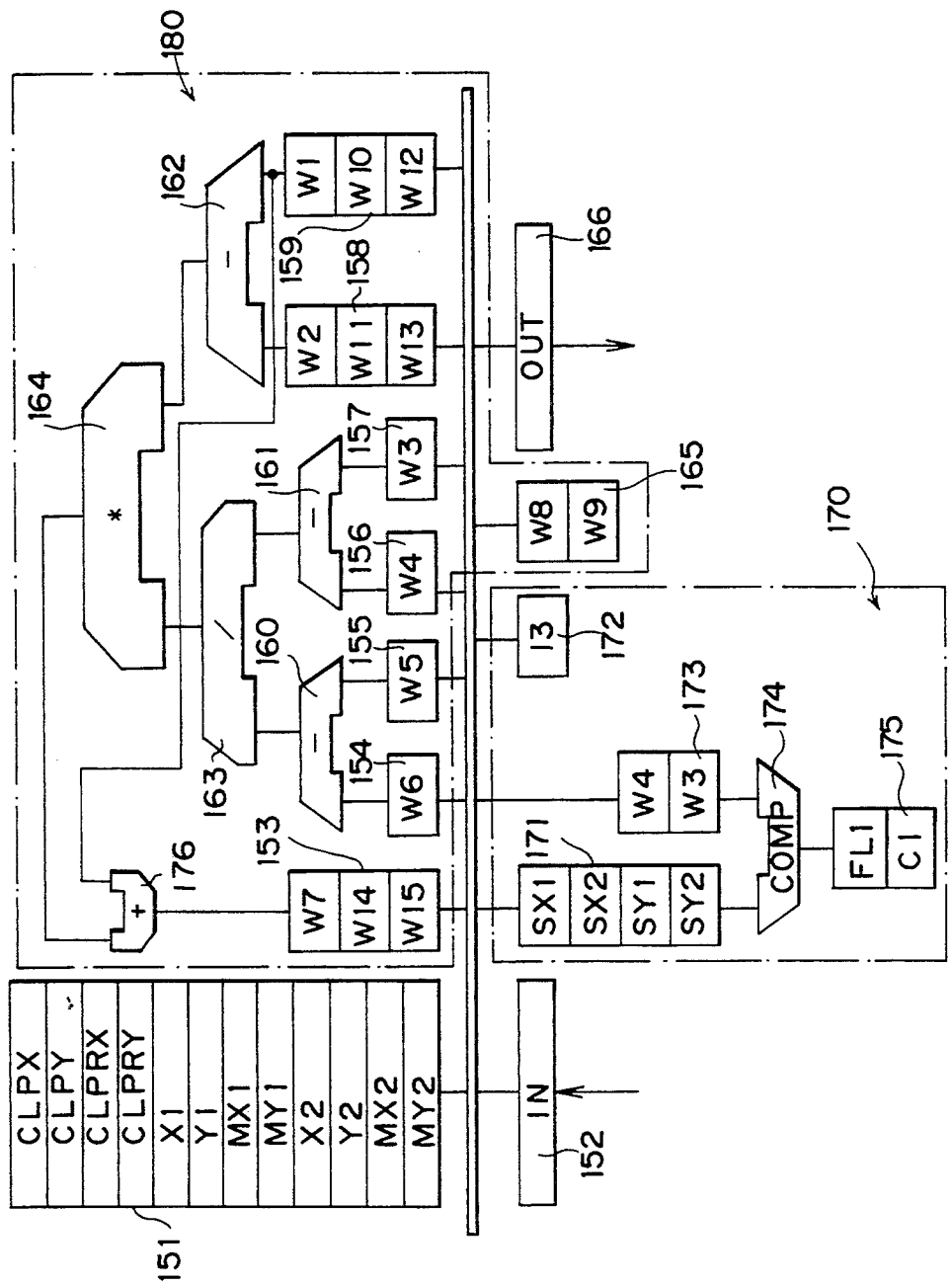
FIG. 44 is a block diagram showing a concrete example of the polygonal constructing circuit used in the second embodiment of the present invention.

FIG. 44 shows a concrete example of the polygonal constructing circuit 150. The construction of this polygonal constructing circuit 150 will be further described with reference to FIG. 44.

FIG. 44 is a block diagram of the polygonal constructing circuit 150 and FIGS. 46 to 55 show operating flows of this polygonal constructing circuit.

X and Y addresses at upper, lower, left-hand and right-hand end points on the screen, X and Y addresses at starting and terminal points on each of polygonal sides, and MX and MY addresses of a mapping memory on each of the polygonal sides are inputted to the first and second swap memories 104 and 105 through the register 102 from the first polygonal end point memory 10, the mapping memory and the screen end point memory 81. The inputted data of the first and second swap memories 104 and 105 are respectively stored to predetermined regions of a working memory 151 through an input register 152.

The intersecting point arithmetic circuit 180 has input registers 154 to 159. The input registers 154 to 159 writes X and Y addresses (X1, Y1) and (X2, Y2) at starting and terminal points on a polygonal side read out of the working memory 151. The input registers 154 to 159 also writes addresses (MX1, MY1) and (MX2, MY2) of the mapping memory at the starting and terminal points. Further, the input registers 154 to 159 writes addresses SX and SY at a screen end point calculated by the screen side generating circuit 170. A divider 163, a multiplier 164, subtracters 160 to 162 and an adder 176 respectively make predetermined dividing and multiplying calculations based on data inputted to the input registers 154 to 159. Multiplied results of the multiplier 164 are inputted to an output register 153. Clipped data from this output register 153 are respectively stored to predetermined regions of the working memory 151.

The screen side generating circuit 170 has register 171, a comparator 174, a flip-flop circuit 175 and a register 172. The register 171 store data of SX1, SY1, SX2 and SY2 shown in FIG. 56 from the working memory 151. The comparator 174 compares the stored data of the registers 171 and 173 with each other. The flip-flop circuit 175 is set by an output of this comparator 174. The register 172 shows an order of screen sides.

As mentioned above, the screen side generating circuit 170 judges whether or not a polygonal side crosses a screen side in accordance with the order of screen sides on a screen face. The screen side generating circuit 170 also judges whether or not a starting point on the polygonal side is located inside the screen side. The screen side generating circuit 170 calculates parameters required to operate the intersecting point arithmetic circuit 180 every screen side.

The above intersecting point arithmetic circuit 180 makes the following calculation every screen side to perform the clipping processing. Namely, the intersecting point arithmetic circuit 180 calculates X and Y addresses on the polygonal side and mapping addresses MX and MY.

The calculated address data are written to the working memory 151 and are further written to the first swap memory 104 or the second swap memory 105 through an output register 166.

The respective data read out of the working memory 151 are written to the input registers 154 to 159 used as working registers W1 to W6 and W10 to W13. Namely, address SY2 at a screen upper end point is written to the register (W6) 154 from the working memory 151. Y-address Y1 at a starting point on a polygonal side is written to the register (W5) 155 from the working memory 151. A subtracter 160 subtracts address Y1 from address SY2. Y-address Y2 at a terminal point on the polygonal side is written to the register (W4) 156 from the working memory 151. Y-address Y1 at the starting point is written to the register (W3) 157 from the working memory 151. A subtracter 161 subtracts address Y1 from address Y2. An output (SY2−Y1) of the subtracter 160 and an output (Y2−Y1) of the subtracter 161 are inputted to a divider 163. This divider 163 calculates (SY2−Y1)/(Y2−Y1) and this divided value is inputted to a multiplier 164.

X-address X2 at the terminal point is transmitted to the register 158. X-address X1 at the starting point is transmitted to the register 159. A subtracter 162 subtracts address X1 from address X2. An output (X2−X1) of the subtracter 162 is inputted to the multiplier 164. The multiplier 164 multiplies the above divided value (SY2−Y1)/(Y2−Y1) by this output (X2−X1). Address X1 is added to this multiplied value {(SY2−Y1)/(Y2−Y1)}*(X2−X1) to calculate an X-address at the screen upper end point. The calculated X-address is stored to the register 153 and is then stored to the working memory 151 as a new X-address. Address SY2 on the screen is written to a Y-address of the working memory 151.

Address MX2 of the mapping memory is transmitted to the register 158. Address MX1 of the mapping memory is transmitted to the register 159. The subtracter 162 subtracts address MX1 from address MX2. An output (MX2−MX1) of the subtracter 162 is inputted to the multiplier 164. The multiplier 164 multiplies the above divided value (SY2−Y1)/(Y2−Y1) by this output (MX2-MX1). Address MX1 is added to this multiplied value {(SY2−Y1)/(Y2−Y1)}*(MX2−MX1) to calculate a mapping address (MX). The calculated mapping address is stored to the register 153 and is then stored to the working memory 151 as a new mapping memory address MX. Further, with respect to a mapping address (MY), addresses MY1 and MY2 are respectively transmitted to the registers 158 and 159. Similar to the above case, a multiplied value {(SY2−Y1)/(Y2−Y1)}*(MY2-MY1) is calculated and address value MY1 is added to this multiplied value. This added value is provided as the mapping address (MY) and is stored to the working memory 151 as a new mapping memory address MY.

With respect to the lower, right-hand and left-hand end points on the screen, it is possible to similarly calculate the above screen end point addresses by respectively replacing these addresses with corresponding addresses.

The above operations are summarized as follows.

(1) Intersecting point calculation on screen side 1

$$X = \frac{SY1 - YS}{YE - YS} \times (XE - XS) + XS$$

$$Y = SY1$$

$$MX = \frac{SY1 - YS}{YE - YS} \times (MXE - MXS) + MXS$$

$$MY = \frac{SY1 - YS}{YE - YS} \times (MYE - MYS) + MYS$$

(2) Intersecting point calculation on screen side 2

$$X = \frac{SY2 - YS}{YE - YS} \times (XE - XS) + XS$$

$$Y = SY2$$

$$MX = \frac{SY2 - YS}{YE - YS} \times (MXE - MXS) + MXS$$

$$MY = \frac{SY2 - YS}{YE - YS} \times (MYE - MYS) + MYS$$

(3) Intersecting point calculation on screen side 3

$$Y = \frac{SX1 - XS}{XE - XS} \times (YE - YS) + YS$$

$$X = SX1$$

$$MX = \frac{SX1 - XS}{XE - XS} \times (MXE - MXS) + MXS$$

$$MY = \frac{SX1 - XS}{XE - XS} \times (MYE - MYS) + MYS$$

(4) Intersecting point calculation on screen side 4

$$Y = \frac{SX2 - XS}{XE - XS} \times (YE - YS) + YS$$

$$X = SX2$$

$$MX = \frac{SX2 - XS}{XE - XS} \times (MXE - MXS) + MXS$$

$$MY = \frac{SX2 - XS}{XE - XS} \times (MYE - MYS) + MYS$$

The operation of the clipping processor this embodiment will next be described with reference to the flow charts shown in FIGS. 46 to 55.

When the clipping processor is started, data at upper, lower, right-hand and left-hand end points on the screen are written to the first and second swap memories 104 and 105 in a step S280. Further, the register 172, etc. are initialized and it proceeds to a step S281.

In the step S281, counters 108 to 108, etc. shown in FIG. 42 are initialized and it proceeds to a step S262.

Figures 56, 57:
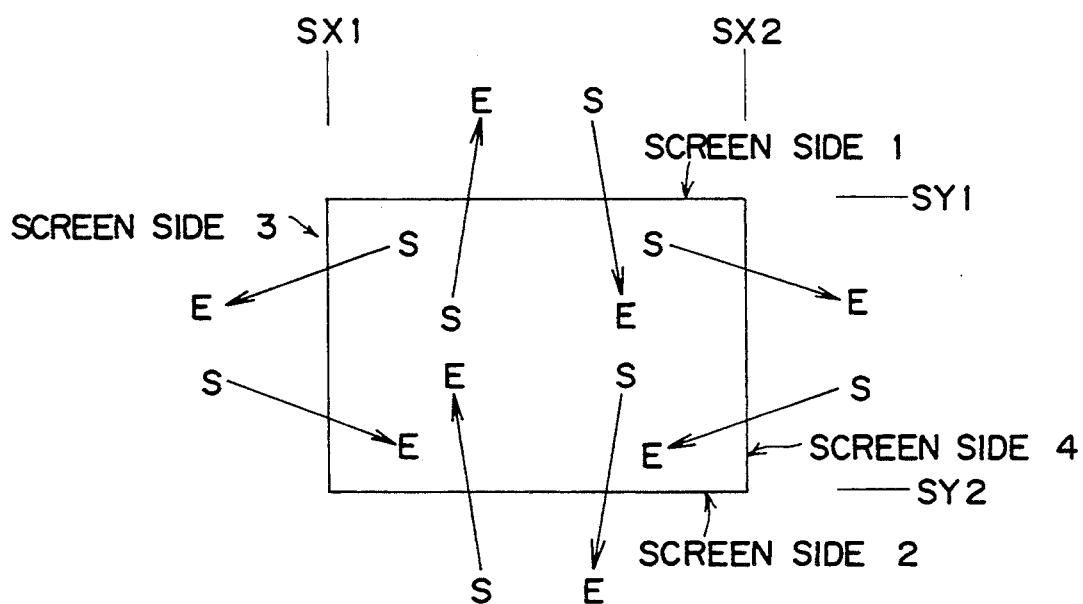
FIG. 56 is a typical view showing a crossing state of a screen face and a polygonal side.
FIG. 57 is a table showing a condition for storing an intersecting point on the polygonal side and the screen face corresponding to a position of the polygonal side.

In the step S282, value C1 in the screen side generating circuit is set to "0" and flag FL1 is set to value "0". These values of C1 and FL1 show a condition for writing data to the swap memories. This condition is shown in FIG. 57.

Next, it proceeds to a routine for calling the data written to the first and second swap memories 104 and 105. In this case, an address indicated by the counter (CNT0) 107 shows a starting point on a polygonal side. An address indicated by the counter (CNT1) 108 shows a terminal point on the polygonal side.

As shown in FIG. 45, the first and second swap memories 104 and 105 are used by sequentially switching these memories.

In a step S263, it is judged whether the counting value CNT0 of the counter 107 is equal to CNTX (i.e., CNT0=CNTX is formed) or not. When CNT0=CNTX is formed, it proceeds to a step S264. In contrast to this, when no CNT0 is equal to CNTX, it proceeds to a step S265.

In the step S264, the counting value CNT1 of the counter 108 is set to "1" and it proceeds to a step S266. In the step S265, the counting value CNT1 of the counter 108 is written to CNT1=CNT1+1 and it proceeds to the step S266.

In the step S266, it is judged whether PR (flag of swap memory) is equal to one or not. When PR=1 is formed, it proceeds to a step S269. In contrast to this, when no PR=1 is formed, it proceeds to a step S267.

In the step S267, an X-address value and a Y-address value of the first swap memory 104 at the address indicated by the counter (CNT0) 107 are respectively set to X1 and Y1. An X-address value and a Y-address value of the mapping memory are respectively set to MX1 and MY1 and it proceeds to a step S268.

In the step S268, the X-address value and the Y-address value of the first swap memory 104 at the address indicated by the counter (CNT1) 108 are respectively set to X2 and Y2. The X-address value and the Y-address value of the mapping memory are respectively set to MX2 and MY2 and it proceeds to a step S271.

In the step S269, an X-address value and a Y-address value of the second swap memory 105 at the address indicated by the counter (CNT0) 107 are respectively set to X1 and Y1. An X-address value and a Y-address value of the mapping memory are respectively set to MX1 and MY1 and it proceeds to a step S270.

In the step S270, the X-address value and the Y-address value of the second swap memory 105 at the address indicated by the counter (CNT1) 108 are respectively set to X2 and Y2. The X-address value and the Y-address value of the mapping memory are respectively set to MX2 and MY2 and it proceeds to the step S271.

In the step S271, a subroutine for changing setting conditions of the respective registers disposed in the intersecting point arithmetic circuit 180 by using the counter (I3) 172 is called by the screen side generating circuit 170.

Figure 50:
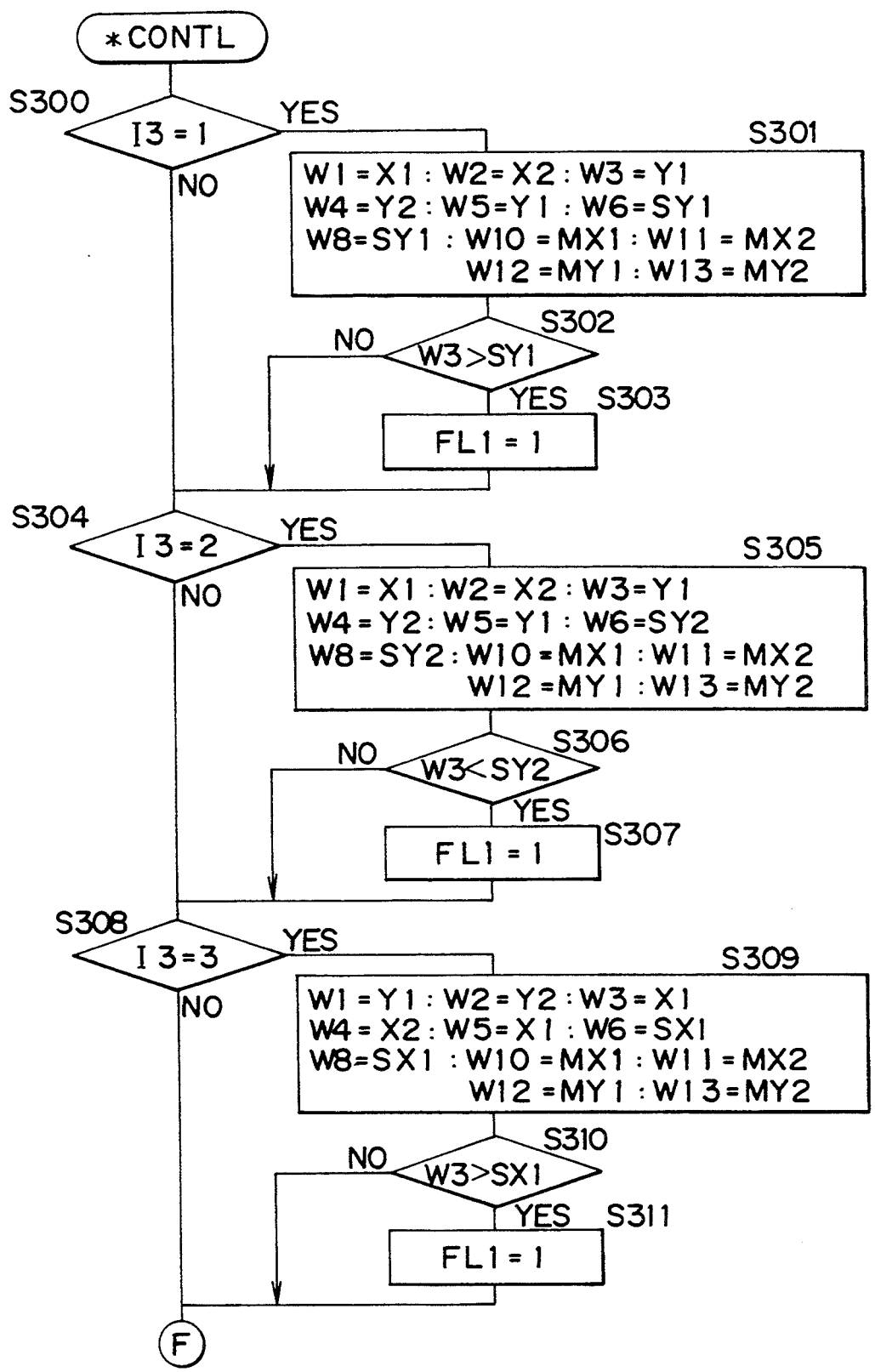
FIG. 50 is a flow chart showing the operation of the polygonal constructing circuit used in the second embodiment of the present invention.
Figure 51:
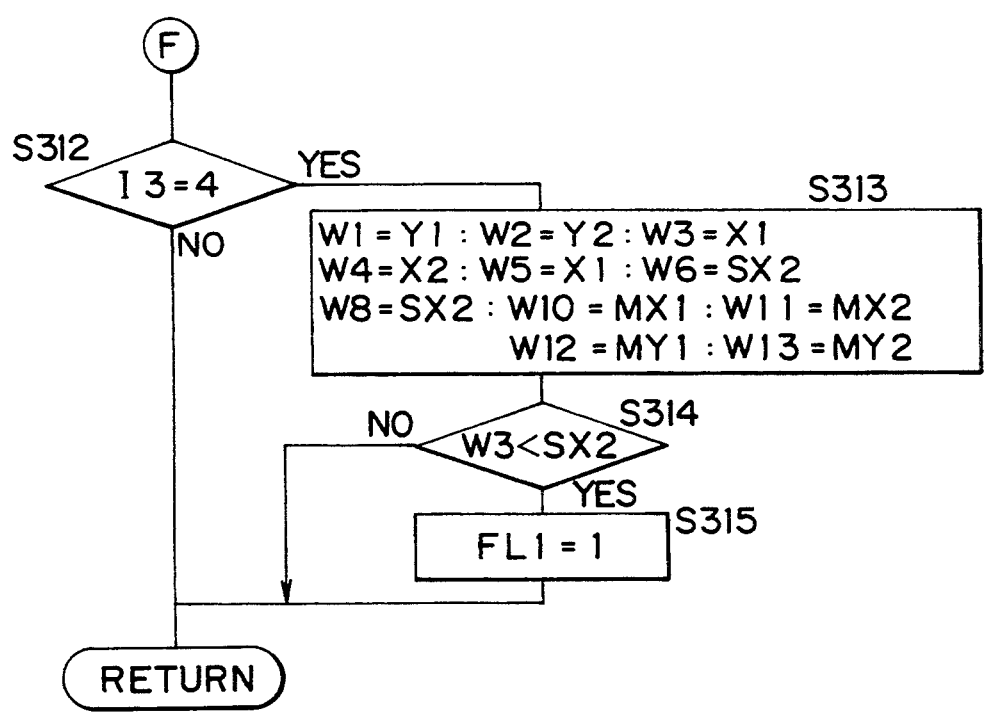
FIG. 51 is a flow chart showing the operation of the polygonal constructing circuit used in the second embodiment of the present invention.

This subroutine will next be explained with reference to FIGS. 50 and 51.

When this subroutine is started, it is judged in a step S300 whether a counting value I3 of the counter 172 shows value "1" or not. When the counting value I3 of the counter 172 shows value "1", it proceeds to a step S301. In contrast to this, when no counting value I3 of the counter 172 shows value "1", it proceeds to a step S304.

In the step S301, X1 and X2 are respectively set to the register (W1) 159 and the register (W2) 158. Y1 and Y2 are respectively set to the register (W3) 157 and the register (W4) 156. Y1 and SY1 are respectively set to the register (W5) 155 and the register (W6) 154. SY1 and MX1 are respectively set to the register (W8) 165 and the register (W10) 159. MX2 and MY1 are respectively set to the register (W11) 158 and the register (W12) 159. Further, MY2 is set to the register (W13) 158. Then, it proceeds to a step S302.

In the step S302, it is judged whether or not a stored value W3 of the register 173 is greater than a stored value SY1 of the register 171 (W3>SY1). Namely, it is judged whether Y1>SY1 is formed or not. When Y1>SY1 is formed, a flag FL1 (of the flip-flop circuit 175) is set to value "1" in a step S303. Thereafter, it proceeds to the step S304. In contrast to this, when Y1>SY1 is not formed, it directly proceeds to the step S304 from the step S302.

In the step S304, it is judged whether the counting value I3 of the counter 172 is equal to "2"0 or not. When the counting value I3 of the counter 172 is equal to "2", it proceeds to a step S305. In contrast to this, when no counting value I3 of the counter 172 is equal to "2", it proceeds to a step S308.

In the step S305, X1 and X2 are respectively set to the register (W1) 159 and the register (W2) 158. Y1 and Y2 are respectively set to the register (W3) 157 and the register (W4) 156. Y1 and SY2 are respectively set to the register (W5) 155 and the register (W6) 154. SY2 and MX1 are respectively set to the register (W8) 165 and the register (W10) 159. MX2 and MY1 are respectively set to the register (W11) 158 and the register (W12) 159. Further, MY2 is set to the register (W13) 158. Then, it proceeds to a step S306.

In the step S306, it is judged whether or not the stored value W3 of the register 173 is smaller than a stored value SY2 of the register 171 (W3 <SY2). Namely, it is judged whether Y1<SY2 is formed or not. When Y1<SY2 is formed, the flag FL1 is set to value "1" in a step S307. Thereafter, it proceeds to the step S308. In contrast to this, when Y1<SY2 is not formed, it directly proceeds to the step S308 from the step S306.

In the step S308, it is judged whether the counting value I3 of the counter 172 is equal to "3" or not. When the counting value I3 of the counter 172 is equal to "3", it proceeds to a step S309. In contrast to this, when no counting value I3 of the counter 172 is equal to "3", it proceeds to a step S312.

In the step S309, Y1 and Y2 are respectively set to the register (W1) 159 and the register (W2) 158. X1 and X2 are respectively set to the register (W3) 157 and the register (W4) 156. X1 and SX1 are respectively set to the register (W5) 155 and the register (W6) 154. SX1 and MX1 are respectively set to the register (W8) 165 and the register (W10) 159. MX2 and MY1 are respectively set to the register (W11) 158 and the register (W12) 159. Further, MY2 is set to the register (W13) 158. Then, it proceeds to a step S310.

In the step S310, it is judged whether or not the stored value W3 of the register 173 is greater than a stored value SX1 of the register 171 (W3>SX1). Namely, it is judged whether X1>SX1 is formed or not. When X1>SX1 is formed, the flag FL1 is set to value "1" in a step S311. Thereafter, it proceeds to a step S312. In contrast to this, when X1>SX1 is not formed, it directly proceeds to the step S312 from the step S310.

In the step S312, it is judged whether the counting value I3 of the counter 172 is equal to "4" or not. When the counting value I3 of the counter 172 is equal to "4", it proceeds to a step S313. In contrast to this, when no counting value I3 of the counter 172 is equal to "4", this subroutine is completely executed so that it is returned to the step S272.

In the step S313, Y1 and Y2 are respectively set to the register (W1) 159 and the register (W2) 158. X1 and X2 are respectively set to the register (W3) 157 and the register (W4) 156. X1 and SX2 are respectively set to the register (W5) 155 and the register (W6) 154. SX2 and MX1 are respectively set to the register (W8) 165 and the register (W10) 159. MX2 and MY1 are respectively set to the register (W11) 158 and the register (W12) 159. Further, MY2 is set to the register (W13) 158. Then, it proceeds to a step S314.

In the step S314, it is judged whether or not the stored value W3 of the register 173 is smaller than a stored value SX2 of the register 171 (W3<SX2). Namely, it is judged whether X1<SX2 is formed or not. When X1<SX2 is formed, the flag FL1 is set to value "1" in a step S315. Thereafter, this subroutine is completely executed so that it is returned to the step S272. In contrast to this, when X1 SX2 is not formed, this subroutine is completely executed so that it is returned to the step S272.

In this subroutine, the counting value I3 of the counter 172 is switched by the screen side generating circuit 170 to the stored value of each of the registers W1 to W13 disposed in the intersecting point arithmetic circuit 180. The counting value I3 of the counter 172 is equal to a screen side number shown in FIG. 56. Accordingly, when the counting value I3 of the counter 172 is equal to one, the clipping processing is performed with respect to screen side 1 (or ①). In the steps S302, S303, S305, S307, S310, S311, S314 and S315 in this subroutine, it is judged whether or not a starting point on a polygonal side is located inside the screen side shown by the counting value I3. When the starting point on the polygonal side is located inside the screen side shown by the counting value I3, the stored value (flag) FL1 of the flip-flop circuit 175 is set to value "1".

Figure 52:
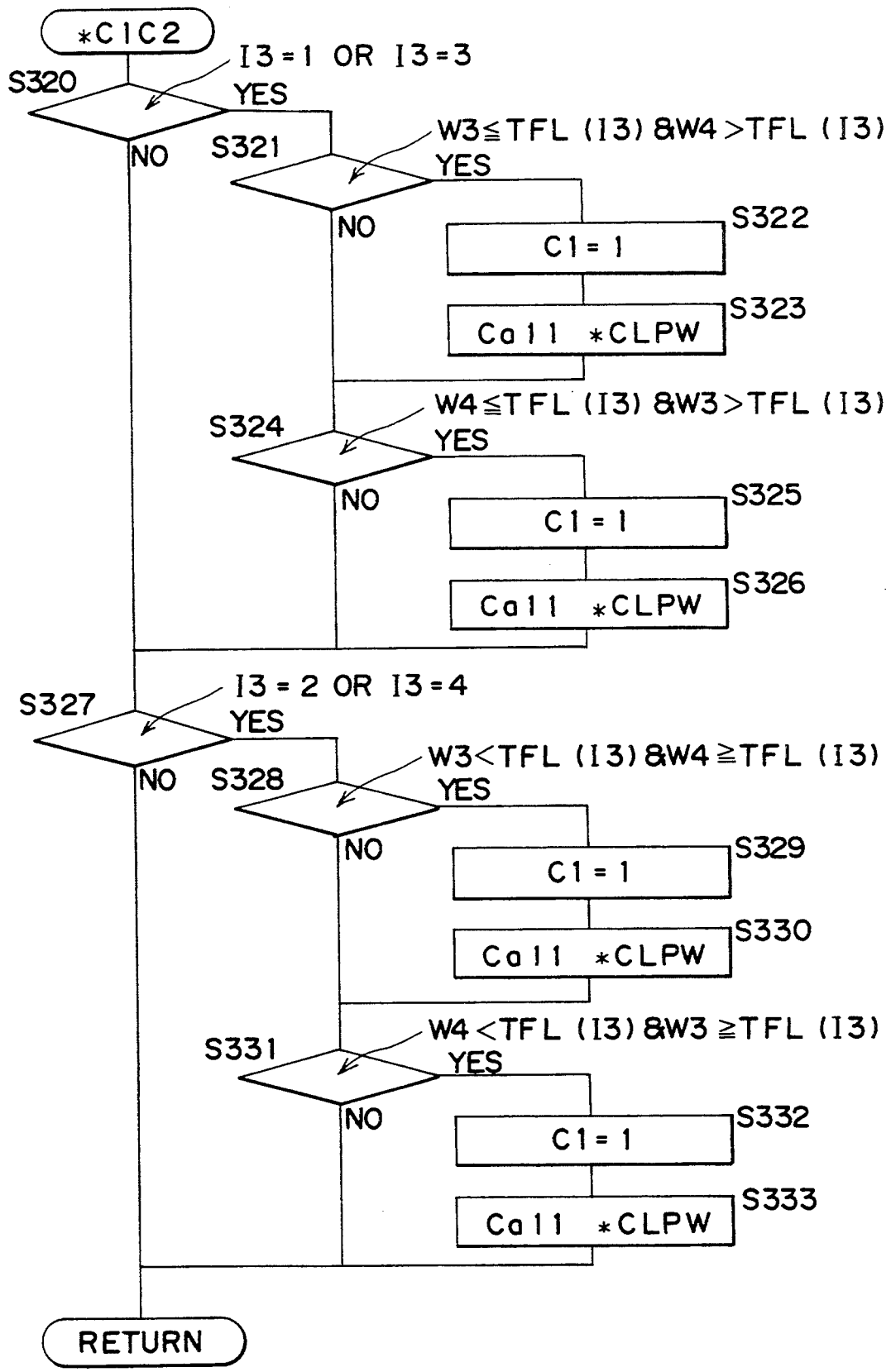
FIG. 52 is a flow chart showing the operation of the polygonal constructing circuit used in the second embodiment of the present invention.
Figure 53:
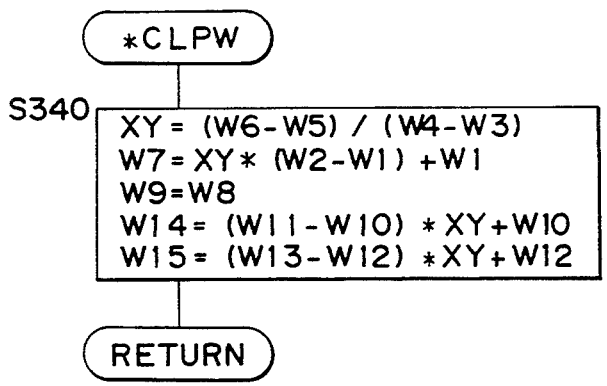
FIG. 53 is a flow chart showing the operation of the polygonal constructing circuit used in the second embodiment of the present invention.
Figure 54:
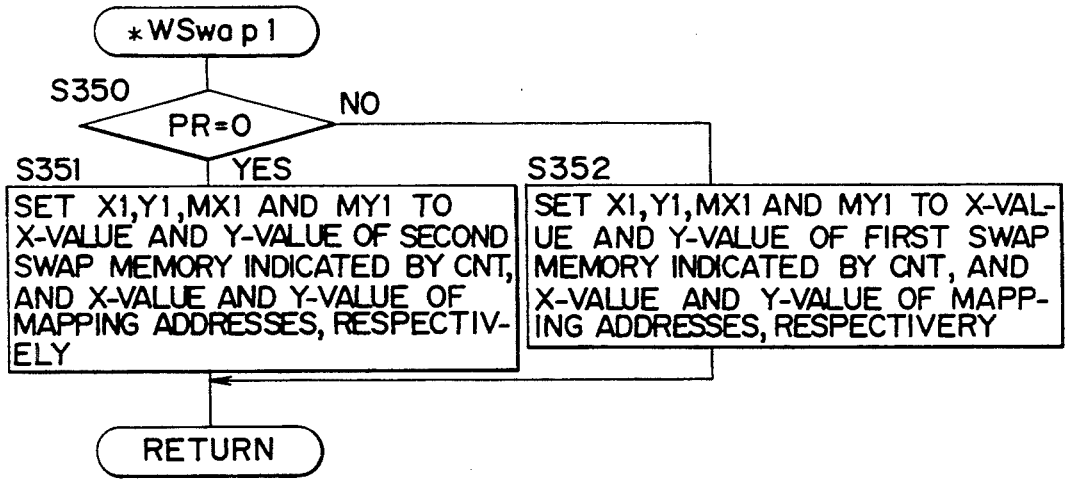
FIG. 54 is a flow chart showing the operation of the polygonal constructing circuit used in the second embodiment of the present invention.
Figure 55:
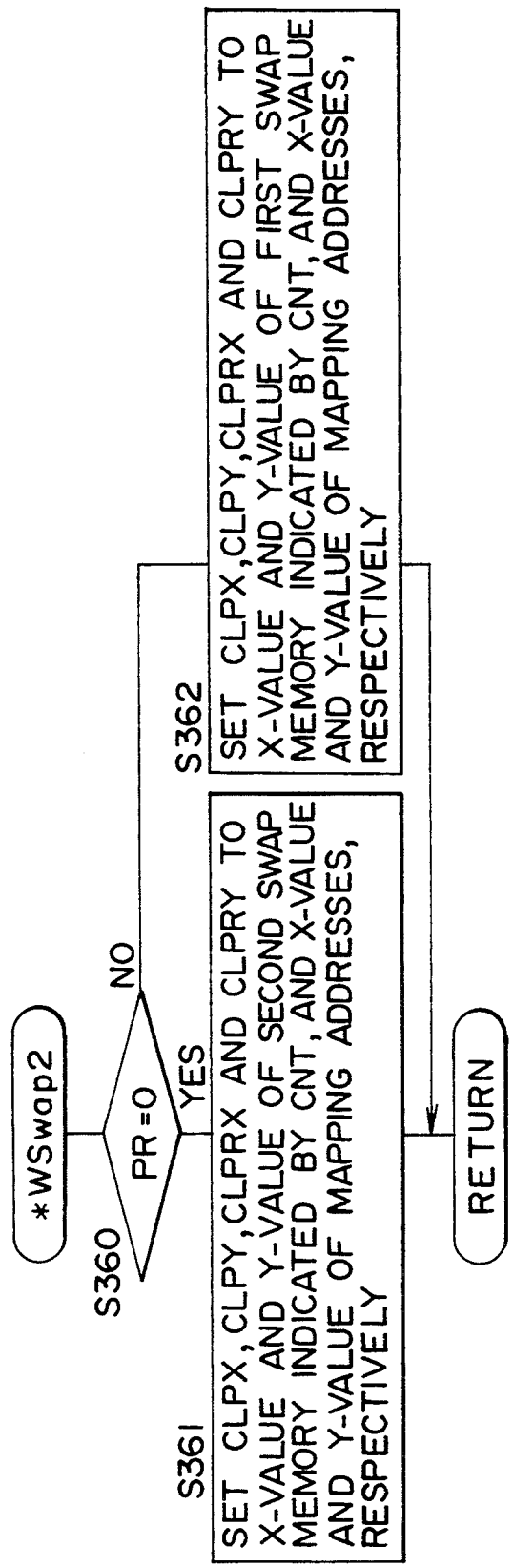
FIG. 55 is a flow chart showing the operation of the polygonal constructing circuit used in the second embodiment of the present invention.

In the step S272, the screen side generating circuit 170 judges whether or not this polygonal side crosses a screen side by using the counting value I3 of the counter 172. When this polygonal side crosses the screen side, a subroutine shown in FIG. 52 is called. In this subroutine, an intersecting point on the polygonal and screen sides is calculated by the intersecting point arithmetic circuit 180. This subroutine will next be described with reference to FIG. 52.

In this subroutine, the screen side generating circuit 170 judges whether or not the polygonal side crosses a screen side by using the counting value I3 of the counter 172. When the polygonal side crosses the screen side, a stored value C1 of the flip-flop circuit 175 is set to value "1" and the intersecting point arithmetic circuit 180 calculates an intersecting point in accordance with the above calculating formulas and the subroutine shown in FIG. 52.

The following description relates to conditions in which the polygonal side crosses the screen side (see FIG. 56).

(1) The case of screen side 1 (or ①) $Y1 \leq SY1 \& 2 > SY1$ or $Y2 \leq SY1 \& Y1 > SY1$ (2) The case of screen side 2 (or ②) $Y1 < SY2 \& Y22 \geq SY2$ or $Y2 < SY1 \& Y1 \geq SY2$ (3) The case of screen side 3 (or ③) $X1 \leq SX1 \& X2 > SX1$ or $X2 \leq SX1 \& X1 > SX1$ (4) The case of screen side 4 (or ④) $X1 < SX2 \& X2 > SX2$ or $X2 < SX1 \& X1 > SX2$ The clipping processor is operated in accordance with the above conditions in this subroutine. When this subroutine is completely executed, it is returned to the step S272.

Figure 46:
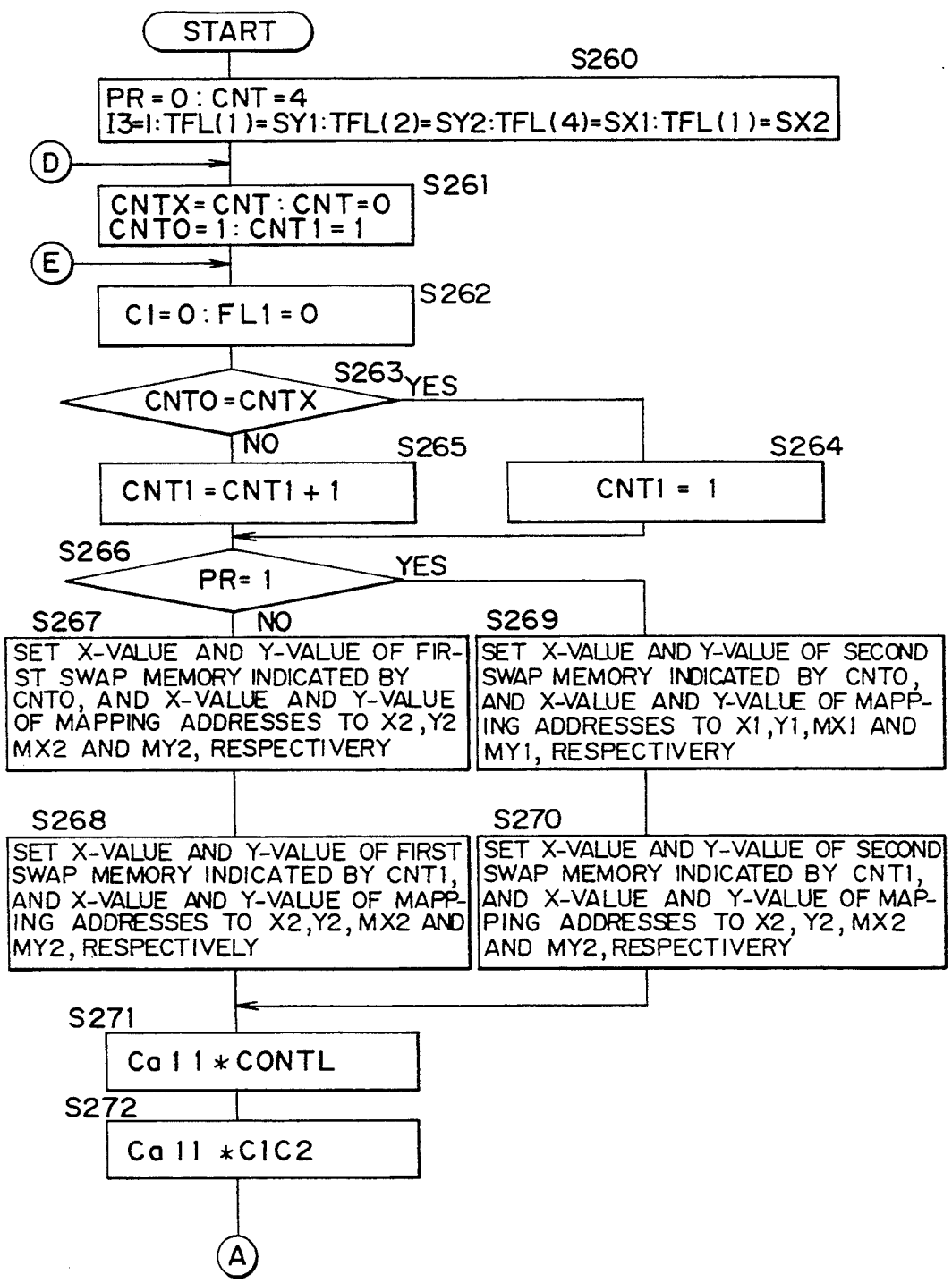
FIG. 46 is a flow chart showing an operation of the polygonal constructing circuit used in the second embodiment of the present invention.
Figure 47:
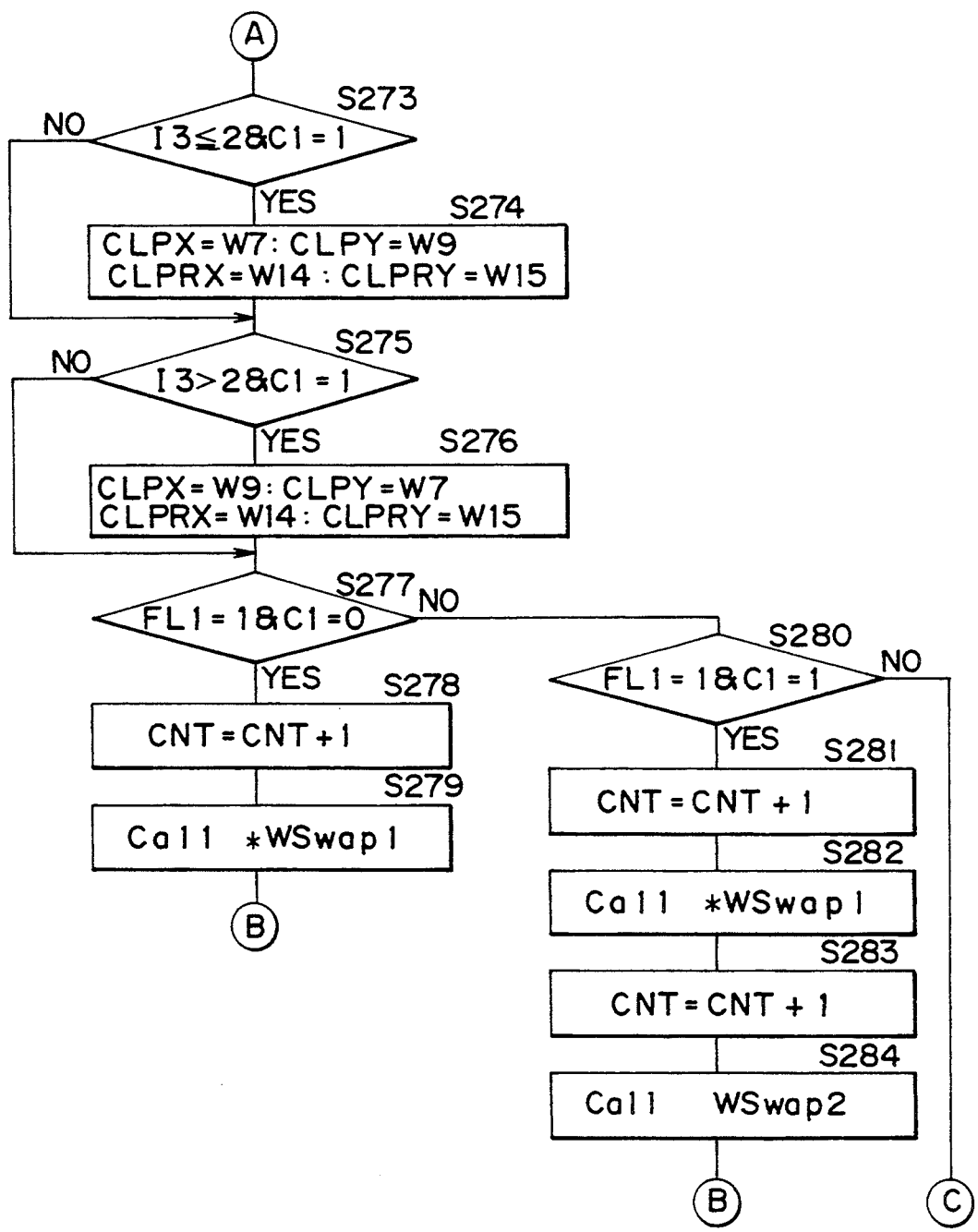
FIG. 47 is a flow chart showing the operation of the polygonal constructing circuit used in the second embodiment of the present invention.

When there is an intersecting point in steps S273 to S276 shown in FIGS. 46 and 47, the intersecting point calculated by using the counting value I3 of the counter 172 is stored to a corresponding region of the working memory 151.

Figure 48:
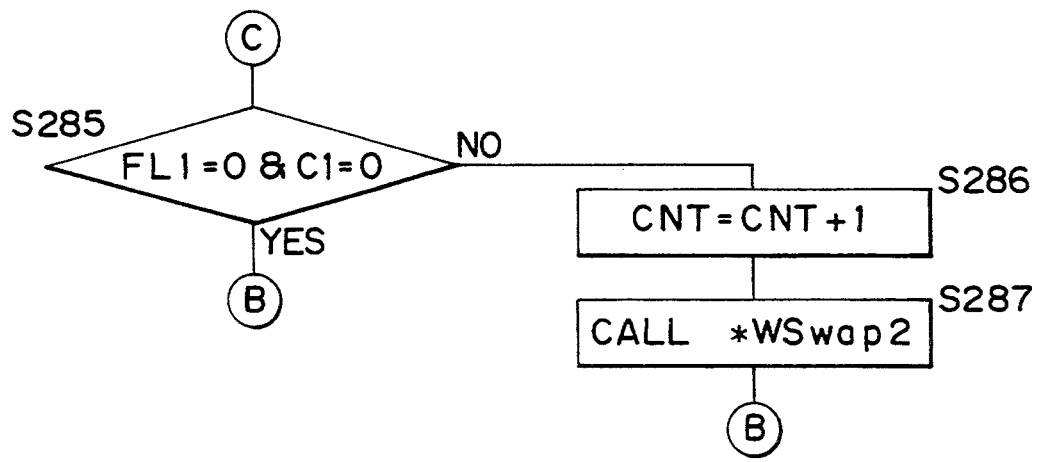
Figure 49:
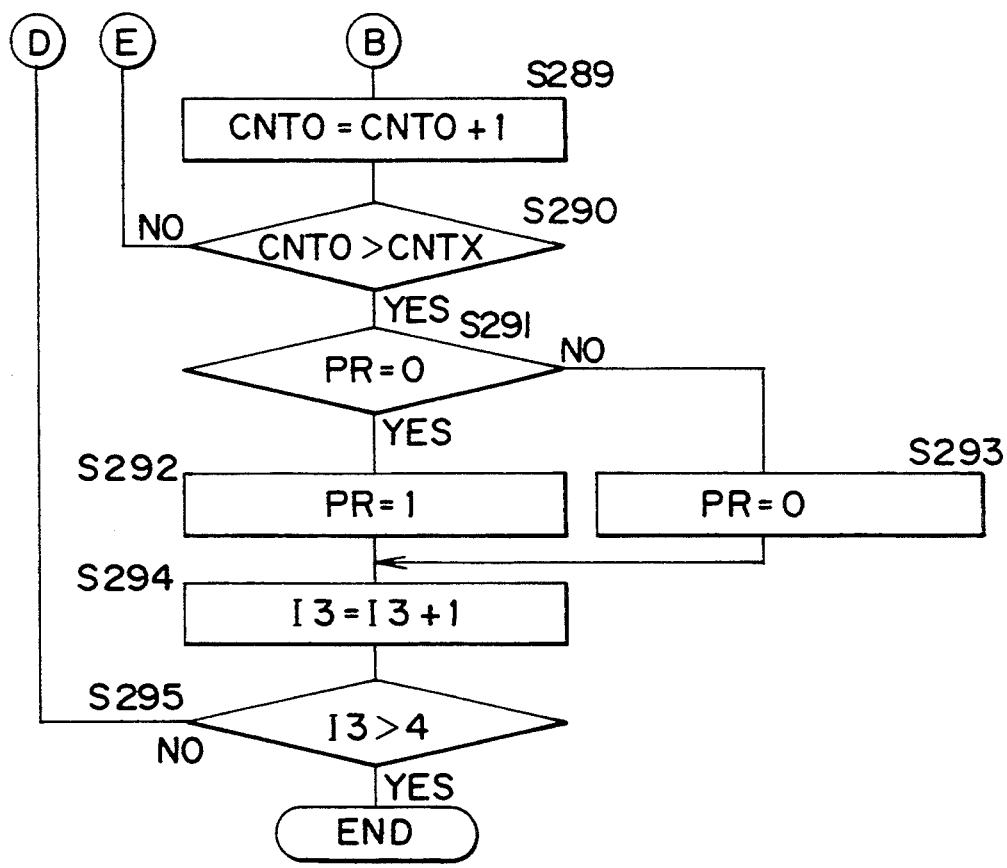

In steps S277 to S287 shown in FIGS. 47 and 48, as shown in FIG. 57, the starting point on the polygonal side and the intersecting point on the polygonal and screen sides are stored to the first swap memory 104 and the second swap memory 105 from the conditions of FL1 and C1 calculated above. In this case, the starting point and the first and second swap memories in a state in which no reading operation is performed. The first and second swap memories 104 and 105 control addresses by a counting value CNT of the counter 106.

In a step S289, the counter (CNT0) 107 counts up and an address on the next polygonal side is calculated and it proceeds to a step S290.

In the step S290, the counting value CNT0 of the counter 107 is compared with a stored value of a CNTX-register to judge whether all polygonal sides are processed. When all the polygonal sides are not completely processed, it proceeds to the step S262 as shown by reference numeral E in FIG. 46.

In steps S291 and S293, flags of the swap memories are switched and it proceeds to a step S294.

In the step S294, the counter (I3) 172 counts up and an address on the next screen side is calculated.

In the step S295, it is judged whether the counting value I3 of the counter 172 is greater than value "4". In this step, it is judged whether all screen sides are completely processed or not. When all the screen sides are not completely processed, it is returned to the step S261 shown by reference numeral D in FIG. 46.

Figure 64:
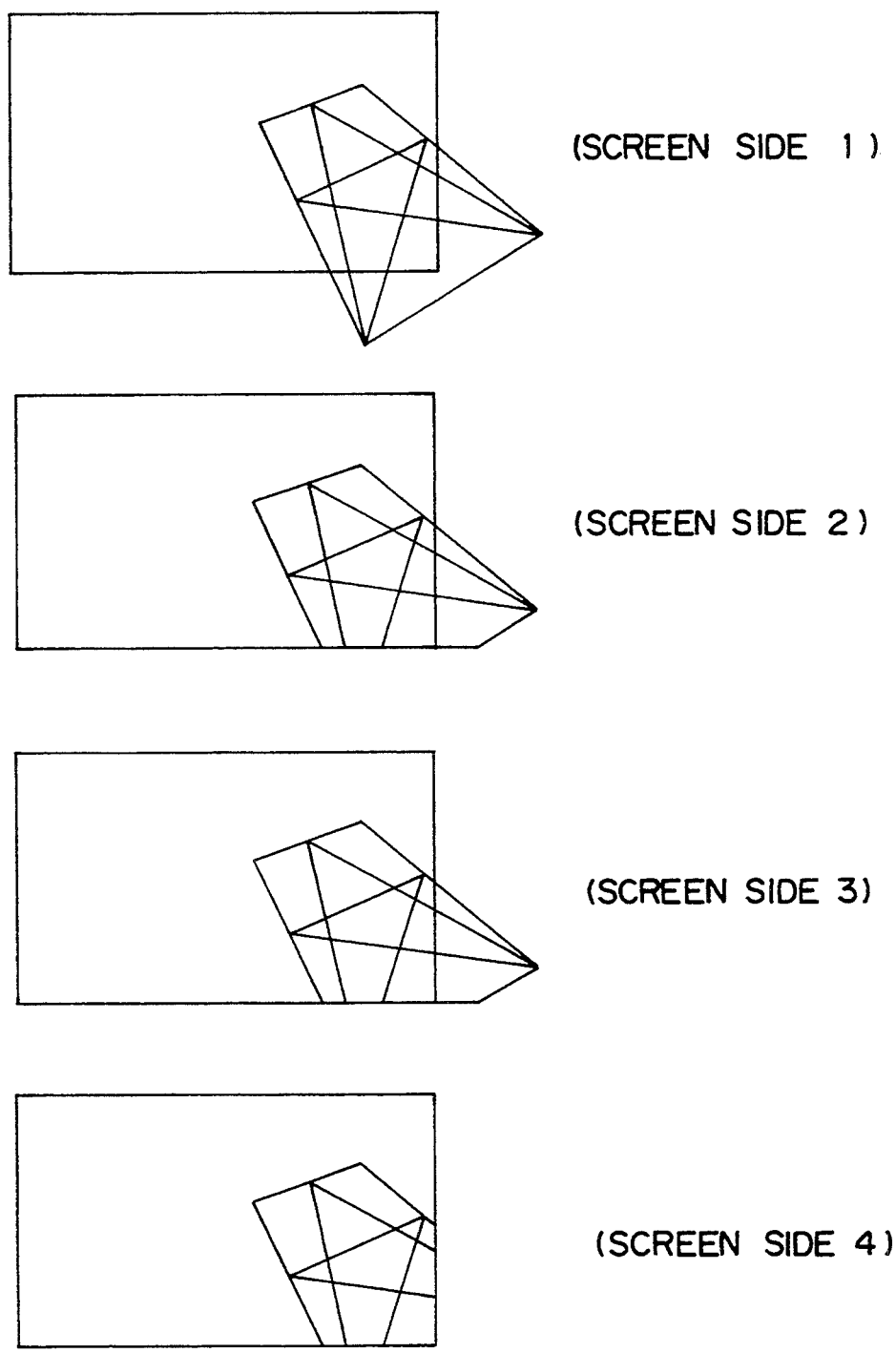
FIG. 64 is a typical view showing clipping processing states of the clipping processor in the present invention.
Figure 65:
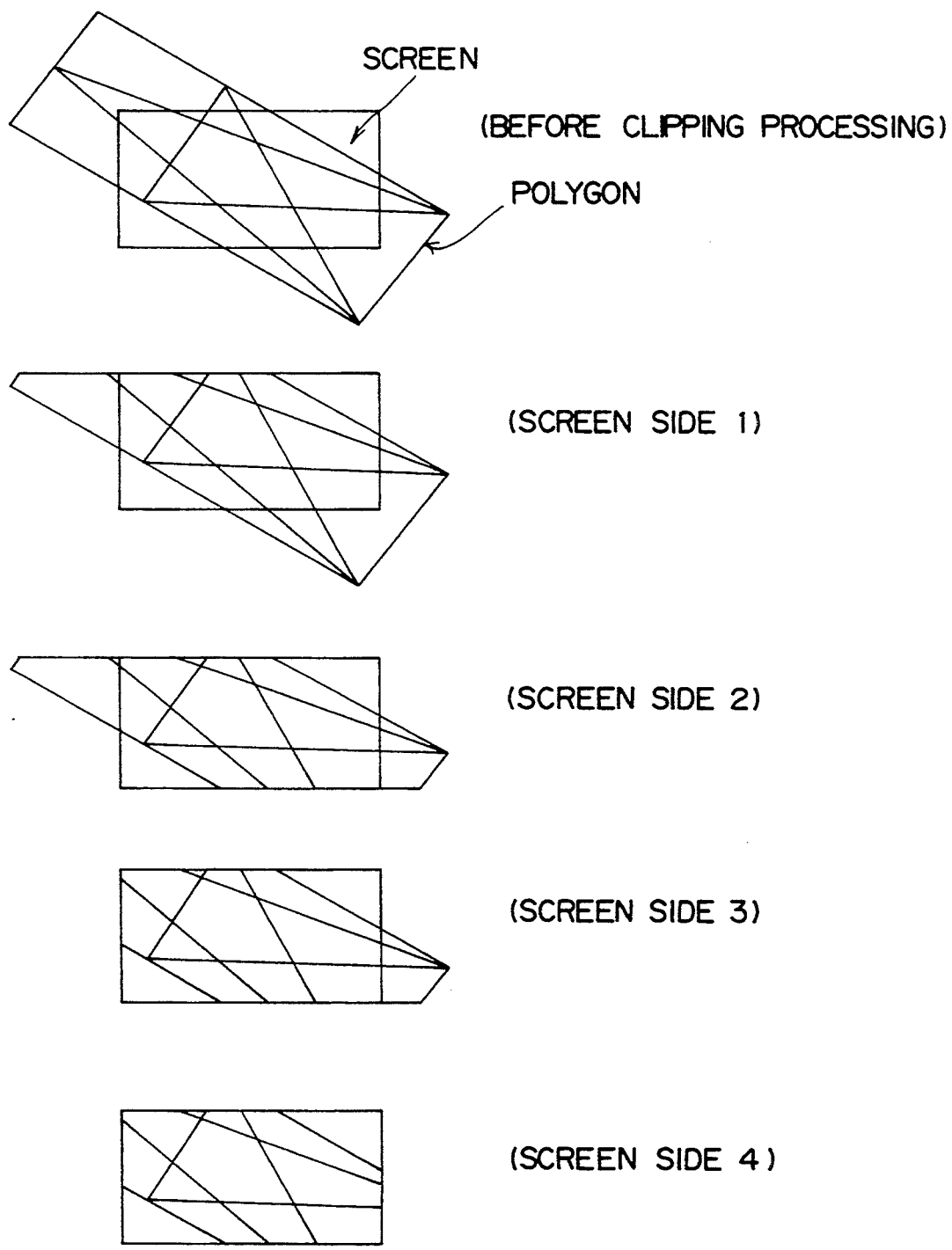
FIG. 65 is a typical view showing clipping processing states of the clipping processor in the present invention.

FIGS. 64 and 65 show clipping processing states every screen side.

FIG. 14 shows X and Y addresses on the screen and MX and MY addresses of the mapping memory provided in the example shown in FIG. 64.

As mentioned above, in accordance with the present invention, at a clipping processing time, the clipping processing is simultaneously performed with respect to the mapping addresses assigned at a polygonal end point. Accordingly, the clipping processing is performed at a high speed. Further, a method for calculating the mapping addresses at the clipping time is equal to a mapping processing method so that no mapping pattern is almost deformed at the clipping time.

Further, the operation of the clipping processor is controlled by the region judging device 120 such that no clipping processing is performed with respect to a polygon which does not cross a screen face and is not located inside the screen. Accordingly, no processing of a visible polygon is prevented by an invisible polygon in processings such as Z-sorting processing in which there is an upper limit about the number of polygons. Namely, no processing of polygon 1 shown in FIG. 73 is performed.

Further, it is not necessary to calculate X and Y addresses and MX and MY addresses of the mapping memory at a plurality of intermediate polygonal end points, thereby operating the clipping processor at a high speed.

Figure 72:
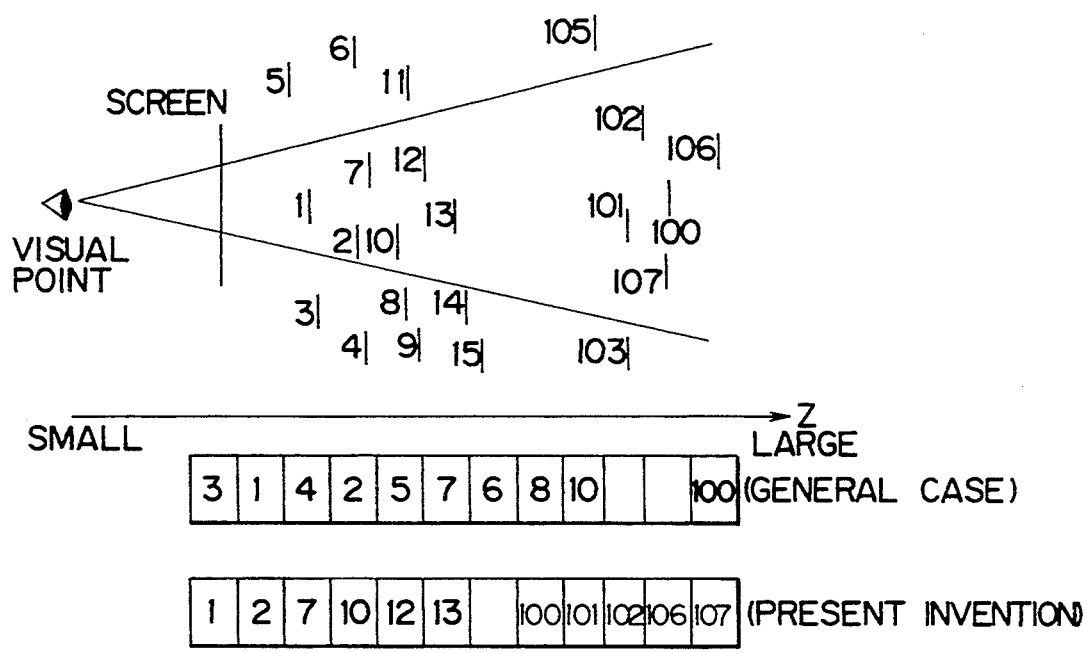
FIG. 72 is a typical view showing Z-sorting states with respect to a Z-sorting upper limit in the present invention and an example using the general clipping processor.

As shown in FIG. 72, when the upper limit of the number of polygons is set to 100 in the Z-sorting processing, no polygons 101 to 107 can be processed in a general clipping processing system. However, in the present invention, all visible polygons 1 to 107 can be processed.

Figure 58:
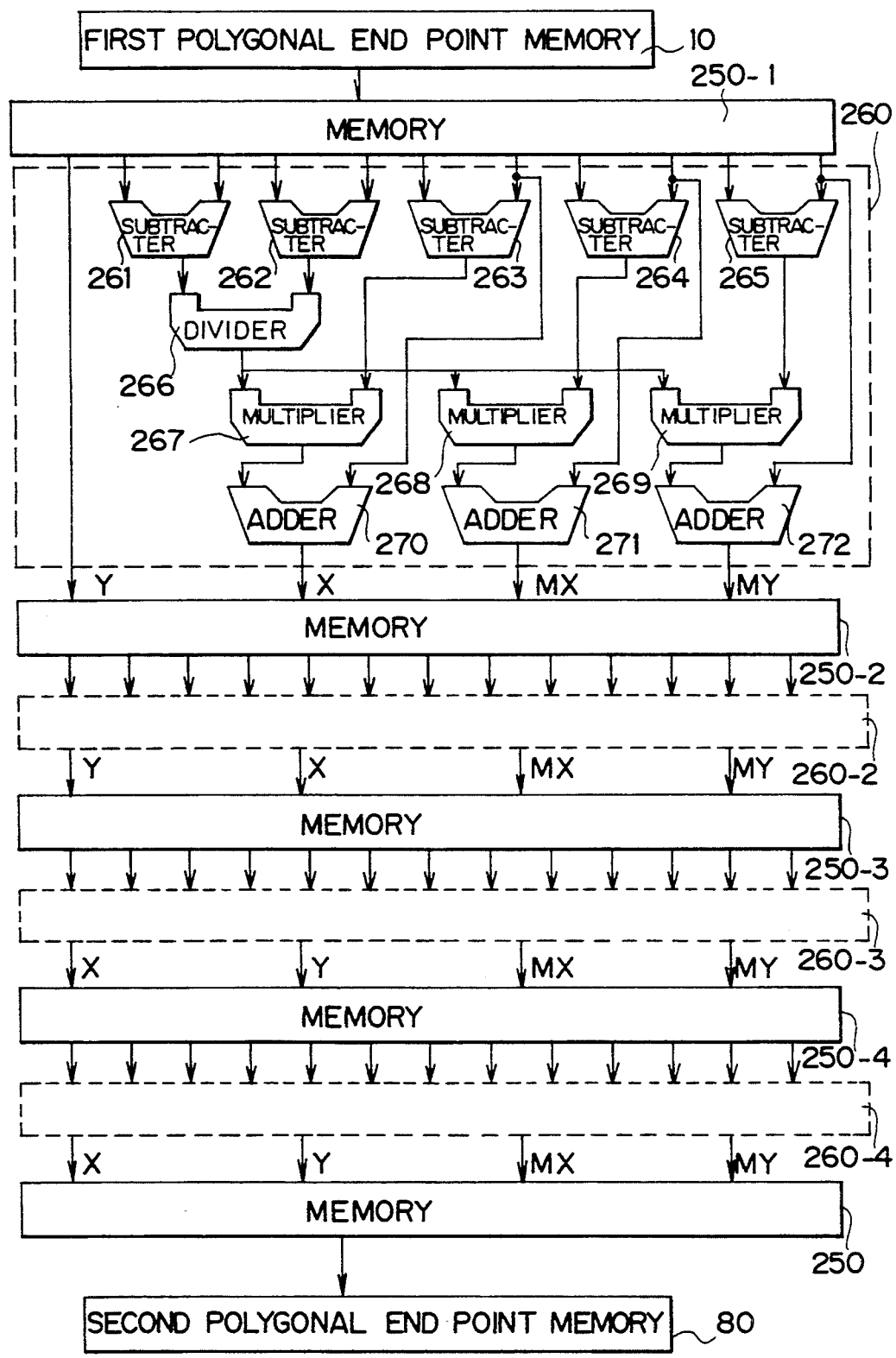
FIG. 58 is a block diagram showing the construction of a clipping processor in accordance with a third embodiment of the present invention.
Figure 59:
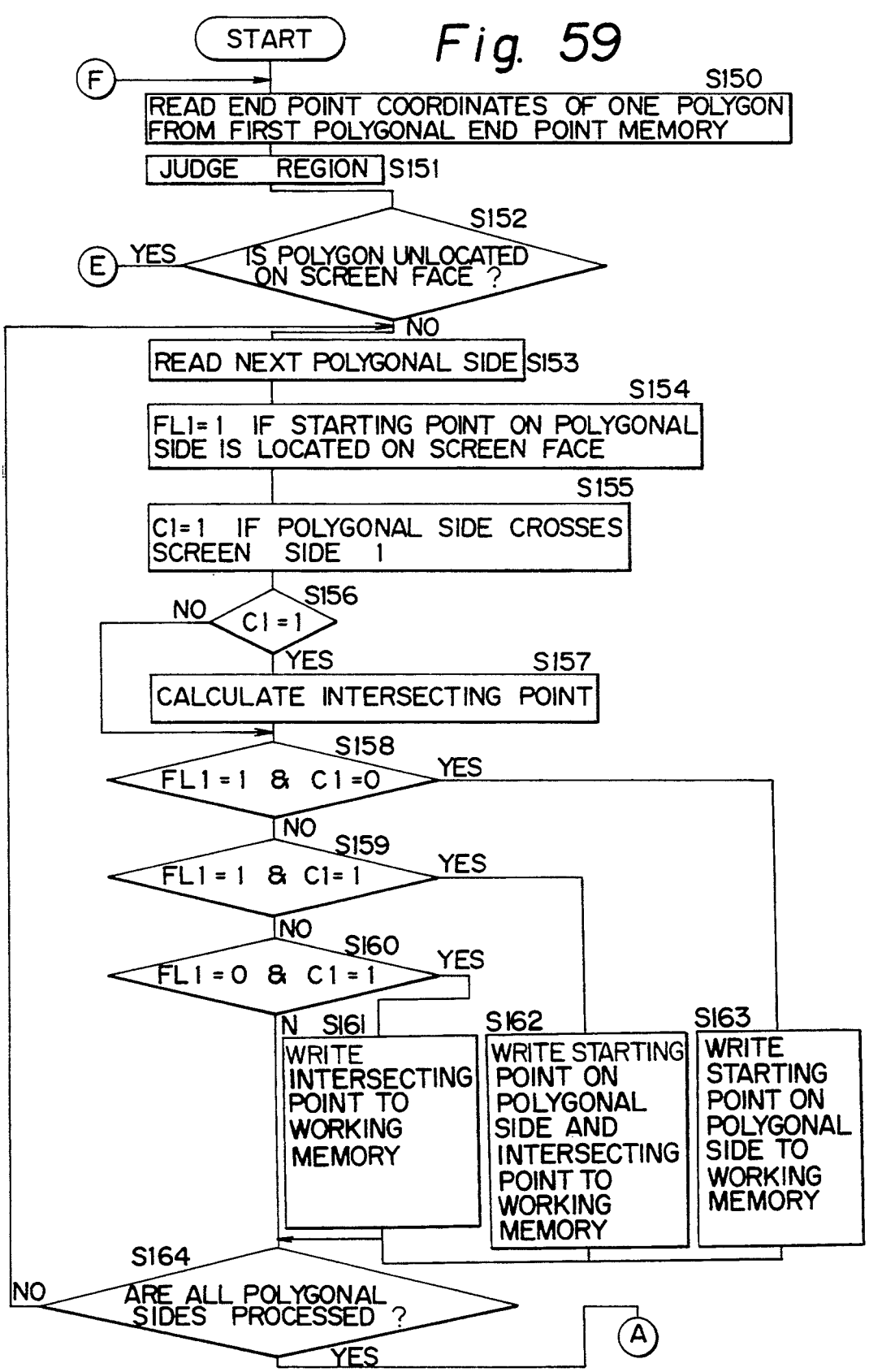
FIG. 59 is a flow chart showing an operation of the clipping processor in the third embodiment of the present invention.
Figure 60:
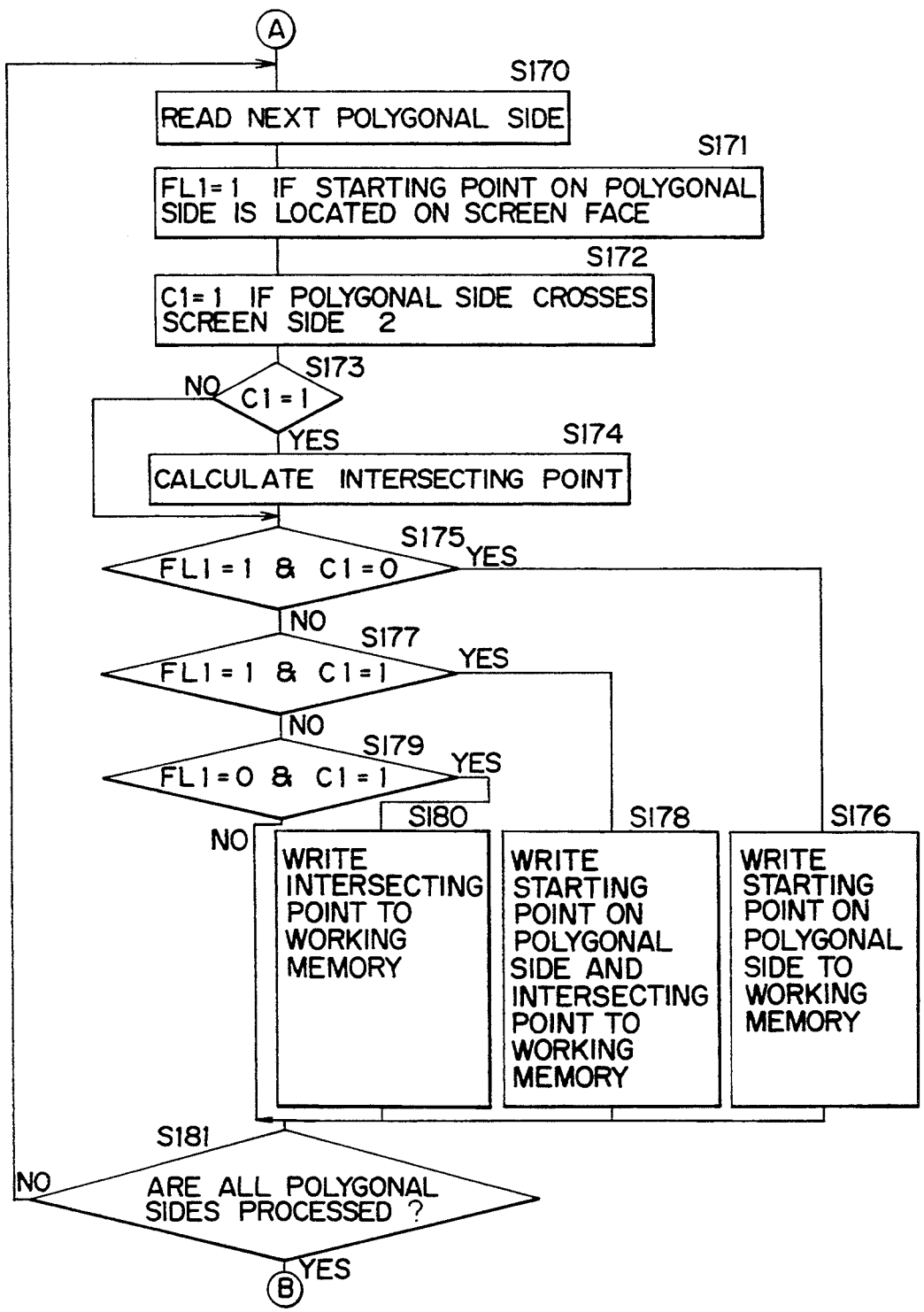
FIG. 60 is a flow chart showing the operation of the clipping processor in the third embodiment of the present invention.
Figure 61:
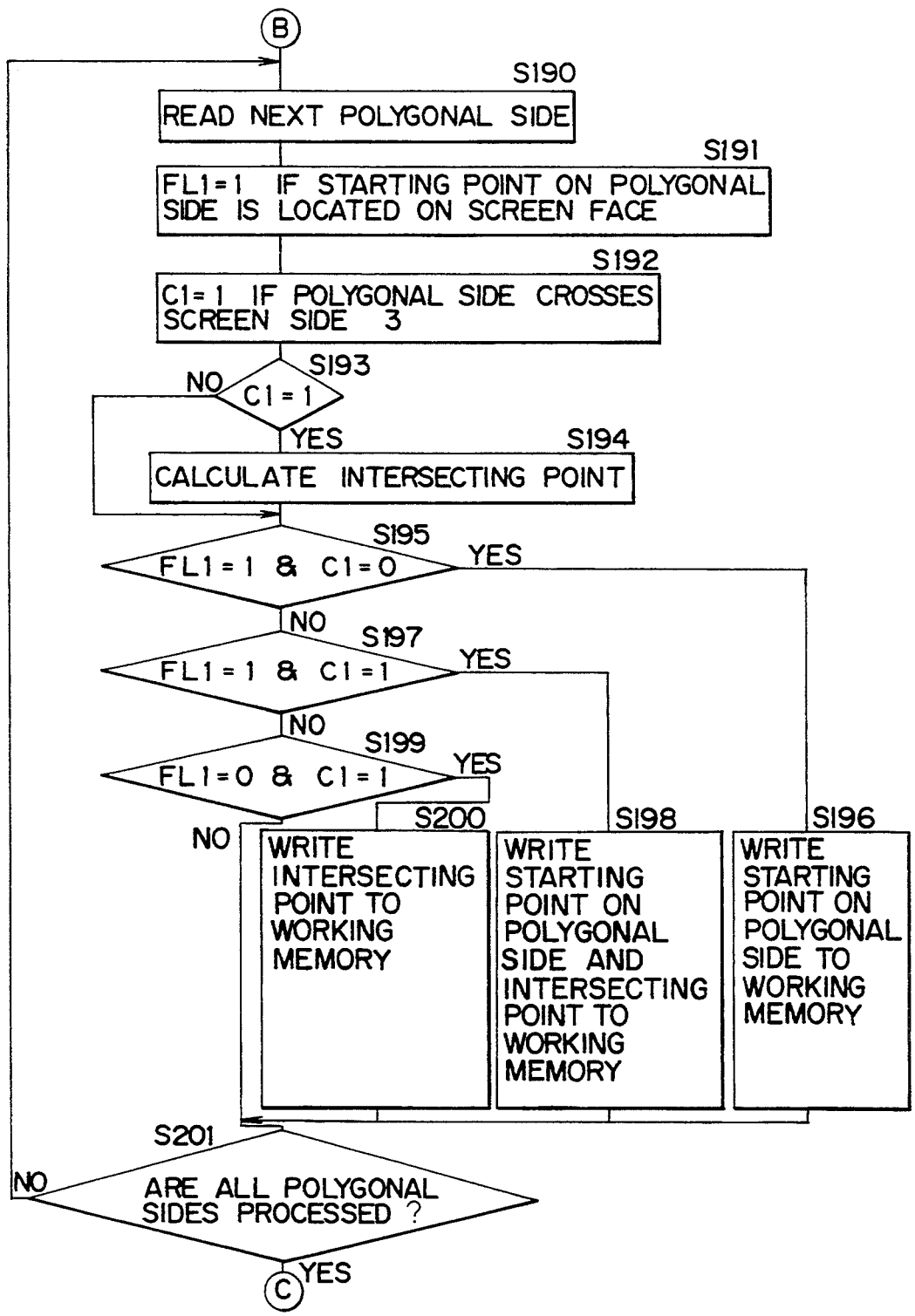
FIG. 61 is a flow chart showing the operation of the clipping processor in the third embodiment of the present invention.
Figure 62:
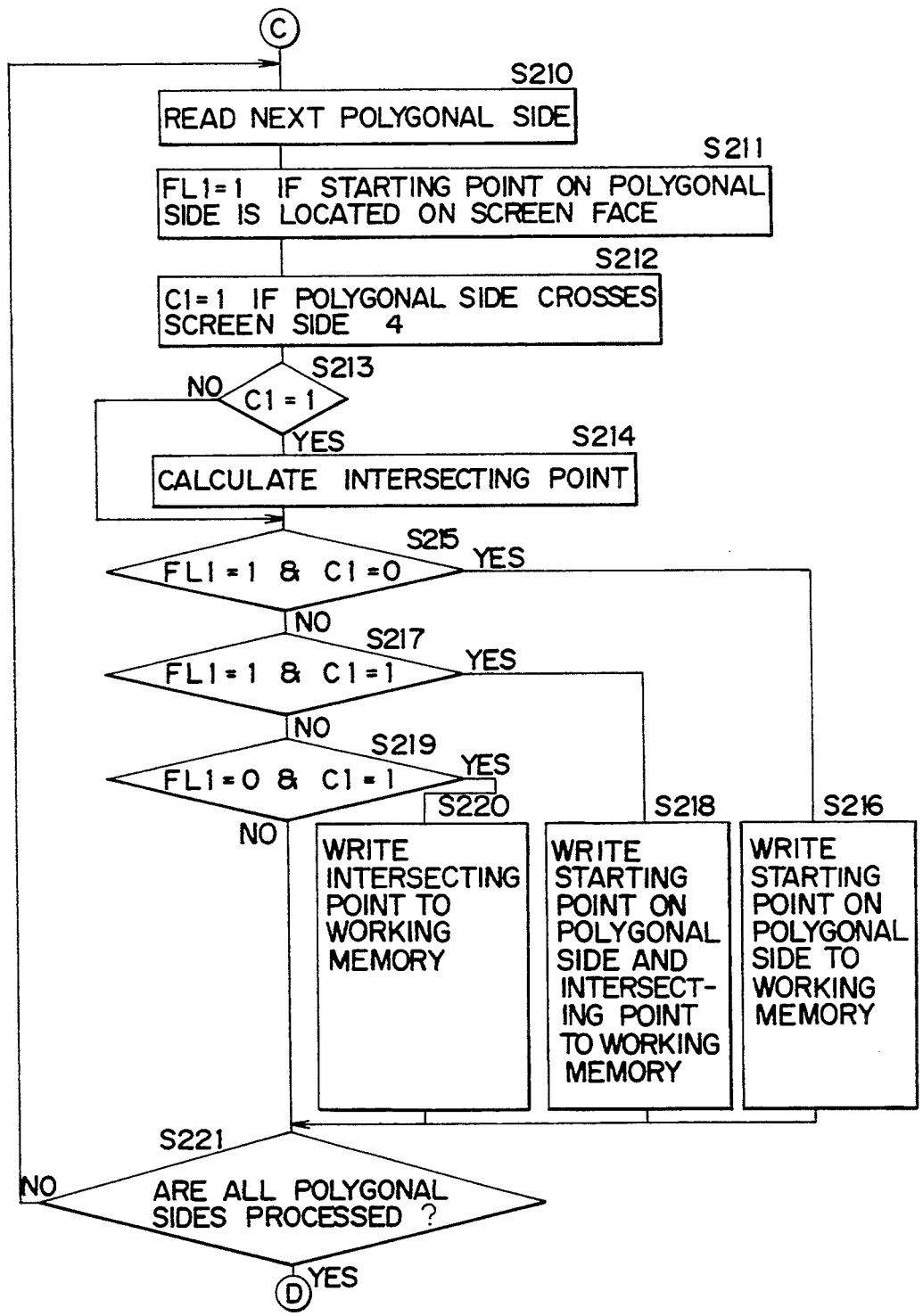
FIG. 62 is a flow chart showing the operation of the clipping processor in the third embodiment of the present invention.

A clipping processor in accordance with a third embodiment of the present invention will next be described. FIG. 58 is a block diagram showing the clipping processor in the third embodiment of the present invention.

In this third embodiment, intersecting point arithmetic circuits 260, 260-2, 260-3 and 260-4 sequentially make respective calculations in accordance with the above-mentioned calculating formulas with respect to screen sides 1 to 4 based on X and Y addresses on a polygonal side and MX and MY addresses of a mapping memory read out of a first polygonal end point memory 10. The calculated results of these intersecting point arithmetic circuits are stored to working memories 250-2, 250-3, 250-4 and 250. When all the calculations are completely made, the calculated results are written to a second polygonal end point memory 80.

First, the X and Y addresses on the polygonal side and the MX and MY addresses of the mapping memory read out of-the first polygonal end point memory 10 are stored to a working memory 250-1. The stored address data are transmitted from this working memory 250-1 to the intersecting point arithmetic circuit 260 for performing clipping processing about screen side 1.

The clipping processing is performed with respect to screen coordinates on the screen side 1 from the working memory 250-1 and is also performed with respect to the mapping addresses. The clipped results are written to the working memory 250-2. The intersecting point arithmetic circuit 260 has subtracters 261 to 265, a divider 266, multipliers 267 to 269 and adders 270 to 272 to respectively make subtracting, dividing, multiplying and adding calculations in accordance with the above calculating formulas. This intersecting point arithmetic circuit 260 calculates the X and Y addresses and the MX and MY addresses of the mapping memory in parallel with each other.

Figure 63:
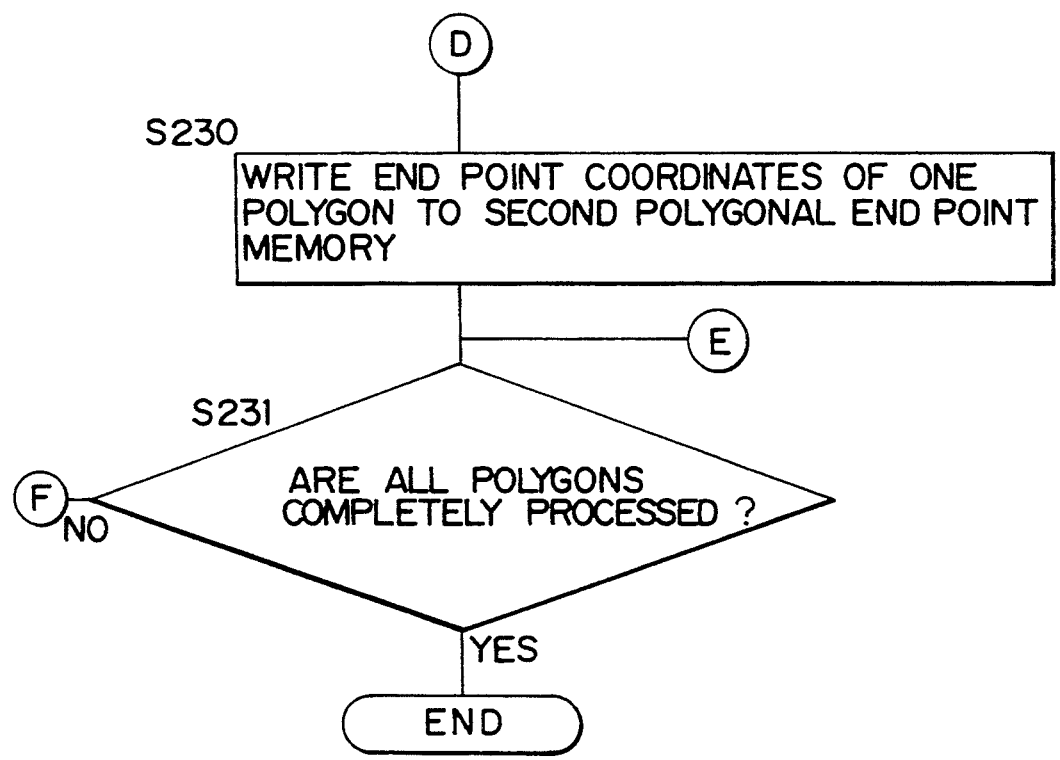
FIG. 63 is a flow chart showing the operation of the clipping processor in the third embodiment of the present invention.

The intersecting point arithmetic circuits 260-2 to 260-4 have the same construction as the intersecting point arithmetic circuit 260. The intersecting point arithmetic circuit 260-2 performs the clipping processing with respect to screen coordinates about screen side 2. The intersecting point arithmetic circuit 250-3 performs the clipping processing with respect to screen coordinates about screen side 3. The intersecting point arithmetic circuit 260-4 performs the clipping processing with respect to screen coordinates about screen side 4. The In the step S152, it is judged whether or not a polygonal side crosses a screen side in accordance with the order of screen sides on a screen face shown in FIG. 56. Further, it is also judged whether or not a starting point on the polygonal side is located inside the screen side. Thus, it is judged whether or not the polygon is located on the screen face. When no polygon is located on the screen face, it proceeds to a step S231 shown in FIG. 63. In contrast to this, when the polygon is located on the screen face, it proceeds to a step S153 for starting the clipping processing.

In the step S153, the X and Y addresses at the starting and terminal points on each of the polygonal sides, the MX and MY addresses of the mapping memory on each of the polygonal sides are read out of the first polygonal end point memory 10. Then, it proceeds to a step S154.

In the step S154, if the starting point on the polygonal side is located on the screen face, a flag FL1 of the flip-flop circuit 175 is set to value "1" and it proceeds to a step S155.

In the step S155, when the polygonal side crosses the screen side 1 (or ①), a stored clipped results are written to the second polygonal end point memory 80.

An operation of the clipping processor in this third embodiment will next be described with reference to flow charts shown in FIGS. 59 to 63.

When the clipping processor is started, X and Y addresses at upper, lower, left-hand and right-hand end points on the screen, and X and Y addresses at starting and terminal points on each of polygonal sides are read out of the first polygonal end point memory 10 in a step S150. Further, MX and MY addresses of the mapping memory on each of the polygonal sides are read out of the first polygonal end point memory 10. These read addresses are stored to the working memory 250-1 and it proceeds to a step S151.

In the step S151, it is judged whether or not a polygon is located inside the screen by performing a region judging operation similar to that of the region judging device in the steps S241 to 245 in the flow chart shown in FIG. 45 in the above second embodiment. Then, it proceeds to a step S152. value C1 of the flip-flop circuit 175 is set to value "1" and it proceeds to a step S156. The flag FL1 and the stored value C1 show a condition about an end point stored to the above working memories as shown in FIG. 57.

In the step S156, it is judged whether C1=1 is formed or not. Namely, it is judged whether or not the polygonal side crosses the screen side 1. When C1=1 is formed, it proceeds to a step S157. In this step S157, the intersecting point arithmetic circuit 260 calculates an intersecting point on the polygonal and screen sides in accordance with the above-mentioned calculating formulas. Then, it proceeds to a step S158.

In the step S158, it is judged whether FL1=1 and C1=0 are formed or not. When FL1=1 and C1=0 are formed, it proceeds to a step S163. In contrast to this, when FL1=1 and C1=0 are not formed, it proceeds to a step S159.

In the step S163, the starting point on the polygonal side is written to the working memory 250-2 and it proceeds to a step S164.

In the step S159, it is judged whether FL1=1 and C1=1 are formed or not. When FL1=1 and C1=1 are formed, it proceeds to a step S162. In contrast to this, when FL1=1 and C1=1 are not formed, it proceeds to a step S160.

In the step S162, the starting point on the polygonal side and the intersecting point are written to the working memory 250-2 and it proceeds to the step S164.

In the step S160, it is judged whether FL1=0 and C1=1 are formed or not. When FL1=0 and C1=1 are formed, it proceeds to a step S161. In contrast to this, when FL1=0 and C1=1 are not formed, it proceeds to the step S164.

In the step S161, the intersecting point is written to the working memory 250-2 and it proceeds to the step S164.

In the step S164, it is judged whether all the polygonal sides are completely processed or not. When all the polygonal sides are not completely processed, it is returned to the step S153 and the above operation is repeatedly performed. In contrast to this, when all the polygonal sides are completely processed, it proceeds to a step S170 shown in FIG. 60.

In the step S170, the X and Y addresses at the starting and terminal points on each of the polygonal sides, and the MX and MY addresses of the mapping memory on each of the polygonal sides are read out of the first polygonal end point memory 10. Then, it proceeds to a step S171.

In the step S171, if the starting point on the polygonal side is located on the screen face, the flag FL1 of the flip-flop circuit 175 is set to value "1" and it proceeds to a step S172.

In the step S172, when the polygonal side crosses the screen side 2 (or ②), the stored value C1 of the flip-flop circuit 175 is set value "1" and it proceeds to a step S173. The flag FL1 and the stored value C1 show a condition about an end point stored to the above working memories as shown in FIG. 57.

In the step S173, it is judged whether C1=1 is formed or not. Namely, it is judged whether or not the polygonal side crosses the screen side 2. When C1=1 is formed, proceeds to a step S174. In this step S174, the intersecting point arithmetic circuit 260-2 calculates an intersecting point on the polygonal and screen sides in accordance with the above-mentioned calculating formulas. Then, it proceeds to a step S175.

In contrast to this, when C1=1 is not formed, it directly proceeds to the step S175 from the step S173.

In the step S175, it is judged whether FL1=1 and C1=0 are formed or not. When FL1=1 and C1=0 are formed, it proceeds to a step S176. In contrast to this, when FL1=1 and C1=0 are not formed, it proceeds to a step S177.

In the step S176, the starting point on the polygonal side is written to the working memory 250-3 and it proceeds to a step S181.

In the step S177, it is judged whether FL1=1 and C1=1 are formed or not. When FL1=1 and C1=1 are formed, it proceeds to a step S178. In contrast to this, when FL1=1 and C1=1 are not formed, it proceeds to a step S179.

In the step S178, the starting point on the polygonal side and the intersecting point are written to the working memory 250-3 and it proceeds to the step S181.

In the step S179, it is judged whether FL1=0 and C1=1 are formed or not. When FL1=0 and C1=1 are formed, it proceeds to a step S180. In contrast to this, when FL1=0 and C1=1 are not formed, it proceeds to the step S181.

In the step S180, the intersecting point is written to the working memory 250-3 and it proceeds to the step S181.

In the step S181, it is judged whether all the polygonal sides are completely processed or not. When all the polygonal sides are not completely processed, it is returned to the step S170 and the above operation is repeatedly performed. In contrast to this, when all the polygonal sides are completely processed, it proceeds to a step S190 shown in FIG. 51.

In the step S190, the X and Y addresses at the starting and terminal points on each of the polygonal sides, and the MX and MY addresses of the mapping memory on each of the polygonal sides are read out of the first polygonal end point memory 10. Then, it proceeds to a step S191.

In the step S191, if the starting point on the polygonal side is located on the screen face, the flag FL1 of the flip-flop circuit 175 is set to value "1" and it proceeds to a step S192.

In the step S192, when the polygonal side crosses the screen side 3 (or ③), the stored value C1 of the flip-flop circuit 175 is set to value "1" and it proceeds to a step S193. The flag FL1 and the stored value C1 show a condition about an end point stored to the above working memories as shown in FIG. 57.

In the step S193, it is judged whether C1=1 is formed or not. Namely, it is judged whether or not the polygonal side crosses the screen side 3. When C1=1 is formed, it proceeds to a step S194, In this step S194, the intersecting point arithmetic circuit 260-3 calculates an intersecting point on the polygonal and screen sides in accordance with the above-mentioned calculating formulas. Then, it proceeds to a step S195.

In contrast to this, when C1=1 is not formed, it directly proceeds to the step S195 from the step S193.

In the step S195, it is judged whether FL1=1 and C1=0 are formed or not. When FL1=1 and C1=0 are formed, it proceeds to a step S196. In contrast to this, when FL1=1 and C1=0 are not formed, it proceeds to a step S197.

In the step S196, the starting point on the polygonal side is written to the working memory 250-4 and it proceeds to a step S201.

In the step S197, it is judged whether FL1=1 and C1=1 are formed or not. When FL1=1 and C1=1 are formed, it proceeds to a step S198. In contrast to this, when FL1=1 and C1=1 are not formed, it proceeds to a step S199.

In the step S198, the starting point on the polygonal side and the intersecting point are written to the working memory 250-4 and it proceeds to the step S201.

In the step S199, it is judged whether FL1=0 and C1=1 are formed or not. When FL1=0 and C1=1 are formed, it proceeds to a step S200. In contrast to this, when FL1=0 and C1=1 are not formed, it proceeds to the step S201.

In the step S200, the intersecting point is written to the working memory 250-4 and it proceeds to the step S201.

In the step S201, it is judged whether all the polygonal sides are completely processed or not. When all the polygonal sides are not completely processed, it is returned to the step S190 and the above operation is repeatedly performed. In contrast to this, when all the polygonal sides are completely processed, it proceeds to a step S210 shown in FIG. 62.

In the step S210, the X and Y addresses at the starting and terminal points on each of the polygonal sides, and the MX and MY addresses of the mapping memory on each of the polygonal sides are read out of the first polygonal end point memory 10. Then, it proceeds to a step S211.

In the step S211, if the starting point on the polygonal side is located on the screen face, the flag FL1 of the flip-flop circuit 175 is set to value "1" and it proceeds to a step S212.

In the step S212, when the polygonal side crosses the screen side 4 (or ④), the stored value C1 of the flip-flop circuit 175 is set to value "1" and it proceeds to a step S213. The flag FL1 and the stored value C1 show a condition about an end point stored to the above working memories as shown in FIG. 57.

In the step S213, it is judged whether C1=1 is formed or not. Namely, it is judged whether or not the polygonal side crosses the screen side 4. When C1=1 is formed, it proceeds to a step S214. In this step S214, the intersecting point arithmetic circuit 260-4 calculates an intersecting point on the polygonal and screen sides in accordance with the above-mentioned calculating formulas. Then, it proceeds to a step S215.

In contrast to this, when C1=1 is not formed, it directly proceeds to the step S215 from the step S213.

In the step S215, it is judged whether FL1=1 and C1=0 are formed or not. When FL1=1 and C1=0 are formed, it proceeds to a step S216. In contrast to this, when FL1=1 and C1=0 are not formed, it proceeds to a step S217.

In the step S216, the starting point on the polygonal side is written to the working memory 250 and it proceeds to a step S221.

In the step S217, it is judged whether FL1=1 and C1=1 are formed or not. When FL1=1 and C1=1 are formed, it proceeds to a step S218. In contrast to this, when FL1=1 and C1=1 are not formed, it proceeds to a step S219.

In the step S218, the starting point on the polygonal side and the intersecting point are written to the working memory 250 and it proceeds to the step S221.

In the step S219, it is judged whether FL1=0 and C1=1 are formed or not. When FL1=0 and C1=1 are formed, it proceeds to a step S220. In contrast to this, when FL1=0 and C1=1 are not formed, it proceeds to the step S221.

In the step S220, the intersecting point is written to the working memory 250 and it proceeds to the step S221.

In the step S221, it is judged whether all the polygonal sides are completely processed or not. When all the polygonal sides are not completely processed, it is returned to the step S210 and the above operation is repeatedly performed. In contrast to this, when all the polygonal sides are completely processed, it proceeds to a step S230 shown in FIG. 63.

In the step S230, end point coordinates of one polygon are written to the second polygonal end point memory 80 and it proceeds to a step S231. In the step S231, it is judged whether all the polygons are completely processed or not. When all the polygons are not completely processed, it is returned to the step S150 and the above operation is repeatedly performed. In contrast to this, when all the polygons are completely processed, the operation of the clipping processor is completed.

As mentioned above, in accordance with the present invention, at a clipping processing time, the clipping processing is simultaneously performed with respect to the mapping addresses assigned at a polygonal end point. Accordingly, the clipping processing is performed at a high speed. Further, a method for calculating the mapping addresses at the clipping time is equal to a mapping processing method so that no mapping pattern is almost deformed at the clipping time.

A clipped figure in the present invention is displayed by a CRT 40 and this display is already explained with reference to FIG. 8. The clipping processing of this figure will further be described in detail with reference to FIGS. 66 to 71.

Figure 66:
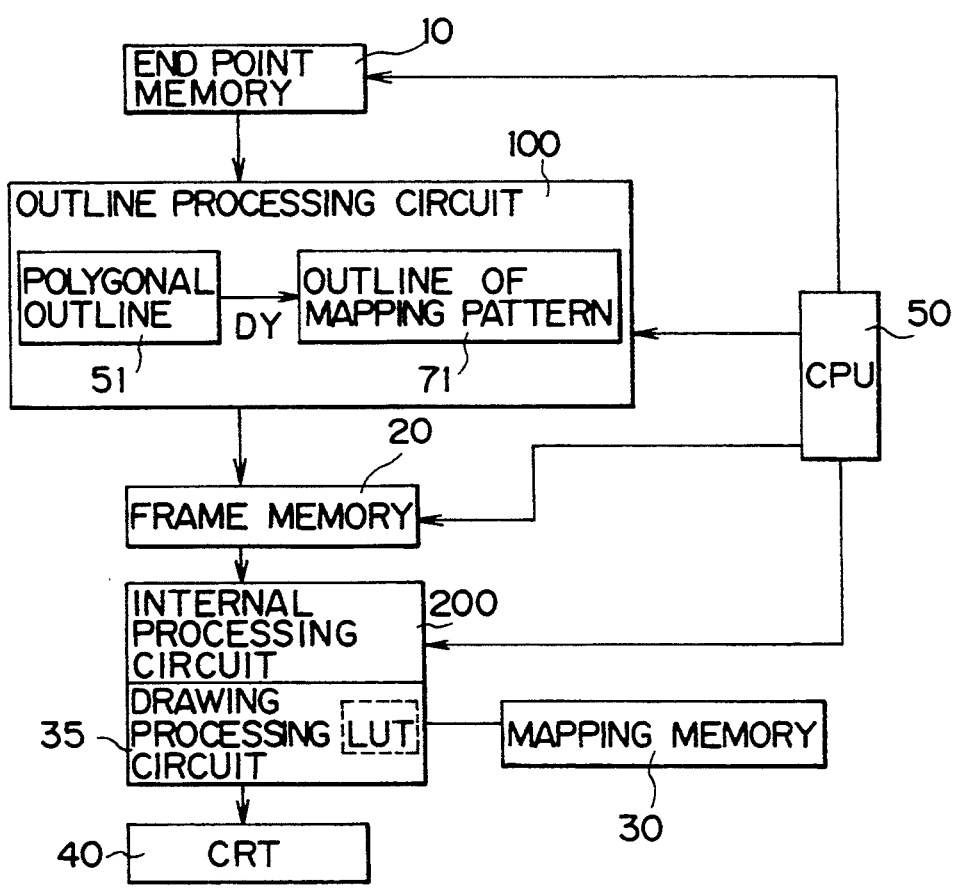
FIG. 66 is a block diagram showing the construction of an image processor in which a basic pattern is deformed in accordance with the deformation of a polygon.
Figure 67:
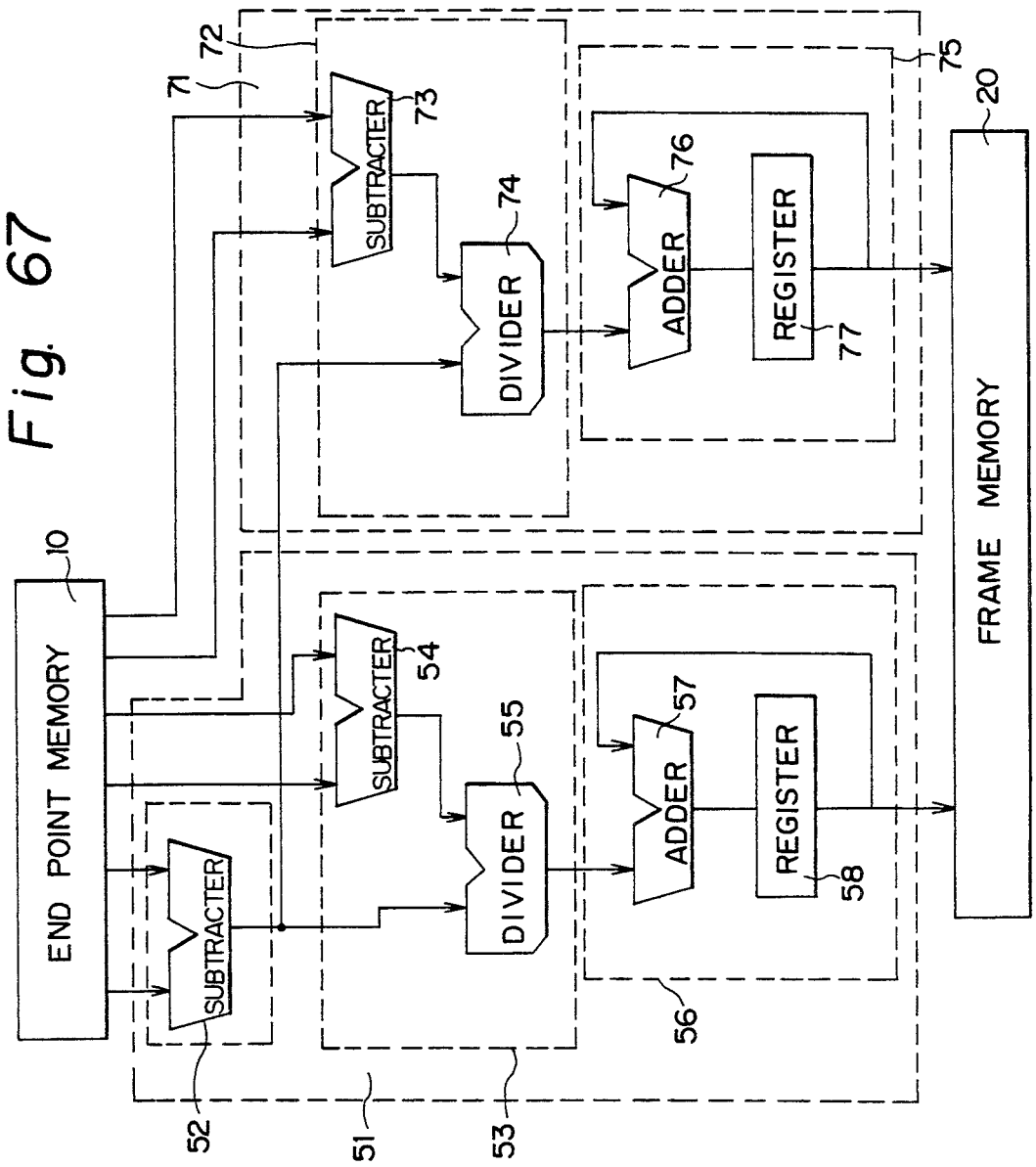
FIG. 67 is a block diagram showing construction of an outline processor disposed in the image processor in which a basic pattern is deformed in accordance with the deformation of a polygon.
Figure 68:
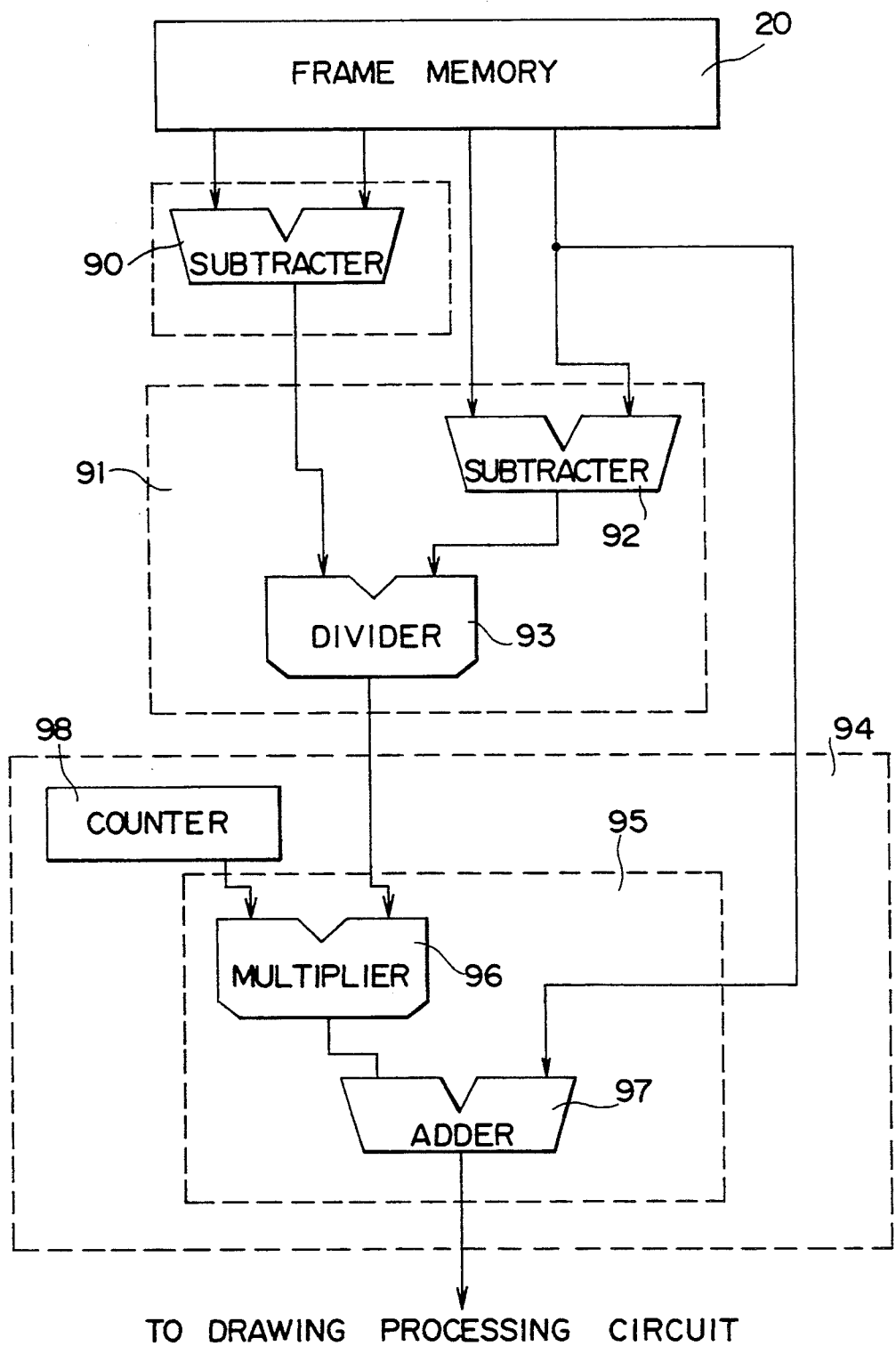
FIG. 68 is a block diagram showing the construction of an internal processor disposed in the image processor in which a basic pattern is deformed in accordance with the deformation of a polygon.
Figure 69:
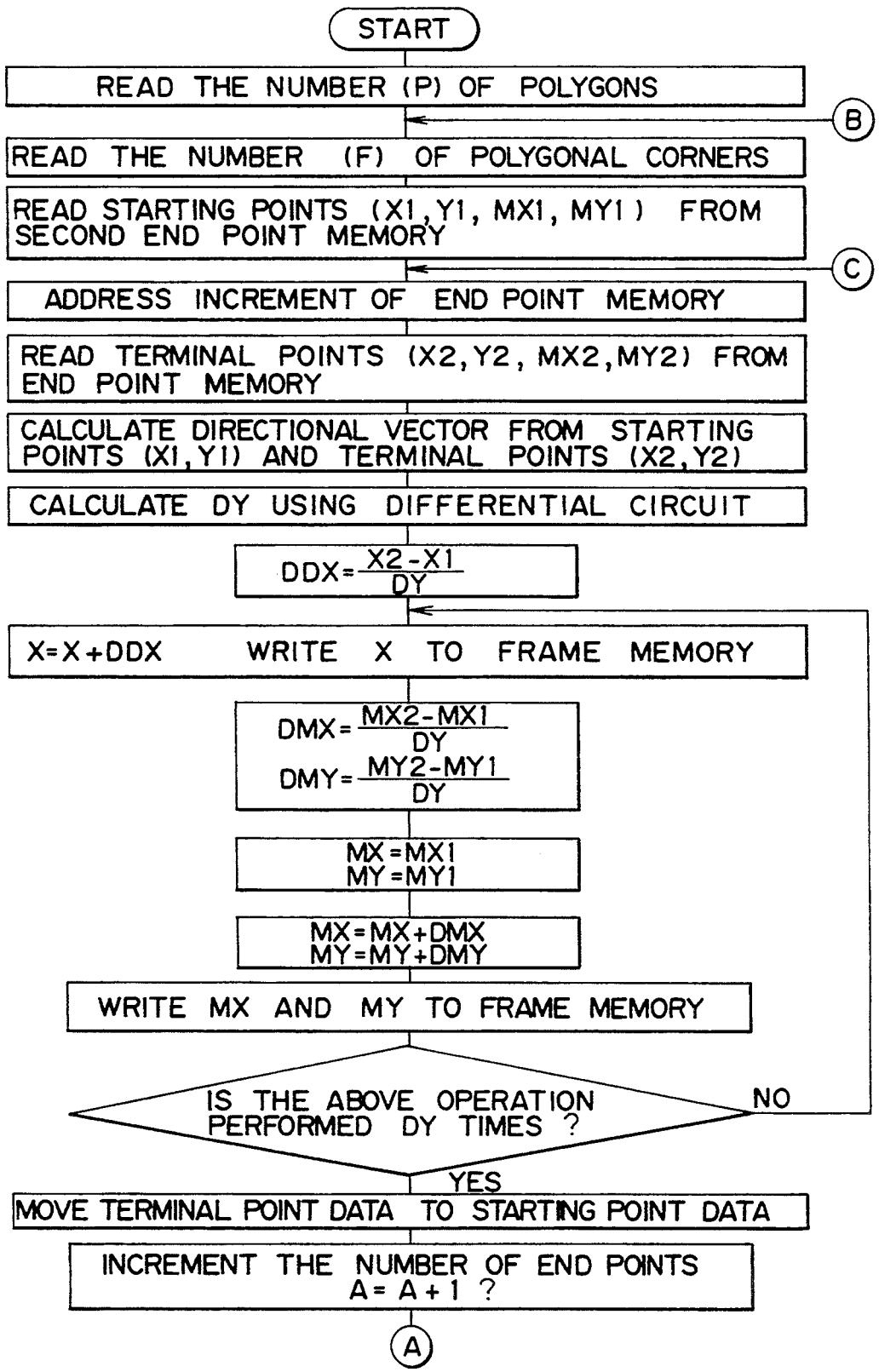
FIG. 69 is a flow chart showing an operation of the outline processor disposed in the image processor in which a basic pattern is deformed in accordance with the deformation of a polygon.
Figure 70:
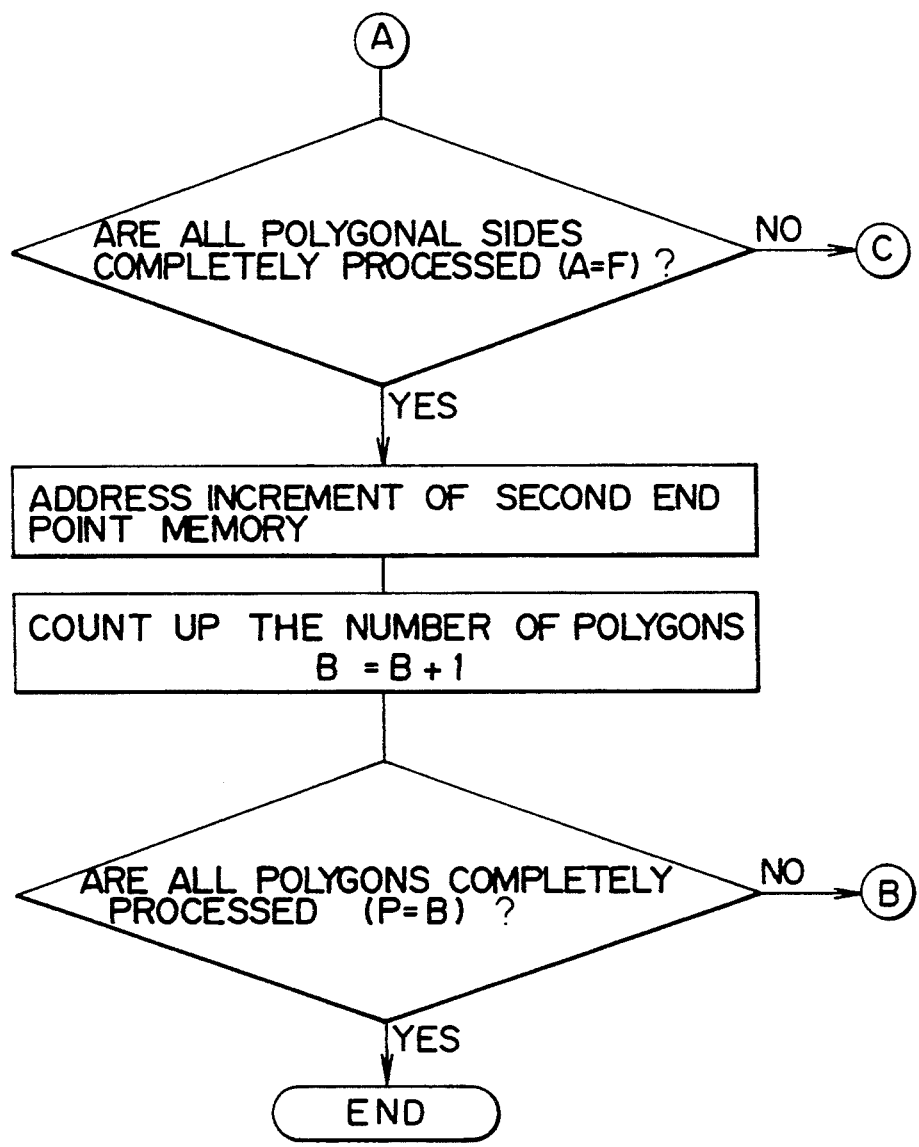
FIG. 70 is a flow chart showing the operation of the outline processor disposed in the image processor in which a basic pattern is deformed in accordance with the deformation of a polygon.
Figure 71:
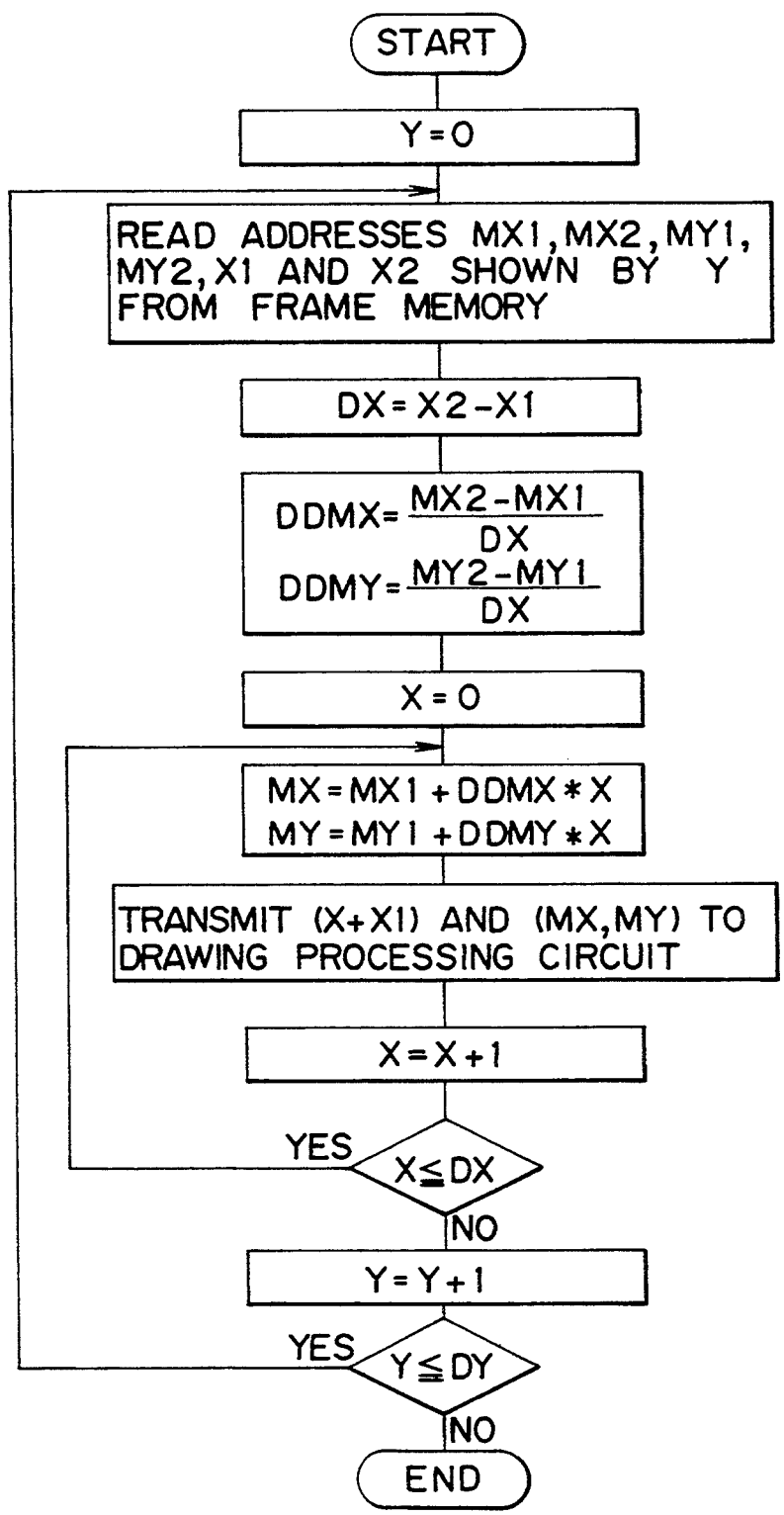
FIG. 71 is a flow chaff showing an operation of the internal processor disposed in the image processor in which a basic pattern is deformed in accordance with the deformation of a polygon.

FIG. 66 is a block diagram showing the construction of an image processor in which a basic pattern is deformed in accordance with the deformation of a polygon. FIG. 67 is a block diagram showing the construction of an outline processing circuit. FIG. 68 is a block diagram showing the construction of an internal processing circuit. FIGS. 69 to 71 are flow charts showing operations of the outline processing circuit and the internal processing circuit.

The basic pattern is deformed in accordance with the deformation of a polygon as follows.

In this embodiment, the clipping processor 60 performs the clipping processing as shown in FIG. 15. A clipped polygon has screen end point coordinates (X, Y) and end point coordinates (MX, MY) of the basic pattern as a mapping pattern. Thus, the basic pattern shown in FIG. 12 is deformed to perform a mapping operation.

First, outline processing of the polygon is performed by a polygonal outline processing circuit 51 shown in FIG. 66. To perform this outline processing, a central processing unit (CPU) 50 judges a vector direction on each of polygonal sides with reference to FIG. 3 on the basis of starting and terminal point addresses of X and Y on each of the polygonal sides read out of an end point memory 10. A right-hand or left-hand side of each of the polygons is determined in accordance with this vector direction as shown in FIG. 4. The screen end point coordinates (X, Y) on a screen side 4 completely processed as shown in FIG. 14 and the end point coordinates (MX, MY) of the mapping pattern are stored to the second polygonal end point memory 80 (see FIG. 10).

A distance (DY) in a Y-direction is calculated in accordance with the above-mentioned formula (1) from the starting and terminal point addresses of Y on each of the polygonal sides read out of the second polygonal end point memory 80. Subsequently, to provide a polygonal outline, an address from an X-terminal point to an X-starting point on each of the polygonal sides is calculated by a digital differential analysis (DDA) by using the above distance (DY). This calculated address is stored to a frame memory 20. Namely, a differential value (DDX) is calculated in accordance with the above-mentioned formula (2). Then, an X-address from the X-terminal point to the X-starting point on each of the polygonal sides is calculated by making an interpolating calculation as shown by the above formula (3).

Further, a mapping pattern outline processing circuit 71 performs outline processing of basic pattern information. In this outline processing, the end point addresses (MX, MY) of the basic pattern stored to the second polygonal end point memory 80 are changed when the basic pattern is deformed.

Data corresponding to a polygon are calculated by the digital differential analysis (DDA) from data of addresses (MX1, MY1) and (MX2, MY2) of the basic pattern read out of the second polygonal end point memory 80 in accordance with the following formulas (9) and (10).

$$DMX = \frac{MX2 - MX1}{DY} \quad (9)$$

$$DMY = \frac{MY2 - MY1}{DY} \quad (10)$$

The calculated data are stored to the frame memory 20. Namely, data from terminal point data (MX2, MY2) to starting point data (MX1, MY1) on each of the polygonal sides are calculated by the digital differential analysis (DDA) and are stored to the frame memory 20.

Differential values (DMX) and (DMY) of these data are first calculated as shown by the formulas (9) and (10). Then, data (MX) and (MY) from a terminal point to a starting point on each of the polygonal sides are calculated by making interpolating calculations as shown by the following formulas (11) and (12).

$$MX = MX + DMX \quad (11)$$

$$MY = MY + DMY \quad (12)$$

An initial value of the data (MX) in the formula (11) is shown by data (MX1) at the starting point. An initial value of the data (MY) in the formula (12) is shown by data (MY1) at the starting point. The interpolating calculations shown by the formulas (11) and (12) are repeatedly made from zero to the distance (DY).

In this embodiment, a polygonal outline and address information of an outline of a basic pattern deformed on the basis of the polygonal outline are stored to the frame memory 20 in synchronization with a horizontal scanning line every Y-address indicative of a vertical position on this horizontal scanning line.

An internal figure-drawing processing circuit 200 reads X and Y addresses between two opposite polygonal sides out of the frame memory 20. The internal figure-drawing processing circuit 200 then calculates an address of each of bit patterns inside a polygon as an internal pattern address based on the read address information in accordance with the above formulas (7) and (8). Namely, in this embodiment, starting and terminal point addresses (X1) and (X2) of X indicative of an outline of the polygon and corresponding to the Y-address indicative of the vertical position, and mapping addresses (MX, MY) provided by deforming the basic pattern are read out of the frame memory 20 in synchronization with a horizontal scanning signal.

As shown by the formula (6), a distance (DXY) in an X-direction is calculated from the starting and terminal point addresses of X read out of the frame memory 20. The end point mapping addresses (MX, MY) of the basic pattern read out of the frame memory 20 are calculated to deform the basic pattern in accordance with a polygonal shape by the digital differential analysis (DDA) using this distance (DXY) in accordance with the formulas (7) and (8).

Data from the terminal point to the starting point every Y-address are then calculated by the digital differential analysis (DDA) using the distance (DXY) calculated in the formula (6) to provide internal pattern data of the polygon. Namely, a differential value (DDT) of these data is calculated in accordance with the formula (7). Further, data (T) from the terminal point to the starting point on a Y-axis are calculated by making an interpolating calculation as shown by the formula (8). A value of X in this formula (8) is changed from zero to the distance (DXY).

Similar to the above outline processing circuit 100, the internal drawing processing circuit 200 changes end point addresses (MX, MY) of a basic pattern stored to the frame memory 20 when the basic pattern is deformed.

Data corresponding to the polygon are calculated by the digital differential analysis (DDA) from addresses (MX1(Y), MY1(Y)) and (MX2(Y), MY2(Y)) of the basic pattern every Y-address read out of the second polygonal end point memory 80 in accordance with the following formulas (13) to (15).

$$DXY = X2(Y) - X1(Y) \quad (13)$$

$$DDMX = \frac{MX2 - MX1}{DXY} \quad (14)$$

$$DDMY = \frac{MY2 - MY1}{DXY} \quad (15)$$

Namely, data from terminal point data to starting point data on each of the polygonal sides are calculated by the digital differential analysis (DDA).

Differential values (DDMX) and (DDMY) of these data are calculated in accordance with the formulas (14) and (15). Further, data (MX) and (MY) from the terminal point to the starting point on each of the polygonal sides are calculated by making interpolating calculations as shown by the following formulas (16) and (17).

$$MX = MX1 + DDMX*X \quad (16)$$

$$MY = MY1 + DDMY^*X \qquad (17)$$

A value of X in these formulas (16) and (17) is changed from zero to the distance (DX).

An X-address SX as a screen address for displaying data by the CRT 40 is calculated by X1+X.

To display data by the CRT 40, a drawing processing circuit 35 reads matching pattern addresses (MX, MY) provided by deforming the basic pattern of a polygon having a higher priority order every X-address at a Y-address corresponding to a horizontal scanning signal. This polygon having a higher priority order is a polygon having a smaller Z-value indicative of the priority order. The drawing processing circuit 35 designates an address of a mapping memory 30 in accordance with these matching pattern addresses. The drawing processing circuit 35 then reads information corresponding to this designated address by using the mapping memory 30 as a lookup table. This information is displayed by the CRT 40. As a result, as shown in FIG. 16, it is possible to deform and display the basic pattern shown in FIG. 12 in accordance with a polygonal shape.

As mentioned above, in this embodiment, X and Y addresses of an outline of a figure are calculated on the basis of information from an end point memory. It is possible to calculate and provide internal image data from information between two points shown by these calculated X and Y addresses. Accordingly, the number of accesses with respect to a memory can be greatly reduced so that mapping processing is performed at a high speed.

As mentioned above, in accordance with the present invention, at a clipping processing time, the clipping processing is simultaneously performed with respect to mapping addresses as internal pattern information assigned at a polygonal end point. Accordingly, the clipping processing is performed at a high speed. Further, a method for calculating the mapping addresses as internal pattern information at the clipping time is equal to a mapping processing method for processing the internal pattern information so that no mapping pattern as the internal pattern information is almost deformed at the clipping time.

Further, the operation of the clipping processor is controlled by the region judging device such that no clipping processing is performed with respect to a polygon which does not cross a screen face and is not located inside the screen. Accordingly, no processing of a visible polygon is prevented by an invisible polygon in processings such as Z-sorting processing in which there is an upper limit about the number of polygons.

In the present invention, it is judged whether or not each of screen end points is located inside a polygon. The clipping processing and the mapping processing of the internal pattern information are performed with respect to only the polygon having each of the screen end points therein. Accordingly, no useless processing is required in picture-drawing or processing of a polygonal side address calculation, thereby performing the clipping and mapping processings at high speeds.

Many widely different embodiments of the present invention may be constructed without departing from the spirit and scope of the present invention. It should be understood that the present invention is not limited to the specific embodiments described in the specification, except as defined in the appended claims.

What is claimed is:

1. A clipping processor comprising:
   a first polygonal end point memory for storing two end point addresses of a polygon, said polygon having a plurality of polygonal sides, and respective end point information of internal pattern information;
   a screen end point arithmetic section for judging whether a polygonal side crosses a plurality of screen end points and is located inside or outside a screen based on the two end point addresses stored in said first polygonal end point memory;
   said screen end point arithmetic section calculating an intersecting point of the polygonal side and the plurality of screen end points and calculating each of the two end point addresses and the internal pattern information at the intersecting point; and
   a second polygonal end point memory for storing the two end point addresses and the internal pattern information at the intersecting point calculated by said screen end point arithmetic section at which the polygonal side crosses the plurality of screen end points.

2. A clipping processor as claimed in claim 1, wherein said screen end point arithmetic section comprises:
   a first differential circuit for subtracting starting point addresses from each other at each of the plurality of screen end points and each of the polygonal sides;
   the first differential circuit further subtracting a starting point address from a terminal point address thereof on each of the polygonal sides to provide a first subtracted value;
   a differential arithmetic circuit for subtracting the starting point address from the terminal point address thereof on each of the polygonal sides to provide a second subtracted value;
   the differential arithmetic circuit dividing the second subtracted value by said first subtracted value;
   a second differential circuit for subtracting the starting point address from the terminal point address thereof on each of the polygonal sides to provide a third subtracted value; and
   an arithmetic circuit for multiplying a divided value provided by said differential arithmetic circuit by the third subtracted value to obtain a multiplied value;
   said arithmetic circuit adding said multiplied value to an initial value.

3. A clipping processor as claimed in claim 1, wherein the clipping processor further comprises: an area encoding processing section for judging an area code with respect to the screen based on the two end point addresses stored in said first polygonal end point memory;
   a screen end point embedding processing section for writing a polygonal end point to said second polygonal end point memory at a screen end point located inside the polygon in accordance with the area code of said area encoding processing section; and
   a polygonal end point embedding processing section for writing the intersecting point on a screen side and the polygonal sides and the two end point addresses and the internal pattern information calculated by said screen end point arithmetic section to said second polygonal end point memory.

4. A clipping processor as claimed in claim 3, wherein the clipping processor further comprises a region judging section for judging whether or not the polygonal side is located on a screen face on the basis of the two end point addresses stored in said first polygonal end point memory and wherein the two end point addresses and the internal pattern information at the intersecting point of the polygonal side and the screen face are calculated with respect to a polygon having the polygonal side located on the screen face of the region judging section.

* * * * *